US009454872B2

(12) United States Patent
Muir et al.

(10) Patent No.: US 9,454,872 B2
(45) Date of Patent: Sep. 27, 2016

(54) ADVENTURE SEQUENCE ACTIVITIES

(75) Inventors: David Hugh Muir, Newcastle (AU); Binh T. Nguyen, Reno, NV (US)

(73) Assignee: IGT, Las Vegas, NV (US)

( * ) Notice: Subject to any disclaimer, the term of this patent is extended or adjusted under 35 U.S.C. 154(b) by 2571 days.

(21) Appl. No.: 11/349,844

(22) Filed: Feb. 7, 2006

(65) Prior Publication Data

US 2006/0128460 A1 Jun. 15, 2006

Related U.S. Application Data

(63) Continuation-in-part of application No. 10/930,694, filed on Aug. 30, 2004, which is a continuation-in-part of application No. 09/966,474, filed on Sep. 28, 2001, now Pat. No. 6,790,141.

(51) Int. Cl.
*A63F 13/00* (2014.01)
*G07F 17/32* (2006.01)

(52) U.S. Cl.
CPC ............. *G07F 17/323* (2013.01); *G07F 17/32* (2013.01); *G07F 17/3227* (2013.01); *G07F 17/3232* (2013.01); *G07F 17/3255* (2013.01); *G07F 17/3262* (2013.01); *G07F 17/3276* (2013.01)

(58) Field of Classification Search
CPC ............. A63F 2300/409; G07F 17/32; G07F 17/323; G07F 17/3211
USPC ............................ 463/16–20, 40–42, 29, 33
See application file for complete search history.

(56) References Cited

U.S. PATENT DOCUMENTS

| | | | |
|---|---|---|---|
| 4,764,666 | A | 8/1988 | Bergeron |
| 4,837,728 | A | 6/1989 | Barrie et al. |
| 5,038,022 | A | 8/1991 | Lucero |
| 5,083,271 | A | 1/1992 | Thacher et al. |

(Continued)

FOREIGN PATENT DOCUMENTS

| | | |
|---|---|---|
| AU | 785324 | 4/2003 |
| WO | 2007/092234 | 8/2007 |

OTHER PUBLICATIONS

US Office Action mailed Jul. 13, 2007 for U.S. Appl. No. 10/930,694.

(Continued)

*Primary Examiner* — Eric M Thomas
(74) *Attorney, Agent, or Firm* — Neal, Gerber & Eisenberg LLP

(57) ABSTRACT

Some implementations of the invention provide methods and devices for various types of adventure sequences that preferably involve, at least in part, wagering games. Such sequences may involve wagering and/or other games at a plurality of gaming devices, tables and/or gaming establishments. Some implementations provide a virtual gaming experience wherein one or more other environments (e.g., environments that include gaming establishments) are simulated at a single location. Accordingly, adventure sequences described herein may comprise stages in one or more virtual environments, stages in one or more real environments or a combination of the two. Virtual players, also referred to herein as player game agents ("PGAs"), may act on behalf of real players. A PGA may be able to play games autonomously, e.g., when the associated player is at a different location and/or is not aware of the PGA's current activities. PGAs may be enabled to negotiate on behalf of real players, e.g., for comps, better pay table percentages, etc.

45 Claims, 21 Drawing Sheets

(56) References Cited

U.S. PATENT DOCUMENTS

| | | | | |
|---|---|---|---|---|
| 5,265,874 | A | 11/1993 | Dickinson et al. | |
| 5,709,603 | A | 1/1998 | Kaye | |
| 5,779,549 | A | 7/1998 | Walker et al. | |
| 5,830,067 | A * | 11/1998 | Graves et al. | 463/40 |
| 5,917,725 | A | 6/1999 | Thacher et al. | |
| 5,942,969 | A | 8/1999 | Wicks | |
| 6,267,671 | B1 * | 7/2001 | Hogan | 463/25 |
| 6,286,834 | B1 | 9/2001 | Caputo | |
| 6,302,793 | B1 | 10/2001 | Fertitta et al. | |
| 6,306,038 | B1 * | 10/2001 | Graves et al. | 463/40 |
| 6,320,495 | B1 | 11/2001 | Sporgis | |
| 6,328,649 | B1 | 12/2001 | Randall et al. | |
| 6,386,975 | B1 * | 5/2002 | Peterson | 463/16 |
| 6,511,377 | B1 | 1/2003 | Weiss | |
| 6,761,638 | B1 | 7/2004 | Narita | |
| 6,790,141 | B2 | 9/2004 | Muir | |
| 6,840,860 | B1 | 1/2005 | Okuniewicz | |
| 6,857,959 | B1 | 2/2005 | Nguyen | |
| 6,967,566 | B2 | 11/2005 | Weston et al. | |
| 7,892,097 | B2 | 2/2011 | Muir et al. | |
| 2001/0008843 | A1 | 7/2001 | Walker et al. | |
| 2001/0031654 | A1 | 10/2001 | Walker et al. | |
| 2002/0082077 | A1 * | 6/2002 | Johnson et al. | 463/30 |
| 2002/0090986 | A1 | 7/2002 | Cote et al. | |
| 2002/0160825 | A1 * | 10/2002 | Nicastro et al. | 463/16 |
| 2005/0043088 | A1 | 2/2005 | Nguyen et al. | |
| 2005/0107164 | A1 | 5/2005 | Muir et al. | |
| 2008/0020848 | A1 | 1/2008 | Muir et al. | |
| 2011/0098118 | A1 | 4/2011 | Muir et al. | |

OTHER PUBLICATIONS

US Office Action mailed Dec. 28, 2007 for U.S. Appl. No. 10/930,694.

WO International Search Report mailed Aug. 2, 2007 for International Application No. PCT/US2007/002679.

WO Written Opinion mailed Aug. 2, 2007 for International Application No. PCT/US2007/002679.

Bulitko, V. and Lee, G., "Learning in Real-Time Search: A Unifying Framework", Journal of Artificial Intelligence Research, Nov. 2005, 39 pages.

Genesereth, M. and Love, N., "General Game Playing: Game Description Language Specification", Mar. 15, 2005, 19 pages.

"Tamagotchi", http://en.wikipedia.org/wiki/Tamaguchi, downloaded from the internet Feb. 7, 2006, 7 pages.

US Office Action mailed Apr. 17, 2003 from U.S. Appl. No. 09/966,474.

US Office Action mailed Sep. 12, 2003 from U.S. Appl. No. 09/966,474.

Notice of Allowance and Notice of Allowability mailed Apr. 29, 2004 from U.S. Appl. No. 09/966,474.

Supplemental Notice of Allowance and Notice of Allowability mailed Jul. 21, 2004 from U.S. Appl. No. 09/966,474.

US Office Action mailed Jun. 13, 2008 for U.S. Appl. No. 10/930,694.

US Office Action mailed Dec. 22, 2008 for U.S. Appl. No. 10/930,694.

US Office Action mailed Jun. 16, 2009 for U.S. Appl. No. 10/930,694.

US Office Action mailed Oct. 6, 2009 for U.S. Appl. No. 10/930,694.

Interview Summary dated Dec. 29, 2009 from U.S. Appl. No. 10/930,694.

Interview Summary dated Jan. 14, 2010 from U.S. Appl. No. 10/930,694.

Notice of Allowance and Allowability mailed Jan. 14, 2010 from U.S. Appl. No. 10/930,694.

Notice of Allowance and Allowability and Interview Summary mailed Oct. 27, 2010 from U.S. Appl. No. 10/930,694.

Notice of Allowance and Allowability mailed Dec. 14, 2010 from U.S. Appl. No. 10/930,694.

Australian Office Action mailed Oct. 12, 2010, from AU Application No. 2005204271.

International Preliminary Report on Patentability mailed Aug. 12, 2008, from Application No. PCT/US2007/002679.

* cited by examiner

FIG. 10
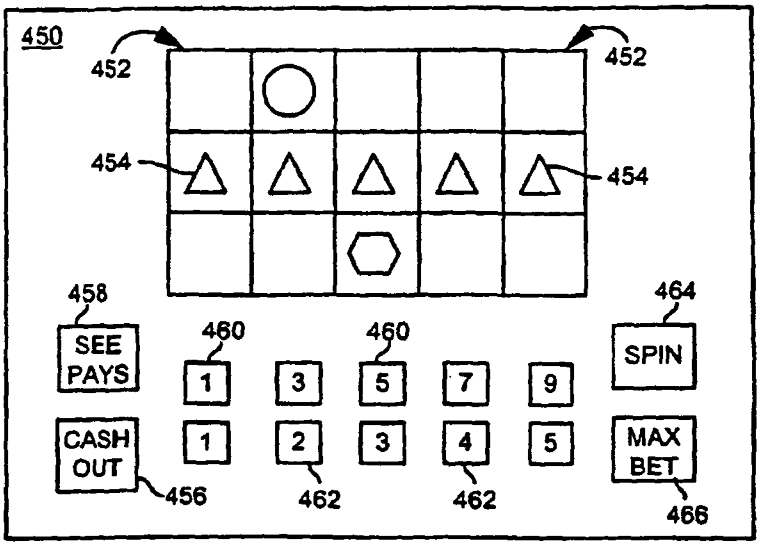
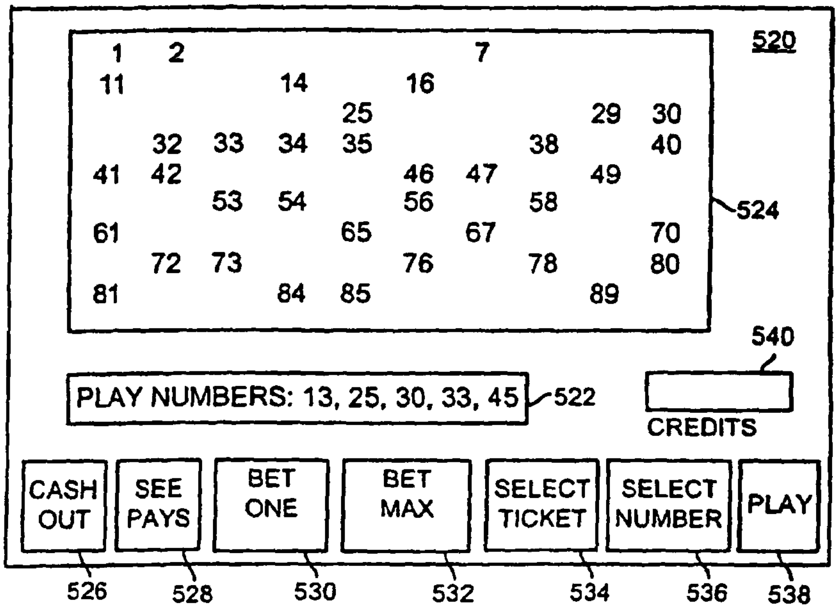
FIG. 11

ADVENTURE SEQUENCE ACTIVITIES

CROSS-REFERENCE TO RELATED APPLICATIONS

This is a continuation-in-part of co-pending U.S. application Ser. No. 10/930,694, filed Aug. 30, 2004, which is a continuation-in-part of U.S. application Ser. No. 09/966,474, filed Sep. 28, 2001 (now U.S. Pat. No. 6,790,141), both of which are hereby incorporated by reference and for all purposes.

BACKGROUND

This invention relates to gaming systems and methods. More specifically, this invention relates to systems and methods for providing games of chance.

Incentives such as, for example, extended play, bonuses, etc. are well known manners of enticing gaming patrons or players to continue play on a particular electronic gaming device. Unfortunately, these simple incentive techniques may not effectively encourage players to play multiple gaming devices and may not entice players who enjoy physical activity and/or adventure. To the contrary, these incentives are typically designed to encourage players to repeatedly play a particular gaming device at a particular venue, whereby the player has minimized physical activity, and is limited to the excitement a gaming device can provide. As a result, known gaming systems and methods make it very difficult for casino operators and the like to encourage or to promote the use of a wide variety of gaming activities by casino patrons, particularly new gaming activities, machines or venues with which players are not generally familiar.

Furthermore, existing gaming systems and methods do not generally enable a particular casino or venue to establish promotional activities or to establish incentives to engage in gaming activities at multiple venues or casinos, some or all of which may be owned by different business entities and some or all of which may be geographically dispersed. Nor do the current gaming systems and methods provide for excitement and stimulation outside the realm of traditional gaming devices and activities.

SUMMARY OF THE INVENTION

Some implementations of the invention provide methods and devices for various types of adventure sequences that preferably involve, at least in part, wagering games. Such sequences may involve wagering and/or other games at a plurality of gaming devices, tables and/or gaming establishments. Some implementations provide a virtual gaming experience wherein one or more other environments (e.g., an environments that include gaming establishments) are simulated at a single location. Accordingly, adventure sequences described herein may comprise stages in one or more virtual environments, stages in one or more real environments or a combination of the two. Virtual players, also referred to herein as player game agents ("PGAs"), may act on behalf of real players. A PGA may be able to play games autonomously, e.g., when the associated player is at a different location and/or is not aware of the PGA's current activities. Real players and PGAs may play individually, competitively and/or in teams.

Accordingly, some implementations of the invention provide a gaming method that includes the steps of determining gaming characteristics of a player and configuring a player gaming agent for autonomous gaming operations according to the gaming characteristics of the player. The determining step may involve providing a graphical user interface ("GUI") and receiving data regarding gaming characteristics of the player that are input via the GUI. Alternatively, or additionally, the determining step may involve recording gaming characteristic information while the player is playing games and/or analyzing player tracking data.

The gaming agent may be configured to perform gaming operations that have previously been identified by the player. In some implementations, the gaming agent is configured to perform autonomous gaming operations by applying a set of rules based on the gaming characteristics of the player. The gaming agent can be configured to negotiate with super game agents that are configured to act on behalf of gaming establishments.

The gaming agent may be configured to access funds that the player has made available for gaming. The autonomous gaming operations may be constrained according to at least one predetermined control criterion. For example, one predetermined control criterion can be an amount of money that the gaming agent is permitted to spend within a predetermined time period.

The method may include these steps: creating a digital certificate for the gaming agent; storing the digital certificate; and authenticating the gaming agent according to the stored digital certificate prior to the gaming agent's autonomous gaming operations. The method may also include these steps: saving the first results of a first session of autonomous gaming operations involving a first portion of an activity sequence at a first time; retrieving the first results at a second time; and performing a second session of autonomous gaming operations involving a second portion of the activity sequence.

The gaming agent may perform gaming operations in a first location when the player is in a second location. The first location may be within a first jurisdiction having a first set of gaming regulations and the second location may be within a second jurisdiction having a second set of gaming regulations. The gaming operations may be legal according to the first set of gaming regulations but not legal according to the second set of gaming regulations. If so, the determining and configuring steps are preferably performed within the first jurisdiction.

The gaming agent may be configured to transmit gaming data to the player. The gaming data may comprise gaming result data. In some implementations, the gaming data may comprise a reproduction of at least part of a gaming session. The reproduction may be a video, a still image and/or an audio clip. The reproduction may be received at a first time, stored and reproduced at a second time. For example, the reproduction may comprise a video and the reproducing step may involve playing the video.

In some implementations of the invention, the gaming agent can perform gaming operations more effectively if a predetermined criterion is satisfied. For example, the gaming agent may perform gaming operations more effectively due to an improved pay table percentage, may advance to a higher level of an activity sequence (e.g., a sequence of wagering games), etc. The predetermined criterion may be, e.g., a number of games played, a time of performing gaming operations, an amount of money wagered by the gaming agent, an average balance of an account accessible by the gaming agent and/or a minimum balance of an account accessible by the gaming agent.

As noted elsewhere, the gaming agent may be part of a team of gaming agents. In some such implementations, the predetermined criterion can be a measure of the team's progress. For example, when the gaming agent's team exceeds the predetermined criterion, the gaming agent's team may be advanced in an activity sequence.

Alternative gaming methods are provided by the present invention. One such method involves: forming a communication link between a device and a server; enabling a player to participate in an sequence of activities performed in more than one location and based, at least in part, on information received from the server.

The information received from the server may be, for example, information regarding the player's progress in the sequence of activities. The information received from the server may be information regarding the player's progress during a current gaming session. However, the information received from the server could be information regarding the player's progress during a previous gaming session. This information may have been stored after a previous session so that a player could continue the sequence of activities at a later time.

The sequence of activities may involve at least one wagering game. The method can involve awarding a prize to at least one player who completes the sequence of activities. The prize may be in addition to any prize obtainable by completing only an individual activity of the sequence of activities.

According to some such methods, at least one location is a virtual location. The sequence of activities may involve at least one virtual activity in the virtual location. The virtual activity may involve a virtual player having an unique ID. The unique ID and virtual player parameters may be stored in a remote storage device accessible by the server. The virtual player parameters may relate to the virtual player's progress in the sequence of activities, virtual player abilities, an upgrade cost for upgrading virtual player abilities, types of activities in which a virtual player can participate, a cost of participation in such activities and/or to virtual player experience level.

The enabling step may involve presenting at least a portion of the sequence of activities on a gaming machine. For example, the enabling step may comprise presenting a sequence of games (e.g., wagering games) at a single gaming machine. At least one wagering game may involve generating a random number. The method may involve saving the random number in a local storage device accessible by the gaming machine and also in a remote storage device accessible by the server.

The sequence of activities may involve at least one role playing adventure. For example, the role playing adventure may be a military adventure, a financial district adventure and/or a daredevil adventure. The enabling step may involve enabling the player to participate in a team that attempts to complete the sequence of activities.

Some embodiments of the invention provide a gaming device, comprising at least one network interface and at least one logic device configured to determine gaming characteristics of a player and to configure a player gaming agent for autonomous gaming operations according to the gaming characteristics of the player. The gaming device may be, for example a server, a host device or a gaming machine.

A logic device may determine the gaming characteristics, at least in part, by analyzing player tracking data. Alternatively, a logic device may determine the gaming characteristics, at least in part, by receiving data input by a player and/or by analyzing player tracking data.

Some implementations of the invention provide software stored in a machine readable medium. The software includes instructions for controlling at least one device in a gaming network to perform gaming operations by applying a set of rules based on gaming characteristics of a player. The software may also include instructions for obtaining funds from an account of a financial institution. Preferably, such software further comprises rules for limiting the obtaining of funds from an account of a financial institution.

Yet other implementations of the invention provide a gaming method that includes these steps: receiving first registration data regarding a first plurality of player gaming agents configured for autonomous gaming operations; storing the first registration data; receiving a first request regarding an identity of a player gaming agent; authenticating a first requester that transmitted the first request; and determining whether the first registration data include first requested registration data responsive to the first request. The first requested registration data will be provided to the requester when it is determined that the first registration data include first requested registration data responsive to the first request.

The gaming method may also include these steps: receiving second registration data regarding a second plurality of super gaming agents configured for interaction with player gaming agents; storing the second registration data; receiving a second request regarding an identity of a super gaming agent; authenticating a second requester that transmitted the second request; and determining whether the second registration data include second requested registration data responsive to the second request. The second requested registration data will be provided to the second requester when it is determined that the second registration data include second requested registration data responsive to the second request.

The present invention provides hardware (such as gaming machines, network devices and components of such devices) that is configured to perform the methods of the invention, as well as software to control devices to perform these and other methods.

These and other features of the present invention will be presented in more detail in the following detailed description of the invention and the associated figures.

BRIEF DESCRIPTION OF THE DRAWINGS

FIG. 10 depicts an exemplary video display that may be provided to a player during performance of the slots routine of FIG. 12;

FIG. 11 depicts an exemplary video display that may be provided to a player during performance of the video keno routine of FIG. 13;

DETAILED DESCRIPTION OF VARIOUS EMBODIMENTS

Although the following text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

The present invention provides methods and devices for various types of adventure sequences that preferably involve, at least in part, wagering games. Such sequences may involve wagering and/or other games at a plurality of gaming devices, tables and/or gaming establishments. Some implementations provide a virtual gaming experience wherein one or more other environments (e.g., environments that include gaming establishments) are simulated at a single location. The location may be, for example, a gaming machine of a first gaming establishment and the simulated environments may include other gaming establishments and games not available at the first gaming establishment. Accordingly, some implementations of the invention provide emulation and game licensing, when necessary.

However, adventure sequences described herein may comprise stages in one or more real and/or virtual environments, in any convenient sequence or combination. The real or virtual adventure stages may involve a variety of other activities aside from, or in addition to, games of chance, such as racing, combat, acrobatic activities, rock climbing, bungee jumping, sports, treasure hunts, quests, etc. The adventure stages may include individual play and/or team play. Providing virtual adventure stages allows a player to be safely entertained while enjoying activities that would be extremely dangerous (or even impossible) in real life, while remaining in a single location (e.g., a gaming establishment).

Figure 1:
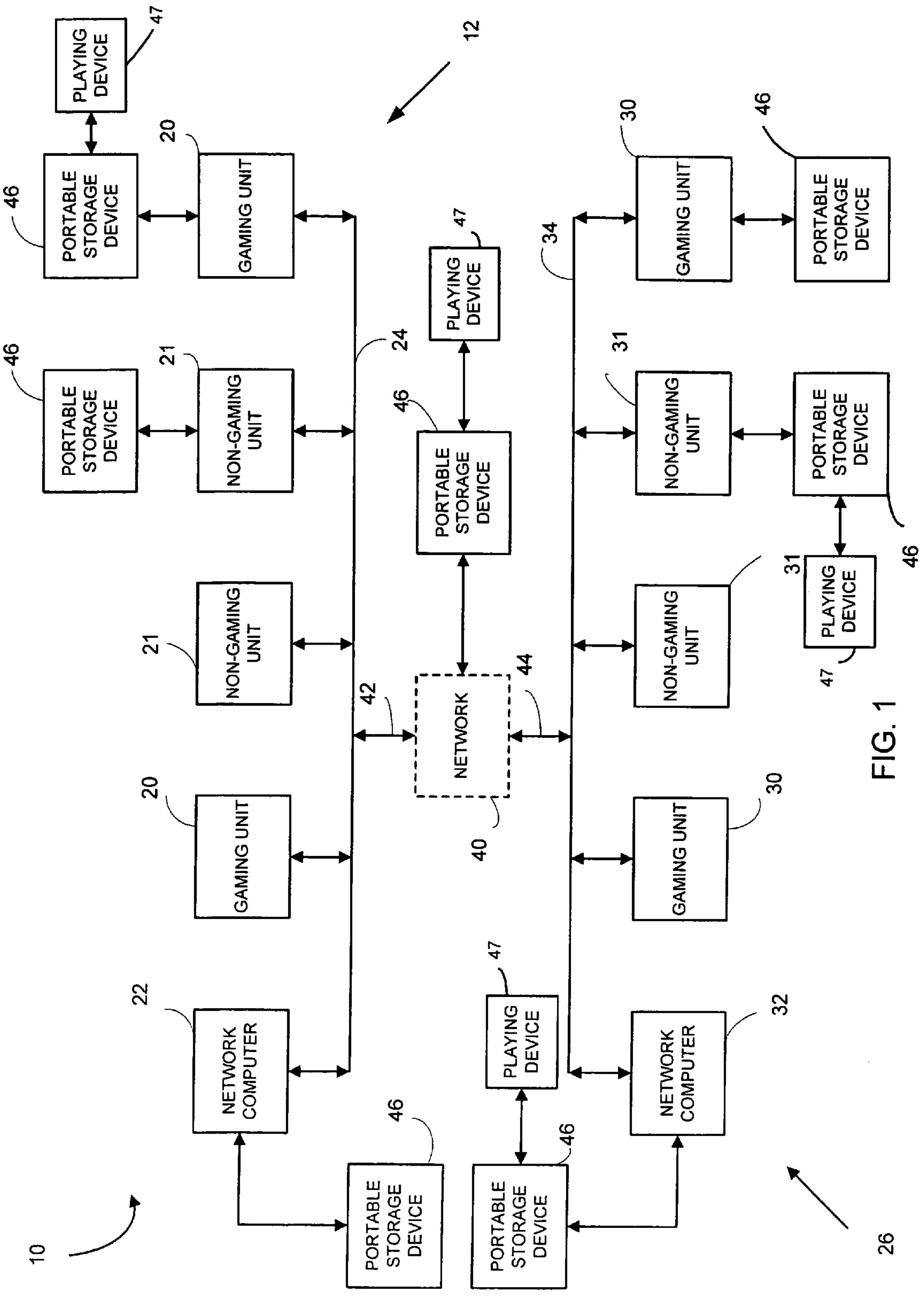
FIG. 1 is an exemplary schematic block diagram of a gaming system that may be used to carry out sequential gaming activities.

FIG. 1 is an exemplary schematic block diagram of a gaming system 10 that may be used to carry out some adventure sequence activities described herein. As shown in FIG. 1, the gaming system 10 may include a first group or network 12 of casino gaming units 20 and non-gaming units 21 operatively coupled to a server or network computer 22 via a network data link or bus 24. The gaming system 10 may also include a second group or network 26 of casino gaming units 30 and non-gaming units 31 operatively coupled to a server or network computer 32 via a network data link or bus 34. The first and second gaming networks 12 and 26 may be operatively coupled to each other via a network 40, which may comprise, for example, the Internet, a wide area network (WAN) or a local area network (LAN) via a first network link 42 and a second network link 44. The various networks shown in FIG. 1 may use any suitable communication media and protocol. For example, the networks 24, 34 and 40 may use any combination of hardwired (i.e., electrically conductive wire or cable, fiber optic, etc.) or wireless (e.g., cellular, satellite, etc.) transmission media. Additionally, the networks 24, 34 and 40 may use any desired communication protocol such as, for example, TCP/IP.

The first network 12 of units 20 and 21 may be provided in a first venue or casino, and the second network 26 of units 30 and 31 may be provided in a second venue or casino, which may be located in a separate geographic location from the first casino. The non gaming units 21 and 31 may also be located anywhere outside of the casino, being limited only by the ability of the player to access the non-gaming units 21 and 31. For example, the two casinos may be located in different areas of the same city, or the casinos may be located in different states or countries. However, the non-gaming units 21 and 31 may be located in a wholly separate locations from either of the casinos. The network 40 may include a plurality of network computers or server computers (not shown), each of which may be operatively interconnected. Where the network 40 is Internet-based, data communications may take place over the communication links 42 and 44 using an Internet communication protocol such as, for example, TCP/IP. Of course, while two networks of gaming units are shown in FIG. 1, more or fewer networks of gaming units may be used within the gaming system 10, if desired.

The network computer 22 may be a server computer and may be used to accumulate and analyze data relating to the operation of the gaming units 20 and non-gaming units 21 and, if desired, the operation of any other gaming units or devices within the system 10. Generally speaking, the network computer 22 may continuously receive data from each of the gaming units 20 indicative of the dollar amount and number of wagers made on each of the gaming units 20, data indicative of how much each of the gaming units 20 pays out in winnings, data regarding the identity and gaming habits of players playing each of the gaming units 20, etc. Similarly, the network computer 22 may continuously communicate with each of the non-gaming units 21, regarding adventure information such as data indicative of the location of a player, data indicative of non-gaming activity status or data indicative of the sequence of an adventure, or the like. The network computer 32 may be a server computer and may be used to perform the same or different functions in relation to the gaming units 30 and non-gaming units 31 (or any other gaming or non-gaming units within the system 10) as the network computer 22 described above.

Although each of the networks 12 and 26 is shown to include one of the respective network computers 22 and 32, two of the respective gaming units 20 and 30, and two of the respective non-gaming units 21 and 31, different numbers of computers, gaming units, and non-gaming units may be utilized instead. For example, the network 12 may include a plurality of network computers 22 and tens or hundreds of gaming units 20, all of which may be interconnected via the network data link or bus 24. Although the network data link 24 is shown as a single data link, the network data link 24 may include multiple data links.

As described in greater detail herein, players may interact with the gaming system 10 using a portable data storage device 46. The portable data storage device 46 may be implemented using, for example, a magnetic stripe card, a smart card, a smart PIN device, a radio frequency identification ("RFID") card or similar RFID device, a memory stick, a special key PIN entry, a personal data assistant (PDA), a cellular phone, an iPod® or any other device or system capable of storing information relating to a player. U.S. patent application Ser. No. 09/718,974, entitled "EZ Pay Smart Card and Ticket System" and filed on Nov. 22, 2000, describes relevant technology and is hereby incorporated by reference for all purposes. The portable data storage device 46 will communicate with the gaming system 10 according to the capabilities of the portable data storage device 46 and the requirements of the particular implementation. For example, some gaming units (or non-gaming units) may include a card reader, RFID reader, a USB port or a similar device for communicating with some types of portable data storage device 46. Other portable data storage devices 46 can communicate with gaming system 10 via network 40, e.g., via a cellular telephone network, via a wireless link, via a personal computer inside or outside of venues 12 and 26, or in any other convenient fashion.

Information stored on the portable data storage device 46 may include a unique identifier that may be used by the system 10 to determine the identity of the person associated with the storage device 46. The system 10 may also use the unique identifier stored on the storage device 46 to track the activities of the player using the storage device 46. Further, the portable data storage device 46 may store information pertaining to accumulated bonus points (e.g., the result of a player's activities at one or more gaming devices), rewards or other incentives, promotional items, a game identifier, a gaming machine identifier, last use statistics, etc. In some implementations, such information may be communicated to another networked device, such as a player tracking server or an associated storage device. U.S. patent application Ser. No. 11/038,330, entitled "PERSISTENT THEMED BONUS AWARDS FOR GAMING MACHINES" and filed on Jan. 18, 2005, contains relevant information and is hereby incorporated by reference. Still further, the portable storage device may be able to store and communicate information relative to an adventure such as clues, locations, directions, sequences, instructions, etc.

The adventure may also include one or more playing devices 47 that may be designed to monitor, facilitate and to perhaps communicate the details regarding the non-gaming activities between the playing device 47, the system 10, and/or the portable storage device 46. As used herein, the terms "non-gaming activities" and the like should be broadly construed to mean activities other than wagering games. Non-gaming activities may include a wide range of activities/adventures, including but not limited to games that are not wagering games. Accordingly, non-gaming units may be various types of devices according to the type of non-gaming activity involved. The relevant non-gaming units will facilitate such play and/or measure a player's performance.

For example, some adventure sequences may include games in which one player competes against another player, teams of players compete against one another and/or players compete against avatars, etc., generated by a logic device (e.g. of a server). Some such adventure sequences may include combat and/or quest games such as Halo®, one of the EverQuest® games (e.g., Escape to Norrath™, Depths of Darkhollow™, Dragons of Norrath™, Champions of Norrath™, etc.) CounterStrike™, Half-Life 2™, etc. If the non-gaming activity involves such non-wagering games, a non-gaming unit may be (or may include) one or more devices with which such games may be played, e.g., a personal computer, a cellular telephone, a PDA, a PlayStation®2, an Xbox™, an arcade gaming device, etc.

Gaming units and non-gaming units may comprise hardware and/or software for providing an immersive or virtual reality experience. For example, a non-gaming unit may include peripheral devices adapted for use with other non-gaming units or components thereof, such as wired or wireless 3-D glasses, head-mounted displays, body motion sensing products such as "head tracker" products, mid-air joysticks, force feedback products, etc. Some such products may be obtained from eDimensional Inc., Tek Gear, Total Immersion and other vendors. Another device for creating such an immersive environment, known as the VirtuSphere™, allows a user to control a virtual reality simulation not only by moving his or her head and/or hand(s) by also by walking inside a spherical cage.

In some implementations of the invention, the same device (or combination of devices) may be used for both gaming and non-gaming activities. For example, one or more devices for providing an immersive or virtual reality experience may be used in combination with a gaming machine to provide a simulation of being at another location (including, but not limited to, another gaming establishment) as part of an adventure sequence. As described in more detail below, an adventure may include gaming activities and/or non-gaming activities that involve virtual reality experiences.

Other types of non-gaming units may be (or may include) one or more devices for sensing, measuring and/or communicating metrics that are significant for other corresponding non-gaming activities. For example, if the non-gaming activity involves a race, the non-gaming unit may include a device for determining who won the race (e.g., a still camera or a video camera), a device for measuring speed or acceleration, etc. If the non-gaming activity involves the location of one or more players (e.g., a treasure hunt or the like), the non-gaming unit may include a device for determining such location(s), e.g., a Global Positioning System ("GPS") device. Non-gaming units may comprise communication devices such as cellular telephones, 2-way radios, headsets or the like for, inter alia, communication between members of a team of players.

The playing device 47, like the non-gaming units, may run the gamut of the possible devices, including, but not limited to, a global positioning system (GPS) device, a metal detector, a sensing device, a kiosk, a non-gaming unit, a PDA, a cellular telephone, a decoder, a scanner, and a lock and/or key. The playing device 47 may be used in a variety of ways, but more specifically maybe used in conjunction with a non-gaming or gaming device. Some types of playing device 47 include at least one component, such as a transceiver, a port, etc., for communicating with one or more elements of gaming system 10. For example, some playing devices 47 can communicate directly with a portable storage device 46, a gaming unit or a non-gaming unit via a cable or a wireless link. Some playing devices 47 are configured to access gaming system 10 via one or more public networks such as the Internet, a cellular telephone network or the like. In some implementations, devices 46 and 47 may be combined into a single unit.

Figure 2:
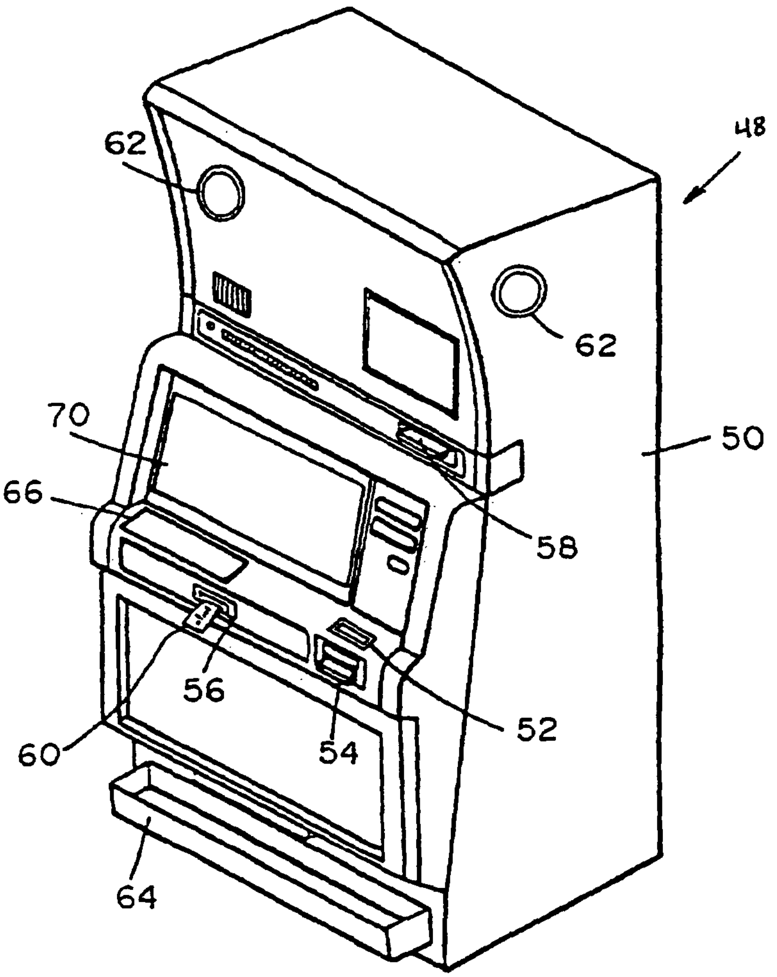
FIG. 2 is an exemplary perspective view of a gaming unit that may be used within the system shown in FIG. 1.

FIG. 2 is an exemplary perspective view of a gaming unit 48 that may be used within the gaming system 10 shown in FIG. 1. Although the following description addresses the design of the gaming unit 48, one or more of the gaming units 20 and 30 may have the same design as the gaming unit 48 described below. Additionally, the design of one or more of the gaming units 20 may be different than the design of other gaming units 20, and the design of one or more of the gaming units 30 may be different than the design of other gaming units 30. Thus, each gaming unit 20 may be any type of casino gaming unit and may have various different structures and methods of operation. For exemplary purposes, various designs of the gaming units 20 and 30 are described below in connection with the gaming unit 48 shown in FIG. 2. However, numerous other designs may be utilized instead.

Referring to FIG. 2, the casino gaming unit 48 may include a housing or cabinet 50 and one or more input devices, which may include a coin slot or acceptor 52, a paper currency acceptor 54, a ticket reader/printer 56 and a card reader 58, which may be used to input value to the gaming unit 48.

The gaming unit 48 may include the ticket reader/printer 56 may be used to read and/or print or otherwise encode ticket vouchers 60. The ticket vouchers 60 may be composed of paper or another printable or encodable material and may have one or more of the following informational items printed or encoded thereon: the casino name, the type of ticket voucher, a validation number, a bar code with control and/or security data, the date and time of issuance of the ticket voucher, redemption instructions and restrictions, a description of an award, clue, sequence, location, instruction, direction and any other information that may be necessary or desirable. Different types of ticket vouchers 60 could be used, such as bonus ticket vouchers, cash-redemption ticket vouchers, casino chip ticket vouchers, extra game play ticket vouchers, merchandise ticket vouchers, restaurant ticket vouchers, show ticket vouchers, etc. The ticket vouchers 60 could be printed with an optically readable material such as ink, or data on the ticket vouchers 60 could be magnetically encoded. The ticket reader/printer 56 may be provided with the ability to both read and print ticket vouchers 60, or it may be provided with the ability to only read or only print or encode ticket vouchers 60. In the latter case, for example, some of the gaming units 20 may have ticket printers 56 that may be used to print ticket vouchers 60, which could then be used by a player in other gaming units 20 and non-gaming units 21 that have ticket readers 56.

If provided, the card reader 58 may include any type of card reading device, such as a magnetic card reader or an optical card reader, and may be used to read data from a card offered by a player, such as a credit card or a player tracking card, a smart card, etc. If provided for player tracking purposes, the card reader 58 may be used to read data from, and/or to write data to, for example, the portable data storage device 46 (FIG. 1), which may include information or data representing the identity of a player, the identity of a casino, the player's gaming habits, the identity and/or location of a particular gaming device, etc. Of course, the gaming device 48 may alternatively or additionally include an interface specifically configured to interface with particular types of portable data storage devices 46 (not shown) such as, for example, a PDA, a smart PIN device, etc. In any event, the player may use either the card reader 58 or some other interface, if provided, to communicatively couple the portable data storage device 46 (FIG. 1) to the gaming device 48 which, in turn, enables one or more of the network computers 22 and 32 and/or the network 40 to exchange information with the portable data storage device 46. Thus, the casino gaming unit 48 may provide a way for a player to provide personal information relating to their identity, play history or statistics, etc. to the system 10 and a way for the player to send and receive a variety of information or data and/or value to and from the system 10 such as, for example, promotional incentives, cash or game play bonuses, loyalty incentives, etc.

Furthermore, the card reader 58 or other input device or interface may enable the player to transfer monetary value to and to receive monetary value from the gaming device 48 and system 10. The gaming device 48 may include any other value input device desired. Generally speaking, a value input device may include any device that can accept value from a customer. As used herein, the term "value" may encompass gaming tokens, coins, paper currency, ticket vouchers, credit or debit cards, and any other object representative of value.

The gaming unit 48 may include one or more audio speakers 62, a coin payout tray 64, an input control panel 66, and a color video display unit 70 for displaying images relating to the game or games provided by the gaming unit 48. The audio speakers 62 may generate audio representing sounds such as the noise of spinning slot machine reels, a dealer's voice, music, announcement or any other audio related to a casino game. The audio may include messages, promotional incentives and other types of messages that, if desired, have been personalized for a particular user. Additionally, the input control panel 66 may be provided with a plurality of pushbuttons or touch-sensitive areas that may be pressed by a player to select games, make wagers, make gaming decisions, etc.

Figure 2A:
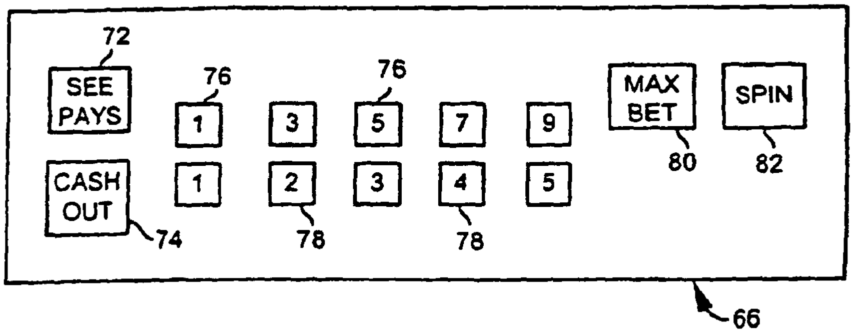
FIG. 2A is an exemplary diagrammatic view of a control panel for a gaming unit.

FIG. 2A is an exemplary diagrammatic view that depicts one possible configuration of the control panel 66, which may be used where the gaming unit 48 is a slot machine having a plurality of mechanical or "virtual" reels. As shown in FIG. 2A, the control panel 66 may include a "See Pays" button 72 that, when activated, causes the display unit 70 to generate one or more display screens showing the odds or payout information for the game or games provided by the gaming unit 48. As used herein, the term "button" encompasses any device or system that allows a player to make an input, such as an input device that must be depressed to make an input selection or a display area that a player may simply touch to effect an input selection. The control panel 66 may include a “Cash Out” button 74 that may be activated when a player decides to terminate play on the gaming unit 48, in which case the gaming unit 48 may return value to the player, such as by returning a number of coins to the player via the payout tray 64.

If the gaming unit 48 provides a slots game having a plurality of reels and a plurality of paylines that define winning combinations of reel symbols, the control panel 66 may be provided with a plurality of selection buttons 76, each of which allows the player to select a different number of paylines prior to spinning the reels. For example, five buttons 76 may be provided, each of which may allow a player to select one, three, five, seven or nine paylines.

If the gaming unit 48 provides a slots game having a plurality of reels, the control panel 66 may be provided with a plurality of selection buttons 78 each of which allows a player to specify a wager amount for each payline selected. For example, if the smallest wager accepted by the gaming unit 48 is a quarter ($0.25), the gaming unit 48 may be provided with five selection buttons 78, each of which may allow a player to select one, two, three, four or five quarters to wager for each payline selected. In that case, if a player were to activate the “5” button 76 (meaning that five paylines were to be played on the next spin of the reels) and then activate the “3” button 78 (meaning that three coins per payline were to be wagered), the total wager would be $3.75 (assuming the minimum bet was $0.25).

The control panel 66 may include a “Max Bet” button 80 that enables a player to make the maximum wager allowable for a game. In the above example, where up to nine paylines were provided and up to five quarters could be wagered for each payline selected, the maximum allowable wager would be 45 quarters, or $11.25. The control panel 66 may include a spin button 82 to allow the player to initiate spinning of the reels of a slots game after a wager has been made.

In FIG. 2A, a rectangle shown around the buttons 72, 74, 76, 78, 80 and 82 designates an area in which the buttons 72, 74, 76, 78, 80 and 82 may be located. Consequently, the term “control panel” should not be construed to imply that a panel or plate separate from the housing 50 of the gaming unit 20 is required, and the term “control panel” may encompass a plurality or grouping of player-activated buttons.

Although one possible control panel 66 is described above, different buttons could be utilized instead in the control panel 66, and the particular buttons used may depend on the game, games or activity that could be played on or with the gaming unit 48. Although the control panel 66 is shown as being separate from the display unit 70, the control panel 66 may be generated by the display unit 70. In that case, each of the buttons of the control panel 66 may be a colored area generated by the display unit 70 and some type of mechanism may be associated with the display unit 70 to detect when each of the buttons are touched, such as a touch-sensitive screen.

Gaming Unit Electronics

Figure 3:
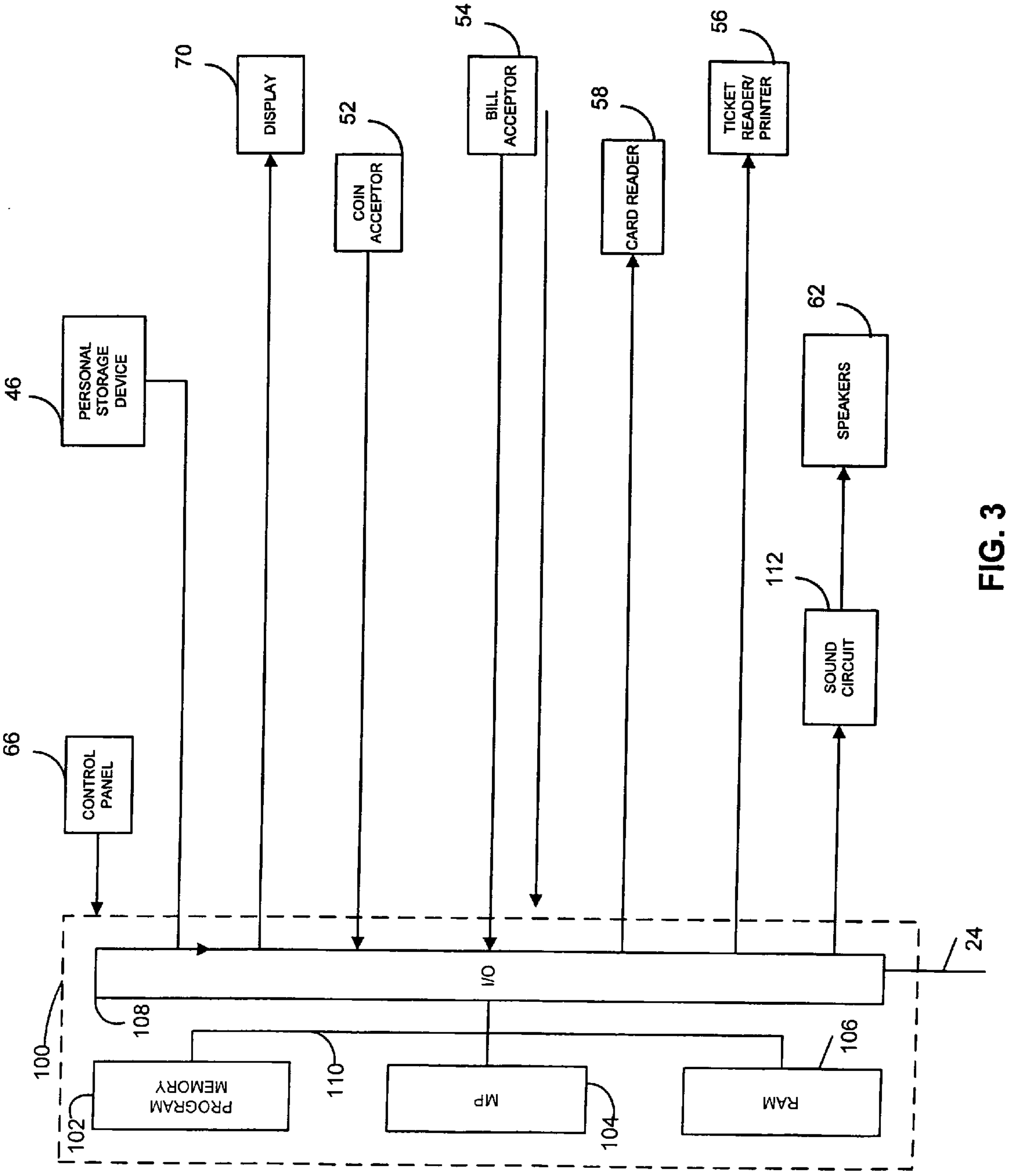
FIG. 3 is an exemplary schematic block diagram that depicts one manner in which the electronic components of the gaming unit of FIG. 2 may be configured.

FIG. 3 is an exemplary schematic block diagram that depicts one manner in which the electronic components of the gaming unit 48 of FIG. 2 may be configured. Referring to FIG. 3, the gaming unit 48 may include a controller 100 that may include a program memory 102, a microcontroller or microprocessor (MP) 104, a random-access memory (RAM) 106 and an input/output (I/O) circuit 108, all of which may be interconnected via an address/data bus 110. Although only one microprocessor 104 is shown, the controller 100 could include multiple microprocessors 104 if desired. Similarly, the memory of the controller 100 may include multiple RAMs 106 and multiple program memories 102. Although the I/O circuit 108 is shown as a single block, the I/O circuit 108 may include a number of different types of I/O circuits. The RAM(s) 104 and program memories 102 may be implemented as semiconductor memories, magnetically readable memories, and/or optically readable memories, for example.

FIG. 3 illustrates that the portable storage device 46, the display 70, the control panel 66, the coin acceptor 52, the bill acceptor 54, the card reader 58 and the ticket reader/printer 56 may be operatively coupled to the I/O circuit 108, each of those components being so coupled by either a unidirectional or bidirectional, single-line or multiple-line data link, which may depend on the design of the component that is used. The speaker(s) 62 may be operatively coupled to a sound circuit 112, which may include a voice-synthesis and sound-synthesis circuit or a driver circuit. The sound-generating circuit 112 may be coupled to the I/O circuit 108.

As shown in FIG. 3, the components 46, 52, 54, 56, 58, 66, 70 and 112 may be connected to the I/O circuit 108 via a respective direct line or conductor. However, different connection schemes could be used instead. For example, one or more of the components shown in FIG. 3 may be connected to the I/O circuit 108 via a common bus or other data link that is shared by a number of components. Furthermore, some of the components may be directly connected to the microprocessor 104 without passing through the I/O circuit 108.

Some preferred gaming machines of the present assignee are implemented with special features and/or additional circuitry that differentiates them from general-purpose computers (e.g., desktop PC’s and laptops). Gaming machines are highly regulated to ensure fairness and, in many cases, gaming machines are operable to dispense monetary awards of multiple millions of dollars. Therefore, to satisfy security and regulatory requirements in a gaming environment, hardware and software architectures may be implemented in gaming machines that differ significantly from those of general-purpose computers. A description of gaming machines relative to general-purpose computing machines and some examples of the additional (or different) components and features found in gaming machines are described below.

At first glance, one might think that adapting PC technologies to the gaming industry would be a simple proposition because both PCs and gaming machines employ microprocessors that control a variety of devices. However, because of such reasons as 1) the regulatory requirements that are placed upon gaming machines, 2) the harsh environment in which gaming machines operate, 3) security requirements and 4) fault tolerance requirements, adapting PC technologies to a gaming machine can be quite difficult. Further, techniques and methods for solving a problem in the PC industry, such as device compatibility and connectivity issues, might not be adequate in the gaming environment. For instance, a fault or a weakness tolerated in a PC, such as security holes in software or frequent crashes, may not be tolerated in a gaming machine because in a gaming machine these faults can lead to a direct loss of funds from the gaming machine, such as stolen cash or loss of revenue when the gaming machine is not operating properly.

For the purposes of illustration, a few differences between PC systems and gaming systems will be described. A first difference between gaming machines and common PC based computers systems is that gaming machines are designed to be state-based systems. In a state-based system, the system stores and maintains its current state in a non-volatile memory, such that, in the event of a power failure or other malfunction the gaming machine will return to its current state when the power is restored. For instance, if a player was shown an award for a game of chance and, before the award could be provided to the player the power failed, the gaming machine, upon the restoration of power, would return to the state where the award is indicated. As anyone who has used a PC, knows, PCs are not state machines and a majority of data is usually lost when a malfunction occurs. This requirement affects the software and hardware design on a gaming machine.

A second important difference between gaming machines and common PC based computer systems is that for regulation purposes, the software on the gaming machine used to generate the game of chance and operate the gaming machine has been designed to be static and monolithic to prevent cheating by the operator of gaming machine. For instance, one solution that has been employed in the gaming industry to prevent cheating and satisfy regulatory requirements has been to manufacture a gaming machine that can use a proprietary processor running instructions to generate the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used by the master gaming controller to operate a device during generation of the game of chance can require a new EPROM to be burnt, approved by the gaming jurisdiction and reinstalled on the gaming machine in the presence of a gaming regulator. Regardless of whether the EPROM solution is used, to gain approval in most gaming jurisdictions, a gaming machine must demonstrate sufficient safeguards that prevent an operator or player of a gaming machine from manipulating hardware and software in a manner that gives them an unfair and some cases an illegal advantage. The gaming machine should have a means to determine if the code it will execute is valid. If the code is not valid, the gaming machine must have a means to prevent the code from being executed. The code validation requirements in the gaming industry affect both hardware and software designs on gaming machines.

A third important difference between gaming machines and common PC based computer systems is the number and kinds of peripheral devices used on a gaming machine are not as great as on PC based computer systems. Traditionally, in the gaming industry, gaming machines have been relatively simple in the sense that the number of peripheral devices and the number of functions the gaming machine has been limited. Further, in operation, the functionality of gaming machines were relatively constant once the gaming machine was deployed, i.e., new peripherals devices and new gaming software were infrequently added to the gaming machine. This differs from a PC where users will go out and buy different combinations of devices and software from different manufacturers and connect them to a PC to suit their needs depending on a desired application. Therefore, the types of devices connected to a PC may vary greatly from user to user depending in their individual requirements and may vary significantly over time.

Although the variety of devices available for a PC may be greater than on a gaming machine, gaming machines still have unique device requirements that differ from a PC, such as device security requirements not usually addressed by PCs. For instance, monetary devices, such as coin dispensers, bill validators and ticket printers and computing devices that are used to govern the input and output of cash to a gaming machine have security requirements that are not typically addressed in PCs. Therefore, many PC techniques and methods developed to facilitate device connectivity and device compatibility do not address the emphasis placed on security in the gaming industry.

To address some of the issues described above, a number of hardware/software components and architectures are utilized in gaming machines that are not typically found in general purpose computing devices, such as PCs. These hardware/software components and architectures, as described below in more detail, include but are not limited to watchdog timers, voltage monitoring systems, state-based software architecture and supporting hardware, specialized communication interfaces, security monitoring and trusted memory.

A watchdog timer is normally used in IGT gaming machines to provide a software failure detection mechanism. In a normally operating system, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits contain a loadable timeout counter register to allow the operating software to set the timeout interval within a certain range of time. A differentiating feature of the some preferred circuits is that the operating software cannot completely disable the function of the watchdog timer. In other words, the watchdog timer always functions from the time power is applied to the board.

IGT gaming computer platforms preferably use several power supply voltages to operate portions of the computer circuitry. These can be generated in a central power supply or locally on the computer board. If any of these voltages falls out of the tolerance limits of the circuitry they power, unpredictable operation of the computer may result. Though most modern general-purpose computers include voltage monitoring circuitry, these types of circuits only report voltage status to the operating software. Out of tolerance voltages can cause software malfunction, creating a potential uncontrolled condition in the gaming computer. Gaming machines of the present assignee typically have power supplies with tighter voltage margins than that required by the operating circuitry. In addition, the voltage monitoring circuitry implemented in IGT gaming computers typically has two thresholds of control. The first threshold generates a software event that can be detected by the operating software and an error condition generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the computer.

The standard method of operation for IGT slot machine game software is to use a state machine. Different functions of the game (bet, play, result, points in the graphical presentation, etc.) may be defined as a state. When a game moves from one state to another, critical data regarding the game software is stored in a custom non-volatile memory subsystem. This is critical to ensure the player's wager and credits are preserved and to minimize potential disputes in the event of a malfunction on the gaming machine.

In general, the gaming machine does not advance from a first state to a second state until critical information that allows the first state to be reconstructed is stored. This feature allows the game to recover operation to the current state of play in the event of a malfunction, loss of power, etc that occurred just prior to the malfunction. After the state of the gaming machine is restored during the play of a game of chance, game play may resume and the game may be completed in a manner that is no different than if the malfunction had not occurred. Typically, battery backed RAM devices are used to preserve this critical data although other types of non-volatile memory devices may be employed. These memory devices are not used in typical general-purpose computers.

As described in the preceding paragraph, when a malfunction occurs during a game of chance, the gaming machine may be restored to a state in the game of chance just prior to when the malfunction occurred. The restored state may include metering information and graphical information that was displayed on the gaming machine in the state prior to the malfunction. For example, when the malfunction occurs during the play of a card game after the cards have been dealt, the gaming machine may be restored with the cards that were previously displayed as part of the card game. As another example, a bonus game may be triggered during the play of a game of chance where a player is required to make a number of selections on a video display screen. When a malfunction has occurred after the player has made one or more selections, the gaming machine may be restored to a state that shows the graphical presentation at the just prior to the malfunction including an indication of selections that have already been made by the player. In general, the gaming machine may be restored to any state in a plurality of states that occur in the game of chance that occurs while the game of chance is played or to states that occur between the play of a game of chance.

Game history information regarding previous games played such as an amount wagered, the outcome of the game and so forth may also be stored in a non-volatile memory device. The information stored in the non-volatile memory may be detailed enough to reconstruct a portion of the graphical presentation that was previously presented on the gaming machine and the state of the gaming machine (e.g., credits) at the time the game of chance was played. The game history information may be utilized in the event of a dispute. For example, a player may decide that in a previous game of chance that they did not receive credit for an award that they believed they won. The game history information may be used to reconstruct the state of the gaming machine prior, during and/or after the disputed game to demonstrate whether the player was correct or not in their assertion.

Another feature of gaming machines, such as IGT gaming computers, is that they often contain unique interfaces, including serial interfaces, to connect to specific subsystems internal and external to the slot machine. The serial devices may have electrical interface requirements that differ from the "standard" EIA 232 serial interfaces provided by general-purpose computers. These interfaces may include EIA 485, EIA 422, Fiber Optic Serial, optically coupled serial interfaces, current loop style serial interfaces, etc. In addition, to conserve serial interfaces internally in the slot machine, serial devices may be connected in a shared, daisy-chain fashion where multiple peripheral devices are connected to a single serial channel.

The serial interfaces may be used to transmit information using communication protocols that are unique to the gaming industry. For example, IGT's Netplex is a proprietary communication protocol used for serial communication between gaming devices. As another example, SAS is a communication protocol used to transmit information, such as metering information, from a gaming machine to a remote device. Often SAS is used in conjunction with a player tracking system.

IGT gaming machines may alternatively be treated as peripheral devices to a casino communication controller and connected in a shared daisy chain fashion to a single serial interface. In both cases, the peripheral devices are preferably assigned device addresses. If so, the serial controller circuitry must implement a method to generate or detect unique device addresses. General-purpose computer serial ports are not able to do this.

Security monitoring circuits detect intrusion into an IGT gaming machine by monitoring security switches attached to access doors in the slot machine cabinet. Preferably, access violations result in suspension of game play and can trigger additional security operations to preserve the current state of game play. These circuits also function when power is off by use of a battery backup. In power-off operation, these circuits continue to monitor the access doors of the slot machine. When power is restored, the gaming machine can determine whether any security violations occurred while power was off, e.g., via software for reading status registers. This can trigger event log entries and further data authentication operations by the slot machine software.

Trusted memory devices are preferably included in an IGT gaming machine computer to ensure the authenticity of the software that may be stored on less secure memory subsystems, such as mass storage devices. Trusted memory devices and controlling circuitry are typically designed to not allow modification of the code and data stored in the memory device while the memory device is installed in the slot machine. The code and data stored in these devices may include authentication algorithms, random number generators, authentication keys, operating system kernels, etc. The purpose of these trusted memory devices is to provide gaming regulatory authorities a root trusted authority within the computing environment of the slot machine that can be tracked and verified as original. This may be accomplished via removal of the trusted memory device from the slot machine computer and verification of the secure memory device contents is a separate third party verification device. Once the trusted memory device is verified as authentic, and based on the approval of the verification algorithms contained in the trusted device, the gaming machine is allowed to verify the authenticity of additional code and data that may be located in the gaming computer assembly, such as code and data stored on hard disk drives. A few details related to trusted memory devices that may be used in the present invention are described in U.S. Pat. No. 6,685,567 from U.S. patent application Ser. No. 09/925,098, filed Aug. 8, 2001 and titled "Process Verification," which is incorporated herein in its entirety and for all purposes.

Mass storage devices used in a general purpose computer typically allow code and data to be read from and written to the mass storage device. In a gaming machine environment, modification of the gaming code stored on a mass storage device is strictly controlled and would only be allowed under specific maintenance type events with electronic and physical enablers required. Though this level of security could be provided by software, IGT gaming computers that include mass storage devices preferably include hardware level mass storage data protection circuitry that operates at the circuit level to monitor attempts to modify data on the mass storage device and will generate both software and hardware error triggers should a data modification be attempted without the proper electronic and physical enablers being present.

Overall Operation of Gaming Unit

One manner in which one or more of the gaming units 20 (and one or more of the gaming units 30) may operate is described below in connection with a number of flowcharts that represent a number of portions of or routines of one or more computer programs, which may be stored in one or more of the memories of the controller 100. The computer program(s) or portions thereof may be stored remotely, outside of the gaming unit 20, and may control the operation of the gaming unit 20 from a remote location. Such remote control may be facilitated with the use of a wireless connection, and/or by an Internet interface that connects the gaming unit 20 with a remote computer (such as one of the network computers 22 and 32) having a memory in which the computer program portions are stored. The computer program portions may be written in any high level language such as C, C+, C++, C# or the like or any low-level, assembly or machine language. By storing the computer program portions therein, various portions of the memories 102 and 106 are physically and/or structurally configured in accordance with computer program instructions.

Figure 4:
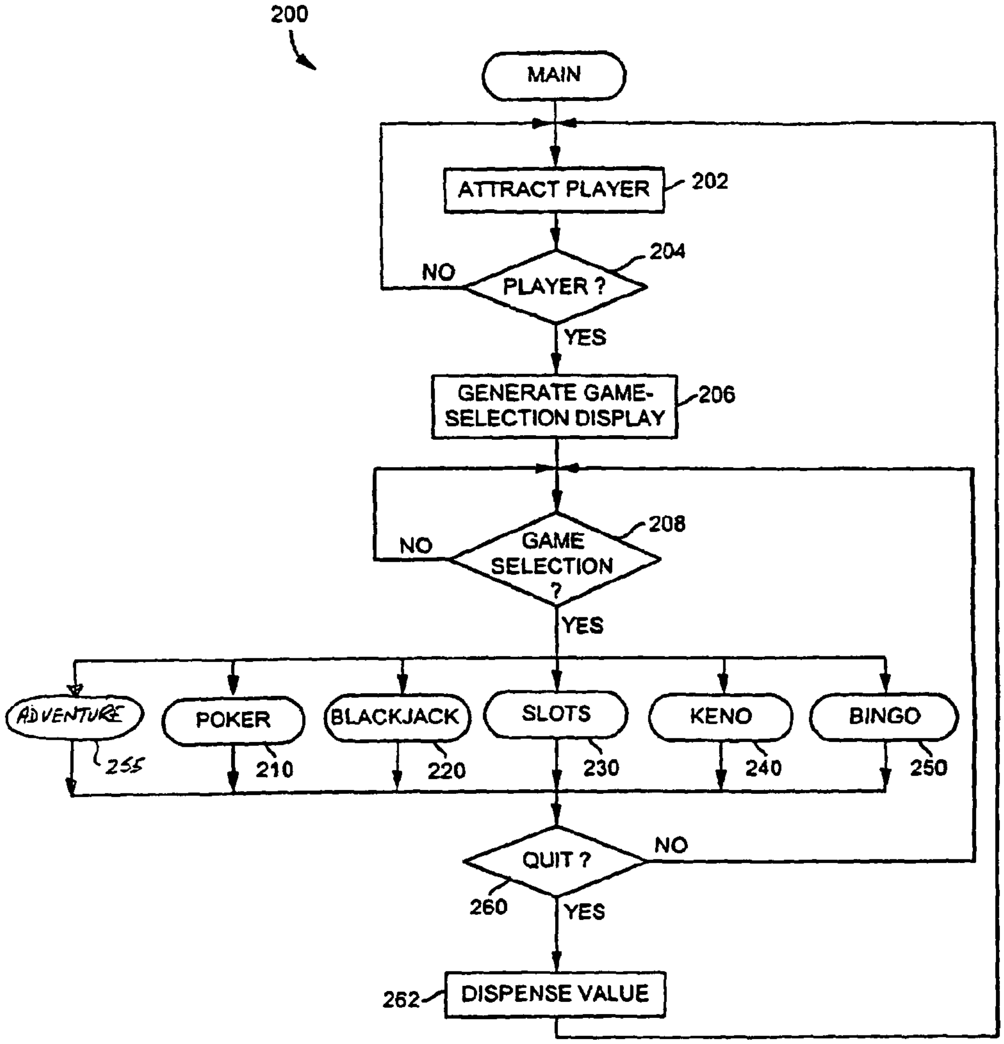
FIG. 4 is an exemplary flowchart of a main routine that may be performed during operation of one or more gaming units.

FIG. 4 is an exemplary flowchart of a main routine 200 that may be performed during operation of one or more gaming units and which may be stored in the memory of the controller 100. Referring to FIG. 4, the main routine 200 may begin operation at step 202, during which an attraction sequence may be performed in an attempt to induce a potential player in a casino to play the gaming unit executing the main routine 200, which may be, for example, one or more of the gaming units 20 and 30 shown in FIG. 1. If the gaming unit executing the main routine 200 is similar or identical to the gaming unit 48 described in connection with FIG. 2, the attraction sequence may be performed by displaying one or more video images on the display unit 70 and/or causing one or more sound segments, such as voice or music, to be generated via the speakers 62. The attraction sequence may include a scrolling list of games that may be played on the gaming unit and/or video images of various games being played, such as video poker, video blackjack, video slots, video keno, video bingo, etc.

During performance of the attraction sequence, if a potential player makes any input to the gaming unit as determined at step 204, the attraction sequence may be terminated and a game-selection display may be generated on the display unit 70 at step 206 to allow the player to select a game available on the gaming unit. The gaming unit may detect an input at step 204 in various ways. For example, the gaming unit could detect if the player presses any button on the gaming unit; the gaming unit could determine if the player deposited one or more coins into the gaming unit; the gaming unit could determine if the player deposited paper currency into the gaming unit; etc.

The game-selection display generated at step 206 may include, for example, a list of video games that may be played on the gaming unit and/or a visual message to prompt the player to deposit value into the gaming unit. While the game-selection display is generated, the gaming unit may wait for the player to make a game selection. Upon selection of one of the games by the player as determined at step 208, the controller 100 may cause one of a number of game routines to be performed to allow the selected game to be played. For example, the game routines could include a video poker routine 210, a video blackjack routine 220, a slots routine 230, a video keno routine 240, a video bingo routine 250 and an adventure routine 255, which may be used to carry out sequential gaming activities as described in greater detail below. At step 208, if no game selection is made within a given period of time, the operation of the routine 200 may branch back to step 202.

After one of the routines 210, 220, 230, 240, 250 and 255 has been performed to allow the player to play one of the games, step 260 may be utilized to determine whether the player wishes to terminate play on the gaming unit or to select another game. If the player wishes to stop playing the gaming unit, which wish may be expressed, for example, by selecting a “Cash Out” button, the controller 100 may dispense value to the player at step 262 based on the outcome of the game(s) played by the player. The operation of the main routine 200 may then return to step 202. If the player did not wish to quit as determined at step 260, the routine 200 may return to step 208 where the game-selection display may again be generated to allow the player to select another game.

It should be noted that although six routines are shown in FIG. 4, a different number and/or different types of routines could be included to allow play of a different number of games.

Figure 5:
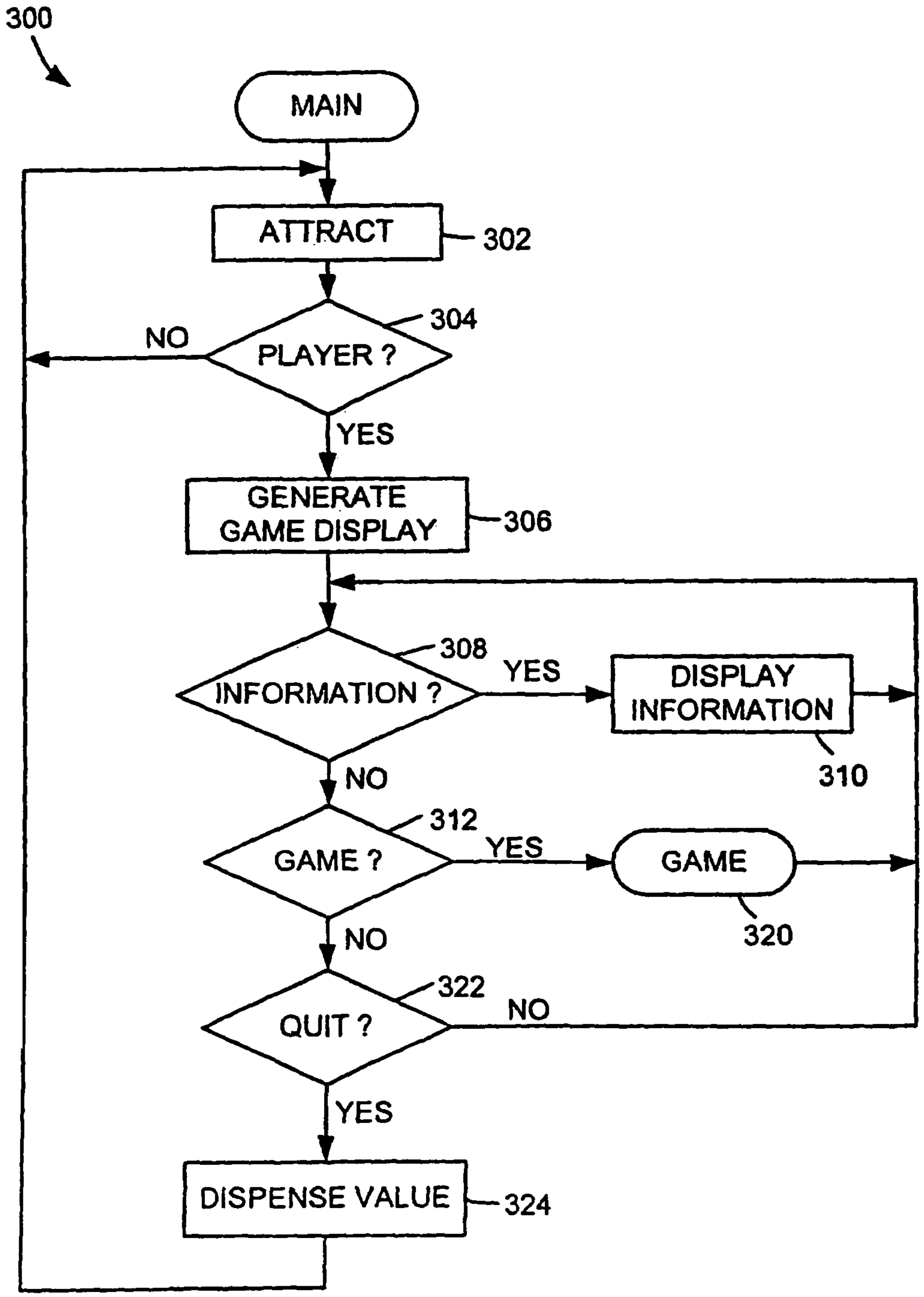
FIG. 5 is an exemplary flowchart of another main routine that may be performed during operation of one or more gaming units.

FIG. 5 is an exemplary flowchart of another main routine 300 that may be performed during operation of one or more gaming units and which may be stored in the memory of the controller 100. The main routine 300 may be utilized for gaming units that are designed to allow play of only a single game or single type of game. Referring to FIG. 5, the main routine 300 may begin operation at step 302, during which an attraction sequence may be performed in an attempt to induce a potential player in a casino to play the gaming unit executing the main routine 300. If the main routine is being executed by a gaming unit that is similar or identical to that shown in FIG. 2, the attraction sequence may be performed by displaying one or more video images on the display unit 70 and/or causing one or more sound segments, such as voice or music, to be generated via the speakers 62.

During performance of the attraction sequence, if a potential player makes any input to the gaming unit as determined at step 304, the attraction sequence may be terminated and a game display may be generated on the display unit 70 at step 306. The game display generated at step 306 may include, for example, an image of the casino game that may be played on the gaming unit and/or a visual message to prompt the player to deposit value into the gaming unit. At step 308, the gaming unit may determine if the player requested information concerning the game, in which case the requested information may be displayed at step 310. Step 312 may be used to determine if the player requested initiation of a game, in which case a game routine 320 may be performed. The game routine 320 could be any one of the game routines disclosed herein, such as one of the game routines 210, 220, 230, 240, 250, 255 or any other game routine.

After the routine 320 has been performed to allow the player to play the game, step 322 may be utilized to determine whether the player wishes to terminate play on the gaming unit. If the player wishes to stop playing the gaming unit, which wish may be expressed, for example, by selecting a “Cash Out” button, the controller 100 may dispense value to the player at step 324 based on the outcome of the game(s) played by the player. The operation of the routine 300 may then return to step 302. If the player did not wish to quit as determined at step 322, the operation of the routine 300 may return to step 308.

Video Poker

Figure 6:
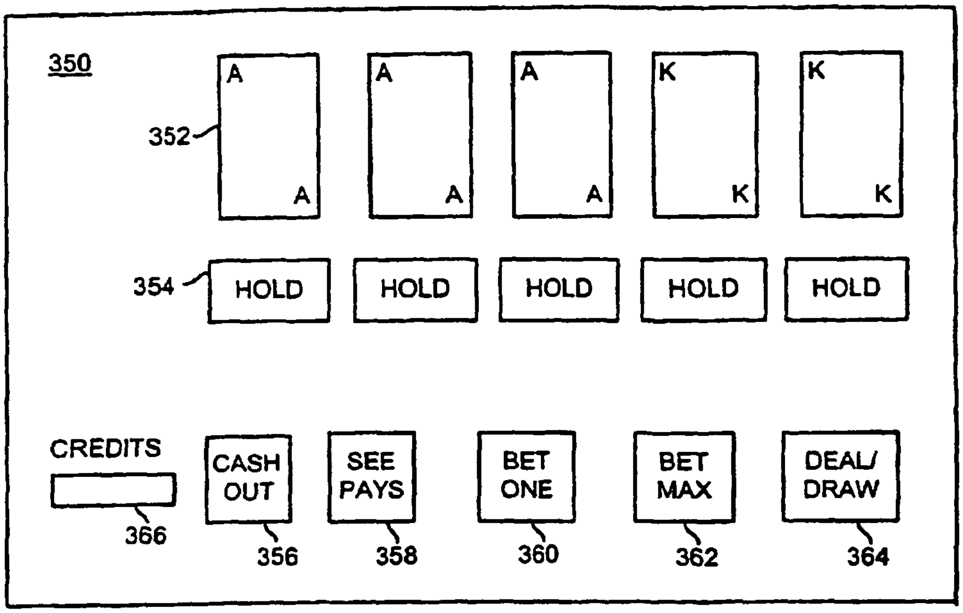
FIG. 6 depicts an exemplary video display that may be provided to a player during performance of the video poker routine of FIG. 8.
Figure 8:
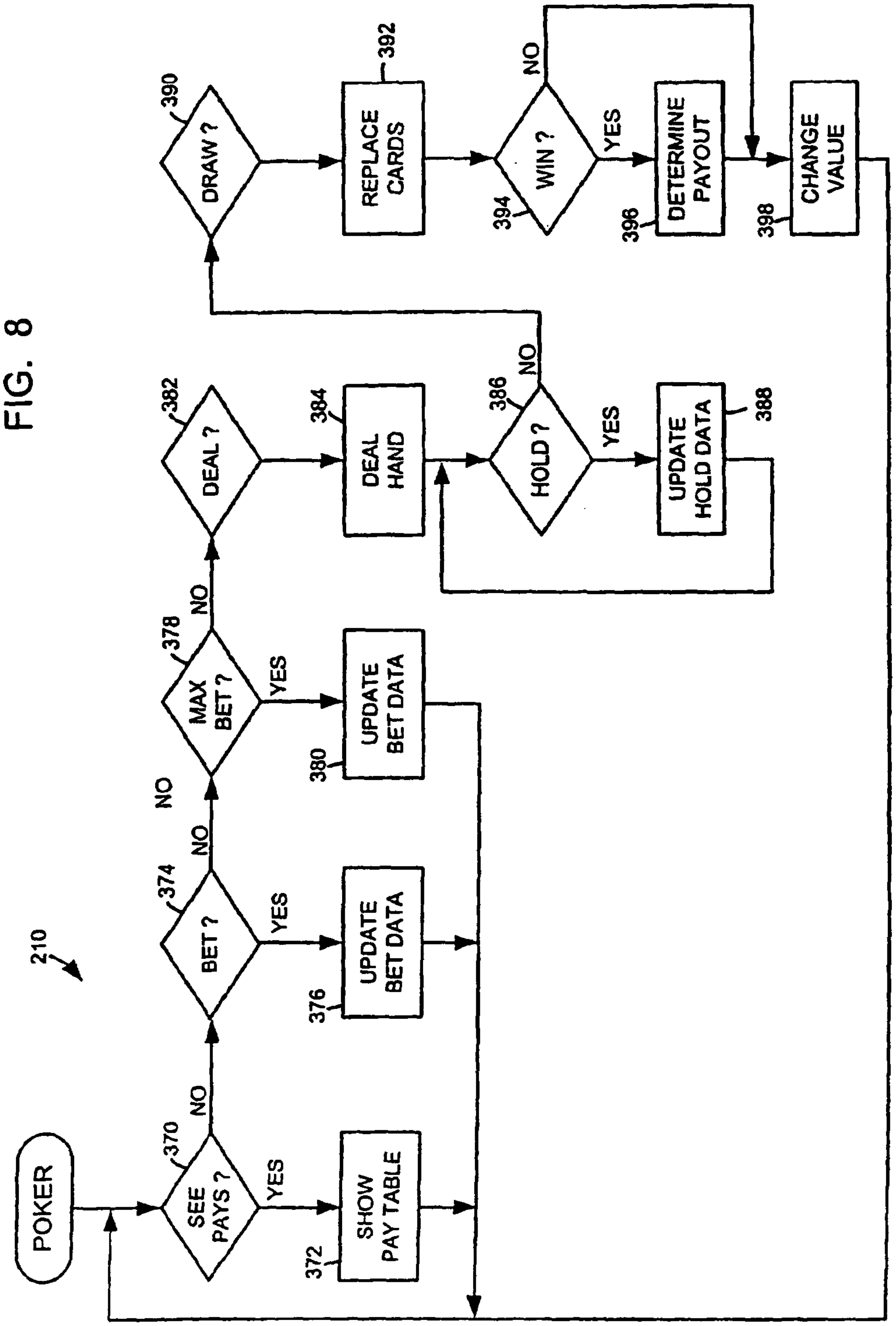
FIG. 8 is an exemplary flowchart of a video poker routine that may be performed by one or more gaming units.

FIG. 6 depicts an exemplary video display 350 that may be provided to a player during performance of the video poker routine 210 of FIG. 8. Referring to FIG. 6, the display 350 may include video images 352 of a plurality of playing cards representing the player's hand, such as five cards. To allow the player to control the play of the video poker game, a plurality of player-selectable buttons may be displayed. The buttons may include a "Hold" button 354 disposed, e.g., directly below each of the playing card images 352, a "Cash Out" button 356, a "See Pays" button 358, a "Bet One Credit" button 360, a "Bet Max Credits" button 362, and a "Deal/Draw" button 364. The display 350 may also include an area 366 in which the number of remaining credits or value is displayed. If the display unit of the gaming unit performing the video poker routine 210 is provided with a touch-sensitive screen, the buttons 354, 356, 358, 360, 362 and 364 may form part of the video display 350. Alternatively, one or more of those buttons may be provided as part of a control panel that is provided separately from the display unit of the gaming unit.

FIG. 8 is an exemplary flowchart of the video poker routine 210, which is shown in FIG. 4 and which may be performed by one or more gaming units. Referring to FIG. 8, at step 370, the routine 210 may determine whether the player has requested payout information, such as by activating the "See Pays" button 358, in which case at step 372 the routine 210 may cause one or more pay tables to be displayed on the display unit of the gaming unit performing the routine 210. At step 374, the routine 210 may determine whether the player has made a bet, such as by pressing the "Bet One Credit" button 360, in which case, at step 376, bet data corresponding to the bet made by the player may be stored in the memory of the controller 100. At step 378, the routine 210 may determine whether the player has pressed the "Bet Max Credits" button 362, in which case, at step 380, bet data corresponding to the maximum allowable bet may be stored in the memory of the controller 100.

At step 382, the routine 210 may determine if the player desires a new hand to be dealt, which may be determined by detecting if the "Deal/Draw" button 364 was activated after a wager was made. In that case, at step 384, a video poker hand may be "dealt" by causing the display unit of the gaming unit to generate the playing card images 352. After the hand is dealt, at step 386, the routine 210 may determine if any of the "Hold" buttons 354 have been activated by the player, in which case data regarding which of the playing card images 352 are to be "held" may be stored in the controller of the gaming unit at step 388. If the "Deal/Draw" button 364 is activated again as determined at step 390, each of the playing card images 352 that was not "held" may be caused to disappear from the video display 350 and to be replaced by a new, randomly selected, playing card image 352 at step 392.

At step 394, the routine 210 may determine whether the poker hand represented by the playing card images 352 currently displayed is a winner. That determination may be made by comparing data representing the currently displayed poker hand with data representing all possible winning hands, which may be stored in the memory of the controller of the gaming unit. If there is a winning hand, a payout value corresponding to the winning hand may be determined at step 396. At step 398, the player's cumulative value or number of credits may be updated by subtracting the bet made by the player and adding, if the hand was a winner, the payout value determined at step 396. The cumulative value or number of credits may also be displayed in the display area 366 (FIG. 6).

Although the video poker routine 210 is described above in connection with a single poker hand of five cards, the routine 210 may be modified to allow other versions of poker to be played. For example, seven card poker may be played, or stud poker may be played. Alternatively or additionally, multiple poker hands may be simultaneously played. In that case, the game may begin by dealing a single poker hand, and the player may be allowed to hold certain cards. After deciding which cards to hold, the held cards may be duplicated in a plurality of different poker hands, with the remaining cards for each of those poker hands being randomly determined.

Video Blackjack

Figure 7:
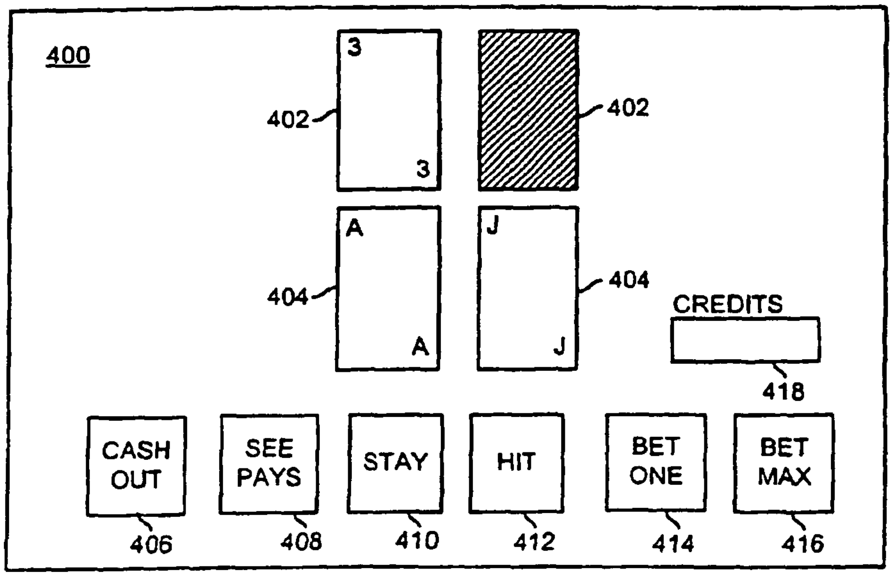
FIG. 7 depicts an exemplary video display that may be provided to a player during performance of the video blackjack routine of FIG. 9.

FIG. 7 depicts an exemplary video display 400 that may be provided to a player during performance of the video blackjack routine 220 shown schematically in FIG. 4. Referring to FIG. 7, the display 400 may include video images 402 of a pair of playing cards representing a dealer's hand, with one of the cards shown face up and the other card being shown face down, and video images 404 of a pair of playing cards representing a player's hand, with both the cards shown face up. The "dealer" may be the gaming unit performing the video blackjack routine 220.

To allow the player to control the play of the video blackjack game, a plurality of player-selectable buttons may be displayed. The buttons may include a "Cash Out" button 406, a "See Pays" button 408, a "Stay" button 410, a "Hit" button 412, a "Bet One Credit" button 414, and a "Bet Max Credits" button 416. The display 400 may also include an area 418 in which the number of remaining credits or value is displayed. If the display unit of the gaming unit performing the video blackjack routine 220 is provided with a touch-sensitive screen, the buttons 406, 408, 410, 412, 414 and 416 may form part of the video display 400. Alternatively, one or more of those buttons may be provided as part of a control panel that is provided separately from the display unit of the gaming unit.

Figure 9:
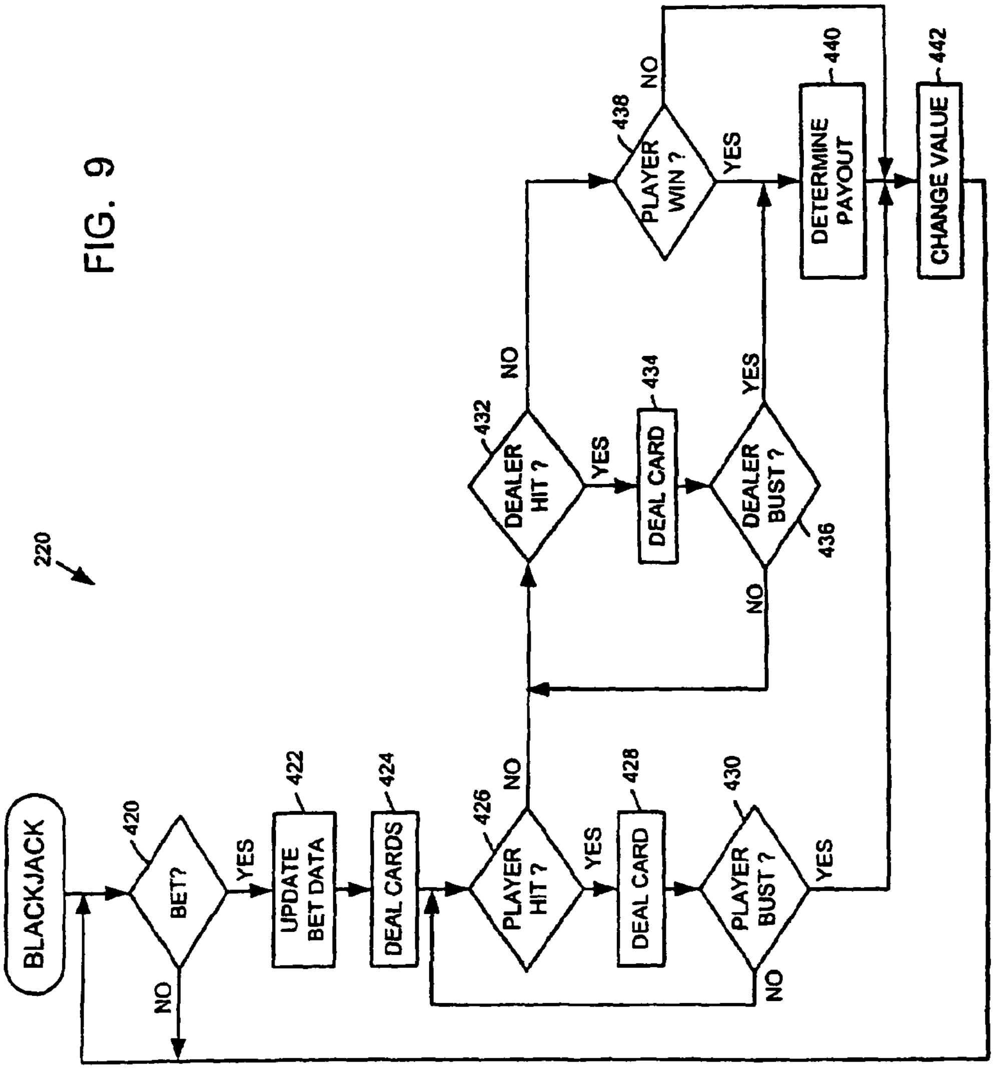
FIG. 9 is an exemplary flowchart of a video blackjack routine that may be performed by one or more gaming units.

FIG. 9 is an exemplary flowchart of the video blackjack routine 220 shown schematically in FIG. 4. Referring to FIG. 9, the video blackjack routine 220 may begin at step 420 where it may determine whether a bet has been made by the player. That may be determined, for example, by detecting the activation of either the "Bet One Credit" button 414 or the "Bet Max Credits" button 416. At step 422, bet data corresponding to the bet made at step 420 may be stored in the memory of the controller of the gaming unit performing the video blackjack routine 220. At step 424, a dealer's hand and a player's hand may be "dealt" by making the playing card images 402 and 404 appear on the display unit of the gaming unit.

At step 426, the player may be allowed to be "hit," in which case at step 428 another card will be dealt to the player's hand by making another playing card image 404 appear in the display 400. If the player is hit, step 430 may determine if the player has "bust," or exceeded twenty-one. If the player has not bust, steps 426 and 428 may be performed again to allow the player to be hit again.

If the player decides not to hit, at step 432 the routine 220 may determine whether the dealer should be hit. Whether the dealer hits may be determined in accordance with predetermined rules, such as the dealer always hits if the dealer's hand totals fifteen or less. If the dealer hits, at step 434 the dealer's hand may be dealt another card by making another playing card image 402 appear in the display 400. At step 436, the routine 220 may determine whether the dealer has bust. If the dealer has not bust, steps 432 and 434 may be performed again to allow the dealer to be hit again.

If the dealer does not hit, at step 438, the outcome of the blackjack game and a corresponding payout may be determined based on, for example, whether the player or the dealer has the higher hand that does not exceed twenty-one. If the player has a winning hand, a payout value corresponding to the winning hand may be determined at step 440. At step 442, the player's cumulative value or number of credits may be updated by subtracting the bet made by the player and adding, if the player won, the payout value determined at step 396. The cumulative value or number of credits may also be displayed in the display area 418 (FIG. 7).

Video Slots

FIG. 10 depicts an exemplary video display 450 that may be provided to a player during performance of the slots routine 230 shown schematically in FIG. 4. Referring to FIG. 10, the display 450 may include video images 452 of a plurality of slot machine reels, each of the reels having a plurality of reel symbols 454 associated therewith. Although the display 450 shows five reel images 452, each of which may have three reel symbols 454 that are visible at a time, other reel configurations could be utilized.

To allow the player to control the play of the slots game, a plurality of player-selectable buttons may be displayed. The buttons may include a "Cash Out" button 456, a "See Pays" button 458, a plurality of payline-selection buttons 460 each of which allows the player to select a different number of paylines prior to "spinning" the reels, a plurality of bet-selection buttons 462 each of which allows a player to specify a wager amount for each payline selected, a "Spin" button 464, and a "Max Bet" button 466 to allow a player to make the maximum wager allowable.

Figure 12:
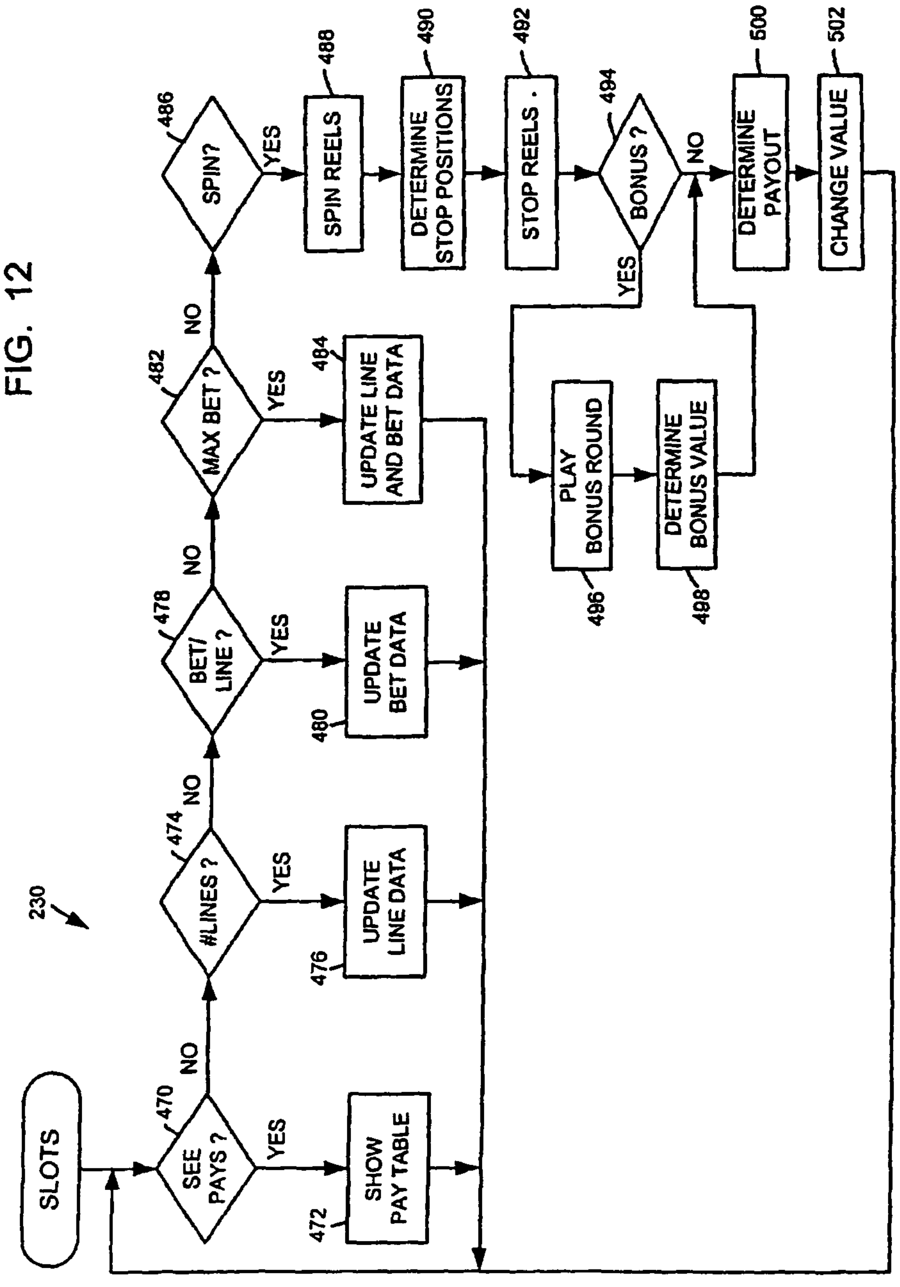
FIG. 12 is an exemplary flowchart of a slots routine that may be performed by one or more gaming units.

FIG. 12 is an exemplary flowchart of the slots routine 230 shown schematically in FIG. 4. Referring to FIG. 12, at step 470, the routine 230 may determine whether the player has requested payout information, such as by activating the "See Pays" button 458, in which case, at step 472, the routine 230 may cause one or more pay tables to be displayed on the display unit of the gaming unit performing the slots routine 230. At step 474, the routine 230 may determine whether the player has pressed one of the payline-selection buttons 460, in which case, at step 476, data corresponding to the number of paylines selected by the player may be stored in the memory of the controller of the gaming unit. At step 478, the routine 230 may determine whether the player has pressed one of the bet-selection buttons 462, in which case, at step 480, data corresponding to the amount bet per payline may be stored in the memory of the gaming unit controller. At step 482, the routine 230 may determine whether the player has pressed the "Max Bet" button 466, in which case, at step 484, bet data (which may include both payline data and bet-per-payline data) corresponding to the maximum allowable bet may be stored in the memory of the gaming unit controller.

If the "Spin" button 464 has been activated by the player as determined at step 486, at step 488, the routine 230 may cause the slot machine reel images 452 to begin "spinning" to simulate the appearance of a plurality of spinning mechanical slot machine reels. At step 490, the routine 230 may determine the positions at which the slot machine reel images will stop, or the particular symbol images 454 that will be displayed when the reel images 452 stop spinning. At step 492, the routine 230 may stop the reel images 452 from spinning by displaying stationary reel images 452 and images of three symbols 454 for each stopped reel image 452. The virtual reels may be stopped from left to right, from the perspective of the player, or in any other manner or sequence.

The routine 230 may provide for the possibility of a bonus game or round if certain conditions are met, such as the display in the stopped reel images 452 of a particular symbol 454. If there is such a bonus condition as determined at step 494, the routine 230 may proceed to step 496 where a bonus round may be played. The bonus round may be a different game than slots, and many other types of bonus games could be provided. If the player wins the bonus round, or receives additional credits or points in the bonus round, a bonus value may be determined at step 498. A payout value corresponding to outcome of the slots game and/or the bonus round may be determined at step 500. At step 502, the player's cumulative value or number of credits may be updated by subtracting the bet made by the player and adding, if the slot game and/or bonus round was a winner, the payout value determined at step 500.

Although the above routine has been described as a virtual slot machine routine in which slot machine reels are represented as images on the video display unit of a gaming unit, actual slot machine reels that are capable of being spun may be utilized instead.

Video Keno

FIG. 11 depicts an exemplary video display 520 that may be provided to a player during performance of the video keno routine shown schematically in FIG. 4. Referring to FIG. 11, the display 520 may include a video image 522 of a plurality of numbers that were selected by the player prior to the start of a keno game and a video image 524 of a plurality of numbers randomly selected during the keno game. The randomly selected numbers may be displayed in a grid pattern.

To allow the player to control the play of the keno game, a plurality of player-selectable buttons may be displayed. The buttons may include a "Cash Out" button 526, a "See Pays" button 528, a "Bet One Credit" button 530, a "Bet Max Credits" button 532, a "Select Ticket" button 534, a "Select Number" button 536, and a "Play" button 538. The display 520 may also include an area 540 in which the number of remaining credits or value is displayed. If the display unit of the gaming unit performing the keno routine 230 is provided with a touch-sensitive screen, the buttons may form part of the video display 520. Alternatively, one or more of those buttons may be provided as part of a control panel that is provided separately from the display unit.

Figure 13:
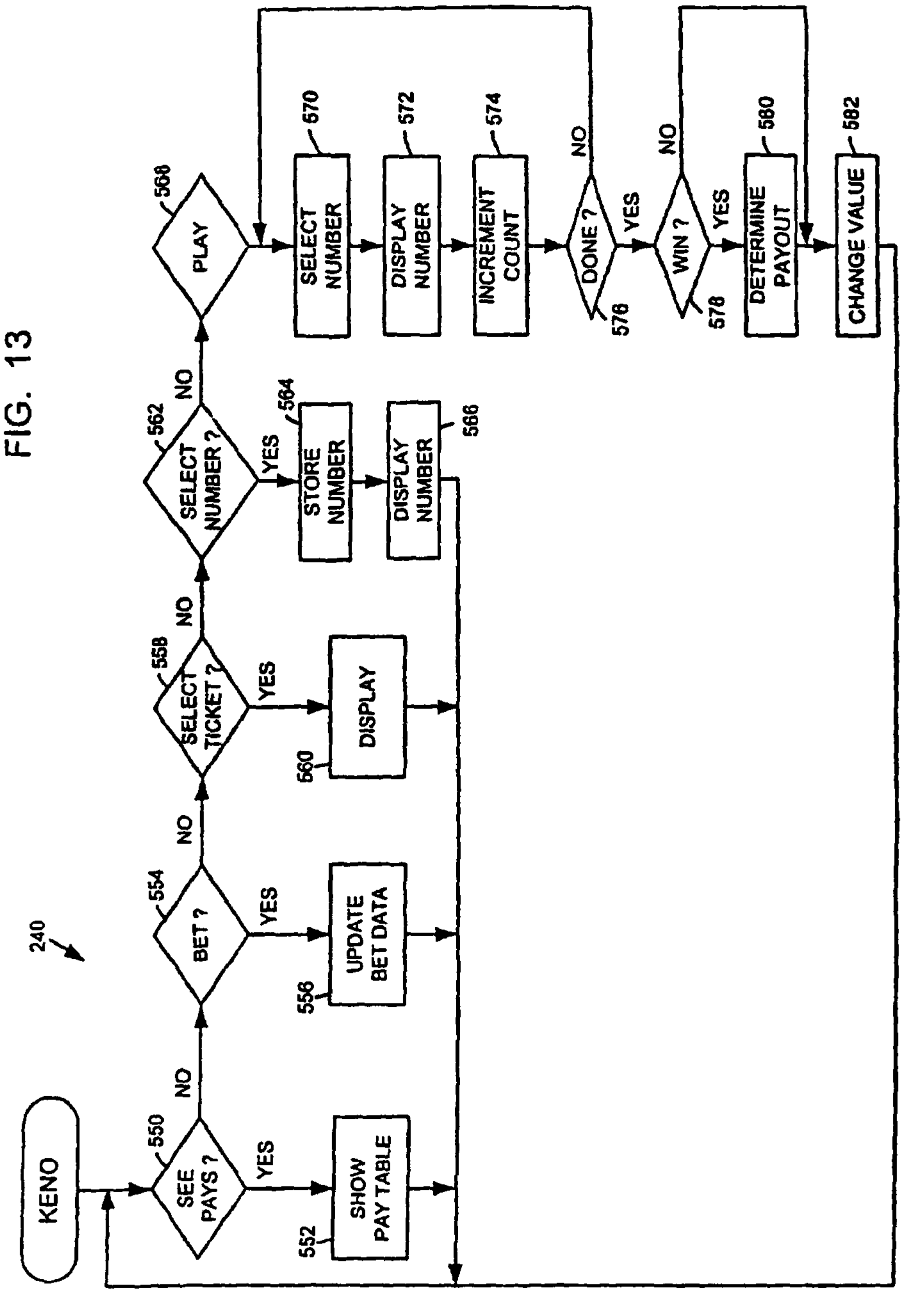
FIG. 13 is a flowchart of an embodiment of a video keno routine that may be performed by one or more gaming units.

FIG. 13 is an exemplary flowchart of the video keno routine 240 shown schematically in FIG. 4. The keno routine 240 may be utilized in connection with a single gaming unit where a single player is playing a keno game, or the keno routine 240 may be utilized in connection with multiple gaming units where multiple players are playing a single keno game. In the latter case, one or more of the acts described below may be performed either by the controller in each gaming unit or by one of the network computers 22 and 32, to which multiple gaming units are operatively connected.

Referring to FIG. 13, at step 550, the routine 240 may determine whether the player has requested payout information, such as by activating the "See Pays" button 528, in which case, at step 552, the routine 240 may cause one or more pay tables to be displayed on the display unit of the gaming unit performing the routine 240. At step 554, the routine 240 may determine whether the player has made a bet, such as by having pressed the "Bet One Credit" button 530 or the "Bet Max Credits" button 532, in which case, at step 556, bet data corresponding to the bet made by the player may be stored in the memory of the gaming unit controller. After the player has made a wager, at step 558, the player may select a keno ticket, and, at step 560, the ticket may be displayed on the display 520. At step 562, the player may select one or more game numbers, which may be within a range set by the casino. After being selected, the player's game numbers may be stored in the memory of the gaming unit controller at step 564 and may be included in the image 522 on the display 520 at step 566. After a certain amount of time, the keno game may be closed to additional players in the case where a number of players are playing a single keno game using multiple gaming units.

If play of the keno game is to begin as determined at step 568, at step 570, a game number within a range set by the casino may be randomly selected either by the gaming unit controller or a central computer operatively connected to the controller, such as one of the network computers 22 and 32. At step 572, the randomly selected game number may be displayed on the display unit of the gaming unit and the display units of other gaming units (if any) involved in the same keno game. At step 574, the gaming unit controller (or the central computer noted above) may increment a count that keeps track of how many game numbers have been selected at step 570.

At step 576, the gaming unit controller (or one of the network computers 22 and 32) may determine whether a maximum number of game numbers within the range have been randomly selected. If not, another game number may be randomly selected at step 570. If the maximum number of game numbers has been selected, at step 578, the gaming unit controller (or a central computer) may determine whether there are a sufficient number of matches between the game numbers selected by the player and the game numbers selected at step 570 to cause the player to win. The number of matches may depend on how many numbers the player selected and the particular keno rules being used.

If there are a sufficient number of matches, a payout may be determined at step 580 to compensate the player for winning the game. The payout may depend on the number of matches between the game numbers selected by the player and the game numbers randomly selected at step 570. At step 582, the player's cumulative value or number of credits may be updated by subtracting the bet made by the player and adding, if the keno game was won, the payout value determined at step 580. The cumulative value or number of credits may also be displayed in the display area 540 (FIG. 11).

Video Bingo

Figure 14:
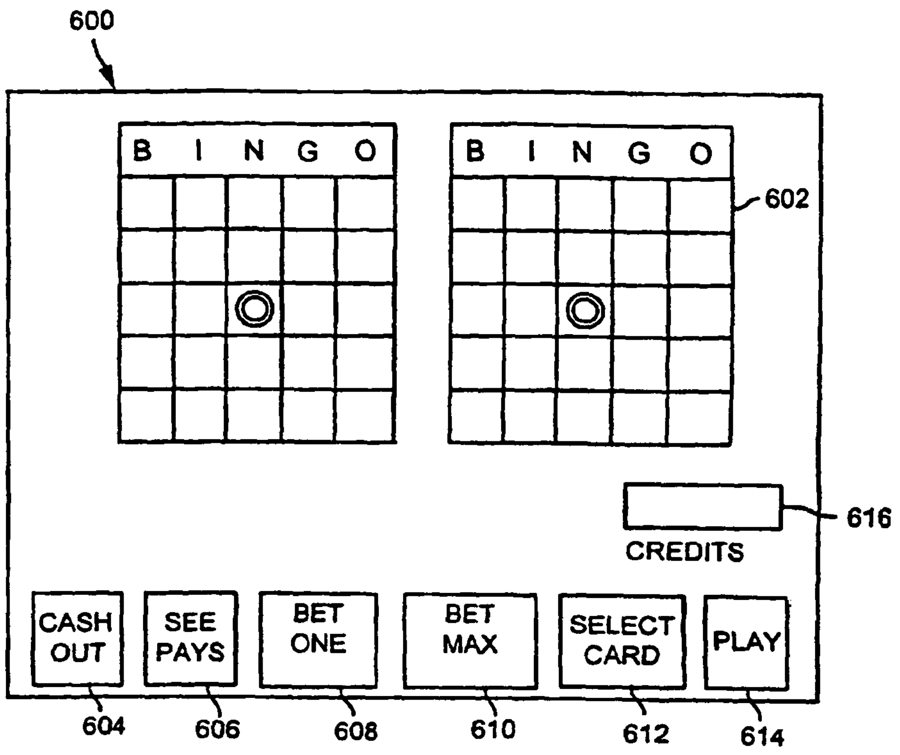
FIG. 14 depicts an exemplary video display that may be provided to a player during performance of the video bingo routine of FIG. 15.

FIG. 14 depicts an exemplary video display 600 that may be provided to a player during performance of the video bingo routine 250 shown schematically in FIG. 4. Referring to FIG. 14, the display 600 may include one or more video images 602 of a bingo card and images of the bingo numbers selected during the game. The bingo card images 602 may have a grid pattern, such as that shown in FIG. 14.

To allow the player to control the play of the bingo game, a plurality of player-selectable buttons may be displayed. The buttons may include a "Cash Out" button 604, a "See Pays" button 606, a "Bet One Credit" button 608, a "Bet Max Credits" button 610, a "Select Card" button 612, and a "Play" button 614. The display 600 may also include an area 616 in which the number of remaining credits or value is displayed. If the display unit of the gaming unit performing the bingo routine 250 is provided with a touch-sensitive screen, the buttons may form part of the video display 600. Alternatively, one or more of those buttons may be provided as part of a control panel that is provided separately from the display unit of the gaming unit.

Figure 15:
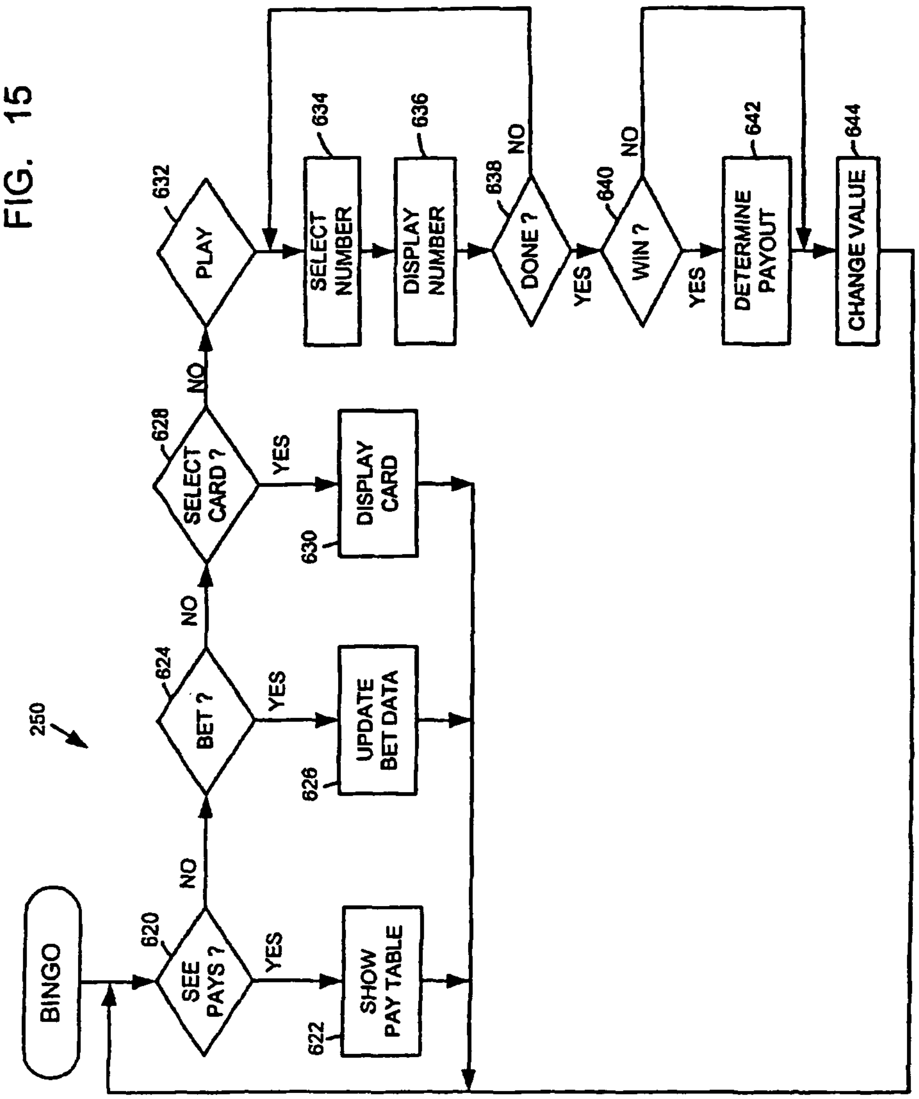
FIG. 15 is an exemplary flowchart of a video bingo routine that may be performed by one or more gaming units.

FIG. 15 is an exemplary flowchart of the video bingo routine 250 shown schematically in FIG. 4. The bingo routine 250 may be utilized in connection with a single gaming unit where a single player is playing a bingo game, or the bingo routine 250 may be utilized in connection with multiple gaming units where multiple players are playing a single bingo game. In the latter case, one or more of the acts described below may be performed either by the controller in each gaming unit or by one of the network computers 22 and 32 to which multiple gaming units are operatively connected.

Referring to FIG. 15, at step 620, the routine 250 may determine whether the player has requested payout information, such as by activating the "See Pays" button 606, in which case, at step 622, the routine 250 may cause one or more pay tables to be displayed on the display unit of the gaming unit(s) performing the routine 250. At step 624, the routine 250 may determine whether the player has made a bet, such as by having pressed the "Bet One Credit" button 608 or the "Bet Max Credits" button 610, in which case, at step 626, bet data corresponding to the bet made by the player may be stored in the memory of the gaming unit controller.

After the player has made a wager, at step 628, the player may select a bingo card, which may be generated randomly. The player may select more than one bingo card, and there may be a maximum number of bingo cards that a player may select. After play is to commence as determined at step 632, at step 634, a bingo number may be randomly generated by the gaming unit controller or a central computer such as one of the network computers 22 and 32. At step 636, the bingo number may be displayed on the display units of one or more of the gaming units involved in the bingo game.

At step 638, the gaming unit controller (or a central computer) may determine whether any player has won the bingo game. If no player has won, another bingo number may be randomly selected at step 634. If any player has bingo as determined at step 638, the routine may determine at step 640 whether the player playing that gaming unit was the winner. If so, at step 642, a payout for the player may be determined. The payout may depend on the number of random numbers that were drawn before there was a winner, the total number of winners (if there was more than one player), and the amount of money that was wagered on the game. At step 644, the player's cumulative value or number of credits may be updated by subtracting the bet made by the player and adding, if the bingo game was won, the payout value determined at step 642. The cumulative value or number of credits may also be displayed in the display area 616 (FIG. 14).

Sequential Adventure Activities

In addition to the various gaming routines described above that may be executed by one or more of the gaming units 20 and 30 of the system 10 shown in FIG. 1, one or more of the network computers 22 and 32 and on or more of the non-gaming units 21 and 31 may be used to carry out sequential adventure activities that encourage players to travel to particular venues to engage in a non-gaming activity and/or to participate in a gaming activity, while following a calculated route or sequence determined by the system 10. In this manner, the sequential adventure activities described herein add another level of gaming to the system 10 that overlays the localized gaming activities that may be carried out at each of the individual gaming and non-gaming units within the system 10. In other words, the sequential adventure activities described herein result in a multilevel adventure experience that may be used by casino operators and other types of business operators to create interrelationships between gaming units within a particular venue, between gaming units associated with different venues that may be geographically dispersed, between casinos and other types of business establishments, and/or non gaming activities, products and venues. Such interrelationships may be used to encourage players to use (i.e., promote) relatively new types of gaming units, to encourage players to experience a variety of venues or casinos, to encourage players to use a variety of other types of services and/or products, which may be related to gambling or which may be related to any other type of business. Additionally, the sequential adventure activities described herein may provide another level of excitement or adventure that may enhance the overall gaming experience for players, thereby increasing casino revenue by increasing the number or volume of players and the dollar volume of play in which each player engages.

To enable the different gaming and non-gaming activities possible, thereby maximizing the sequential adventure activities experience, several devices, including, but limited to, gaming units 20, non-gaming units 21, personal storage devices 46 and playing devices 47 may be used. The gaming units, as mentioned earlier, may include regular and video slots, video poker, video bingo, video blackjack, video keno, video bingo and the like. Similarly, gaming activities such as Caribbean poker, roulette, craps, sports wagering and the like, may be included as gaming units once connected to the system 10. The connection from the gaming activity, to the system 10 may be accomplished in a number of ways, including many that are similar to the connection of the gaming units 20 to the system 10. The gaming activities, for example, may include a gaming activity device, mounted or located, on or near the gaming activity, that may be able to communicate with the portable date storage device 46 and/or the system 10. The details of the gaming activity, such as wagering amounts, time of play, amount of value lost or gained, may be communicated to a gaming activity unit (not shown) via manual input from a dealer, pit-boss, or other gaming/adventure employee, or may be communicated via an electronic monitoring device.

The adventure may also include non-gaming units 21 that may be designed to monitor, facilitate and/or to communicate the details regarding the non-gaming activities between the system 10 and/or the portable storage device. The non-gaming activities are activities that may not involve games of chance, at least directly. The non-gaming activities may run the gamut of the possible activities, including, but not limited to, purchasing a certain product, solving a puzzle, reaching a specified destination, solving a clue or hint, completing a task or physical challenge, answering trivia, etc. Similar to the gaming units 20, the non-gaming units 21 may be mounted or located on or near the non-gaming activity. The details of the non-gaming activity (such as whether the puzzle was solved or whether the destination was reached) and other information relating to the activity (such as when or how long it took the player to completed the activity) may also be communicated to the non-gaming unit 21, for example via manual input, via an electronic monitoring device or otherwise.

The portable storage device 46 may be a wholly independent unit or may be incorporated with, or adapted to communicate information with, a playing device 47. The playing device 47, like the non-gaming units, may run the gamut of the possible devices, including but not limited to a global positioning system (GPS), a scanner, a bar code reader, a metal detector, a sensing device, a decoder, and a lock and/or key. The playing device 47 may be used in a variety of ways, but more specifically may be used in conjunction with a non-gaming unit 21 and/or a portable storage device 46. For example, the player may be in possession of a playing device 47, in the form of a GPS device that is able to communicate with the portable data storage device 46 (or with other elements of network 10). As the player reaches a specified destination, as one part of a sequential adventure activities, the GPS 47 may dynamically download coordinates into the portable data storage device 46. The portable data storage device 46 may, when the player is at the proper location, be triggered by the coordinates to initiate a function related to the sequential adventure activities. The function may include, but is not limited to, producing to the player further information regarding the adventure, communicating adventure information with the system 10, providing a prize to the player, and ending the adventure.

In another example, the adventure may be tailored to the individual players and their respective capabilities or abilities, thereby "normalizing" the players. The players, for instance, may have different capabilities or abilities, due variations in age or perhaps physical abilities. Therefore, being that the adventure may be played in a competitive sense, such as one player versus one or more players, or a player competing against a pre-set criteria, such as a time limitation or a point total, there may be several advantages to placing the players on an equal footing. By normalizing the players, for example, one adventure may be played with individuals having all sorts of different skills and capabilities without giving a greater advantage to any one individual based on their skill set. Normalizing the players or adventure, may be accomplished in many ways, including, but not limited to, changing the adventure to match the ability of the player or handicapping the player thereby negating any advantage the player may have over his opponents.

For example, if player one is an elderly wheelchair-bound retiree and player two is a young college athlete, the adventure may be tailored to ensure that player one has wheelchair access to all the activities and/or may include destinations that player one may enjoy, such as museums or fine restaurants. The adventure for player one may therefore have an overall lesser calculated degree of difficulty to compensate for player ones limitations. Similarly, the adventure for player two may be tailored to include a higher degree of physical activity and/or may include destinations that player two may enjoy, such as bars or exotic cities. The adventure for player one and player two may therefore be normalized to enable equal opportunity of winning. In another example, the players may obtain a handicap as prescribed by a pre-determined set of factual circumstances, such as age and physical ability. If for example, the players have a specified amount of time to complete each leg of the adventure, player one may receive an additional amount of time to complete each leg, whereas player two may not. The players may therefore be normalized to enable equal opportunity of winning the adventure.

It should be noted at this point, that even though the above and following disclosure involves the use of gaming units 20 and 30 throughout the reality gaming adventure, the inclusion of the gaming units 20 and 30 is simply one embodiment that the sequential adventure activities can take, and the gaming units 20 and 30 are not essential to the sequential adventure activity experience. The sequential adventure activities for example, may only include a portable storage device 46 operatively connected to the activity system 10, wherein the activity system 10 includes only non-gaming units 20, 30 and/or activities. Conversely, the sequential adventure activities may include many gaming activities, wherein the gaming activities may or may not be accomplished in combination with non-gaming activities.

Figure 16:
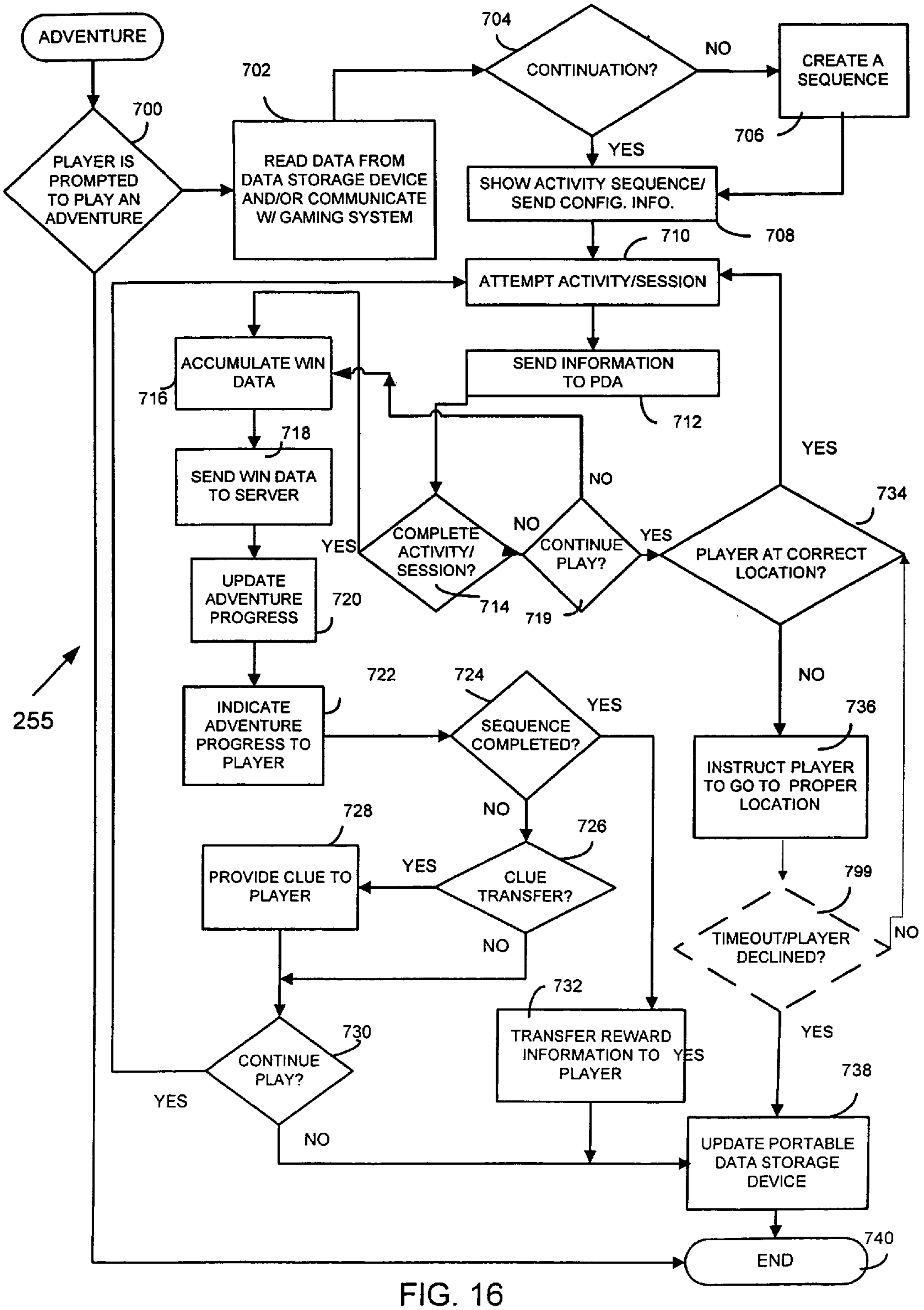
FIG. 16 is a flowchart depicting one manner in which the adventure routine shown schematically in FIG. 4 may be carried out.

FIG. 16 is an exemplary flowchart of the adventure routine 255 shown schematically in FIG. 4, which may be performed by one or more of the gaming units 20 and 30 within the system 10 to enable one or more players to engage in sequential adventure activities. Before discussing the adventure routine 255 in greater detail, it is important to recognize that the adventure routine 255 described herein is only one exemplary manner in which sequential gaming activities may be carried out within the system 10.

If a player has selected an adventure (i.e., the adventure routine 255) within, for example, the main routine 200 (FIG. 4), the player may be prompted to communicatively couple their portable data storage device 46 to the gaming unit, as shown at step 700. For example, in the case where the portable data storage device 46 is a magnetic stripe card, a smart card, an optically encoded card, or any other type of card for storing information pertaining to a particular player, the player may insert the card into the reader 58 to enable communications between the card and the gaming unit 20. Additionally, the adventure routine 255 may include multiple software routines or portions of a software routine, some of which may be executed or performed by one or both of the network computers or servers 22 and 32 and/or some of which may be executed or performed locally within the gaming units 20 and 30.

Once the portable data storage device 46 is communicatively coupled to the gaming unit 20, at step 702 of the adventure routine 255, the gaming unit 20 reads data from the portable data storage device 46. The data read by the gaming unit may include a unique identifier or code associated with a particular player, demographic information, biometric information, play statistics associated with the performance of the particular player, monetary value or credits, bonuses such as points, extended play, monetary value, etc., promotional value such as, for example, meals, promotional products, services or samples, etc., the progress or status of an adventure or sequential adventure activity that the player has started or in which the player is currently engaged, gaming-based incentives or rewards such as, for example, extended or free play, increased and/or multiplied wins, etc. Some or all of the data stored on the portable data storage device 46 may be read by the gaming unit 20 and may be stored temporarily in a memory such as the RAM(s) 106, or any other suitable memory within the gaming unit 20. At step 702, the routine 255 may also send some or all of the information read at step 702 to one or both of the network computers 22 and 32, each of which may function as a data server for the gaming system 10. In addition, at step 702, the routine 255 may send information pertaining to the gaming machine such as, for example, a gaming unit identifier or the like, to the system server which, as noted above, may be one or both of the network computers 22 and 32.

At step 704 the routine 255 determines whether a new adventure is needed, or whether the player is continuing an adventure. If step 704 determines that a new sequence needs to be created, step 706 will create that sequence. The sequence of adventure activities determined by step 706 may provide a sequential adventure activity or an adventure in which a player is directed to play a particular sequence of the gaming units 20 and 30 to a particular degree (e.g., a particular level of winnings, a particular amount of time, etc.) in order to advance through the sequence or sequential game. However, if desired, other gaming activities such as, for example, table games, or any other desired gaming or non-gaming activities may be included in the sequence. In some cases, it may be desirable for step 706 to provide a sequence of gaming activities based on information related to a particular player. In other words, step 706 may provide sequential gaming activities that are specifically adapted for particular players. For example, step 706 may provide a sequence of gaming activities that includes gaming activities that a particular player has not played often or at all, gaming activities that are likely to be consistent with that player's preferences, betting habits, losses, available credit, demographic characteristics, etc. Of course, all or some of the player related information may be stored on the portable data storage device 46 and provided to the system server via step 702. Alternatively or additionally, step 706 may provide a sequence of gaming activities selected from a group of one or more possible predetermined sequences developed by a developer, a casino operator or a group of casino operators, e.g., for that particular location and time period. Such predetermined sequences may, for example, be used to encourage play of new gaming activities, promote particular venues (e.g., new venues), promote other products or services, encourage players to increase their volume of betting, create profitable interrelationships between various types of gaming activities, between different venues, etc.

After the routine 255 has sent configuration information to the gaming unit at step 708, the routine 255 enables the player to attempt the activity at step 710. The play of the activity at step 710 may be similar or identical to, for example, any of the electronic video-based gaming routines 210, 220, 230, 240 and/or 250 described above, or may be any other desired electronic video-based gaming activity. Alternatively or additionally, the activity attempted at step 710 may be some other gaming or non-gaming activities, including an adventure routine 255. Such activities may include, for example, a table game, solving a clue, a treasure hunt, purchasing a product, or may be any other desired activity.

Following the attempt of the activity at step 710, step 712 may update and/or send information to the personal storage device 46. The playing device 47, for example, may be connectively attached to the personal storage device 46. After step 712, step 714 can make a decision as to whether the activity/session of step 710 has been properly completed. If at step 714, the personal storage device 46 registers the activity at step 710 as being complete, step 716 may then accumulate the win data. The routine 255 may then send the accumulated win data to the system server (e.g., one of the network computers 22 and 32) at step 718. In turn, the routine 255 may cause the system server to update the adventure progress at step 720. The updating of the adventure progress may be carried out by determining, for example, the amount of bonus points achieved in total and/or toward completing the current step or gaming activity in the adventure or sequence. Of course, many other manners of measuring adventure progress could be used. For example, the number plays in which a player has engage on a particular gaming unit, the amount of winnings in total or on a particular gaming unit, etc. could be used to control or measure adventure progress. At step 722, the routine 255 may inform the player as to his progress in the adventure.

At step 724, the routine 255 may determine whether or not the sequence associated with the adventure currently being played by the player is complete, that is, whether or not all of the gaming units or activities in the sequence have been played to a sufficient level (e.g., winnings, bonus points, time etc.) as required by the adventure. If the adventure activity/session has not been completed (i.e., one or more gaming units or activities have not yet been played and/or one or more gaming units or activities have not been played to a sufficient level of winnings, bonus points, etc.), the routine 255 at step 726 determines whether or not a clue associated with the next step (e.g., gaming unit or activity) of the adventure should be transferred or provided to the player.

If at step 724, the routine 255 determines that the player has played the current gaming unit or activity to a level that meets or exceeds the level required by the sequence adventure activity, the routine 255 may provide a clue to the player at step 728. Such clues may take the form of a textual, graphical and/or audio message that directly informs the player of the location of a particular gaming unit or activity that must be played next according to the adventure sequence. In some cases, the next gaming unit or activity may be located within the same venue at which the player is currently located. In other cases, the next gaming unit or activity may be located within a different venue that may, for example, be located remotely from the player's current location. Still further, one or more clues may, instead of providing direct information regarding the identity and location of the next gaming unit or activity in the adventure, provide information that only hints or suggests in an indirect manner at the location and identity of the next gaming unit or activity to be played in the adventure. For example, the clue may include a partial description of the venue at which the next gaming unit or activity is located, may include terms that are associated with the next venue, gaming unit or activity in the adventure sequence, etc.

Of course, the specificity of the clues may be of any degree desired and, may, for example, vary within a particular adventure, based on the particular player, from step to step within a given adventure, etc. The routine 255 may, for example, carry out the transfer of clue information by causing the system server to send the clue information over one or more of the networks 24, 34 and 40 to the one of the gaming units or activities 20 and 30 at which the player is currently located. In that case, the gaming unit or activity proximate to the player may convey the clue via a video display, speaker, by a paper ticket or by some other media.

After a clue has been transferred at step 728, or if it is determined at step 726 that a clue should not be transferred, the routine 255 may ask the player at step 730 whether or not play should continue. If the player indicates a desire to continue play, the routine 255 initiates another round of game play at step 710. On the other hand, if the player indicates a desire to terminate play, despite the fact that adventure has not been completed, the routine 255 updates the player's portable data storage device 46 at step 738. The update information may include current status of the adventure or sequential gaming activity such as, for example, adventure steps completed, the degree to which an incomplete step has been achieved, total bonus points, play statistics, any intermediate promotional items awarded, the remaining credit or monetary value available to the player, etc. Preferably, a game server or similar device is also updated.

If at step 724 the routine 255 determines that the sequence or adventure has been successfully completed, the routine 255 may transfer reward information to the player at step 732. Reward information may include monetary value, bonus points, promotional items or merchandise such as dinners, hotel rooms, etc., free services, extended game play, or any other desired form of value that may function as an incentive for a player to initiate and complete an adventure sequence or sequential gaming activity. Similar to the transfer of clue information, the routine 255 may transfer rewards or reward information by causing the system server to send data pertaining to the reward via one or more of the networks 24, 34 and 40 to the one of the gaming units 20 and 30 or any other activity at which the player is currently located.

If the routine 255 determines at step 714 that the adventure or sequential gaming activity is uncompleted, the player may be prompted as to whether he or she desires to continue play (step 719). In some implementations, the player may be offered the option of taking a "time out" and then resuming play if desired. If and when the player indicates a desire to continue, then the routine 255 determines at step 734 whether the player is currently at the correct location. This determination may be made at the system server by, for example, comparing a unique identifier such as a numeric gaming unit or non-gaming unit identifier to a unit identifier sent by the routine 255 at step 702 to the system server. In such implementations, if the unit identifier sent by the unit at which the player is currently located matches the identifier associated with the unit which is to be played next in the adventure or sequence, then the routine 255 determines that the player is at the correct gaming unit or non-gaming unit and sends configuration information to that unit at step 710. The player's location may also be determined based upon location information (such as GPS data) received from, e.g., one or devices 46 or 47. In some preferred implementations, the player has the option of continuing at a point in the activity/session at which the player left off instead of re-starting the activity/session.

On the other hand, if the routine 255 determines at step 734 that the player is not at the correct location, then at step 736 the routine 255 instructs the player to go to the proper location. These instructions may be textual, graphical and/or audio messages that are sent by the system server to one or devices 46 or 47 and/or to the gaming unit at which the player is currently located. One of devices 46 and 47 and/or the gaming unit may, in turn, display or play (i.e., in the case of audio) these messages so that the user is informed of where the next gaming unit or activity in the adventure or sequence is located. In some cases, for example, the next gaming unit or activity may be located within the venue at which the player is currently located, may be located in another remote venue, etc. Once the player has been informed at step 736, the player may have a predetermined period of time within which to attempt to reach the indicated destination (steps 799 and 734). The player may also be prompted as to whether he or she desires to continue (step 799). This may be advantageous, for example, if the player does not have enough time to reach the desired destination, is tired, etc. If a predetermined time elapses before the player reaches the location (or if the player decides to discontinue play) at step 79, control passes to step 738.

If, for example, the reward information is transferred to a gaming unit, the gaming unit may display or otherwise communicate the reward information to the player and, at step 738, the routine 255 may cause the gaming unit or some other device to store the reward information on the portable data storage device 46. Preferably, a game server or similar device is also updated, e.g., for subsequent validation when a player cashes out. After the routine 255 has updated the portable data storage device 46 as described above, the routine 255 terminates at step 740 and control of the gaming unit or activity may be returned to, for example, a routine such as the main routine 200 (FIG. 4).

Although not specifically shown in FIG. 16, various credit checks, use authorizations, etc. may be used as desired. Such credit checks and authorizations are generally well known in the art. However, it should be noted that such credit checks and use authorizations may be based on unique alphanumeric codes, biometric information, etc., all of which may, for example, be stored on the portable data storage device 46 for subsequent comparison to actual information input by a player. U.S. patent application Ser. No. 09/921,489, entitled "Player Tracking Communication Mechanisms in a Gaming Machine" and filed on Aug. 3, 2001, and U.S. Pat. No. 6,488,585, entitled "Gaming Device Identification Method and Apparatus," describe relevant technology and are hereby incorporated by reference for all purposes.

While the adventure or sequential gaming described in connection with FIG. 16 uses a sequence that is generated prior to beginning execution or play of the adventure, the sequence may, if desired, be generated in other manners. For example, adventures or sequences could be generated on-the-fly in a random fashion, based on the player's performance or based on any other parameter desired.

Figure 17:
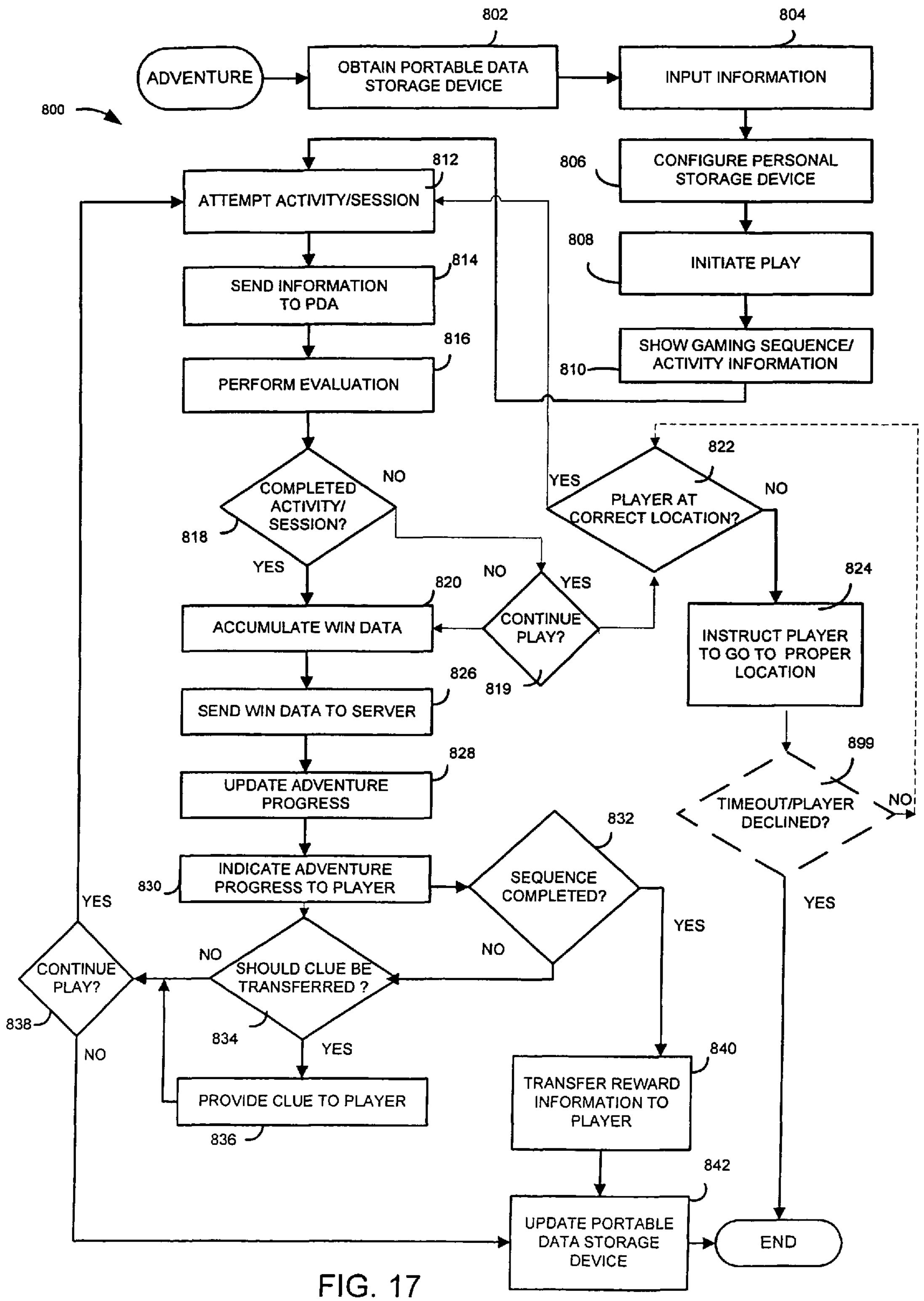
FIG. 17 provides a flowchart that generally depicts an exemplary manner of carrying out a sequential gaming activity.

FIG. 17 is an exemplary flowchart of an adventure routine 800, which may be performed by one or more of the gaming units 20, 30 and non-gaming units and 21, 31 within the system 10 to enable one or more players to engage in sequential adventure activities. Before discussing the adventure routine 800 in greater detail, it is important to recognize that the adventure routine 800 described herein is only one exemplary manner in which sequential activities may be carried out within the system 10.

According to some implementations of the invention, if a player decides to take part or compete in an adventure, the player must be equipped with the proper hardware to participate. As mentioned previously, the hardware may come in several forms and may include a personal storage device 46 and playing device 47. More specifically, the personal storage device 46 may include, but is not limited to, personal computers, commercial handheld devices, credit cards, smart cards, RFID devices, memory sticks, memory chips, mobile telephones or other devices that include some storage capacity. Similarly, the playing device 47 may include, but is not limited to, a GPS, a metal detector, or the like. Some or all of the devices used for the adventure may already be owned by the player, or may need to be acquired from a casino or other adventure host. In step 802, for example, the player may have in his possession a credit card, Palm Pilot® or the like, that the player may have obtained for other reasons or functions, but that may be utilized as a personal storage device 46 for an adventure. In contrast, the player may be provided with all the hardware required for a specific adventure by a gaming establishment such as a casino or the like.

Once the player is properly equipped, step 804 may allow for the input of personal information, wherein the information may be used for a multitudes of purposes including, but not limited to, security and normalization. Step 804 may involve the retrieval of personal information from a pre-existing database, such as a player tracking database. Relevant methods are described in U.S. patent application Ser. No. 09/921,489, entitled "Player Tracking Communication Mechanisms in a Gaming Machine" and filed on Aug. 3, 2001, which has been incorporated by reference herein. The type of personal information used or required may include the entire range of available information, such as date of birth, social security numbers, driver license number, a password, age, gender, health, height, weight, finger print, eye scan, or any other player identifiable information. If used for security purposes, the personal information may be used to identify the player during the different stages of the adventure, or may be used to prevent deception or fraud during play of the adventure. If the information is used for normalization reasons, the information given may be combined to provide a profile or score for a player, wherein the profile may later determine the sequence of activities and type of activities attempted in box 812, and wherein the score may be used to handicap the player, thereby attempting to equalize the players, giving each player a chance of wining the game or beating another player.

Before initiating play in box 812, step 806 may allow the personal storage device 46 to be configured with information and/or software relating to the adventure. The configuration may occur within the personal storage device 46, or may be accomplished by being communicatively linked to any number of computers or networks, such as the network computers 22 and 32, the network 40 or any of the gaming or non-gaming units 20 and 21. The information and software may include normalization data or information relating to an adventure activity, or it may include information regarding all the adventure activities and the entire gaming sequence. The information may also include personal data, such as could be used for security reasons, or it could also include advertisements for some or all of the sponsors or entities involved in the adventure. The software may, for example, be of a mainstream type such as a reader, or may be specifically engineered for play of the adventure.

The configuration of the personal storage device 46 may vary greatly depending on factors such as the type of the device that is utilized, the implementation of the invention and where the configuration takes place. If, for example, the player is provided with a personal storage device 46 at a casino in the form of a PDA, an iPod® a or a similar hand held device, the player may receive the personal storage device 46 (for example, after providing identification information) pre-loaded with all the necessary information and software. Alternatively, if the portable storage device 46 utilized is in the form of a mobile telephone, iPod®, Palm Pilot®, etc., and is being configured externally from the casino or host, the portable storage device 46 may be placed in a cradle-like device, connected to a port (e.g., a USB port) for communication with a home computer or another device. Once connected, the portable storage device 46 may be communicatively coupled to one or more devices of network 10 (e.g., to one of servers 22, 32) via the Internet or other network 40, such that the portable storage device 46 is now able to receive adventure information and any necessary software, thereby being configured. In another example, the portable storage device 46 may be able to independently connect to the server 22, 32 via radio signal or any other suitable wireless means. For example, a player may be provided a telephone number to dial, thereby enabling a mobile telephone to be configured.

The player may now be ready to initiate play of the adventure at box 808, wherein the player may start the adventure in many ways, including, but not limited to, pressing a button or icon on the personal storage device 46, or simply waiting for a specified amount of time to elapse. Once the player has initiated play, the personal storage device 46 may communicate, either directly or indirectly with the server 22, 32, one or several pieces of information or data. After play is initiated, the personal storage device 46 may simply relay that fact to the server, or perhaps activate a clock or time keeping machine. The communication between the personal storage device 46 and the server 22, 32 may, however, be more complex, possibly including such information that is indicative of the next activity, or indicative of the entire sequence of the adventure.

At box 810, the player may receive information indicative of an activity, the activity being one activity in the sequence of activities comprising the adventure. The indicative information may, once again, come in many forms including, but not limited to, clues, directions, coordinates, specific instructions, or the like. The player, for example, may receive a clue, such as "play a slot machine at casino XY," thereby requiring the player to go to casino XY and play a slot machine, or the clue may be more specific, e.g., "play twenty hands of video poker at machine number 1234 at the XY casino." In another example, the information may be indicative of an activity or may simply be a set of coordinates such as Latitude N36° 01.000', Longitude W114° 44.178, wherein the player would be required to go the Hoover Dam, located near Las Vegas, Nev., or the player may receive instructions to purchase a certain brand named item, such as can of Coca-Cola® or Pepsi®.

Some activities include a "puzzle" element, wherein completion of predetermined tasks allows a player to receive further information for completion of the puzzle. The information may be clues to solving a mystery (e.g., a murder mystery) letters in a phrase, pieces of a puzzle (e.g., parts of a picture), etc. In some such implementations, a player may be allowed to "jump ahead" without completing all predetermined tasks if the player can guess the puzzle (e.g., identify a picture/scene, solve a mystery, guess a word, a phrase, a book, a movie, etc.) with fewer than the total number of puzzle elements.

At step 812 the player may attempt to do or complete the activity shown in step 810. If the information received in step 810 is indicative of a location or place, such as coordinates or the name of the place, the player may have to proceed to that location. For example, based on the information received in step 810, the player may attempt to find the casino XY and/or gaming unit 1234 as per the instructions. Once in casino XY and at the gaming unit 1234, the player, in one example, may be at a video blackjack gaming unit as described in FIG. 9, where the player may be required to play a certain number of games or wager a certain amount of value to properly complete the activity. Similarly, if the information is indicative of purchasing a product, the player may have to proceed to a store or location where the product can be purchased and purchase that product.

In some implementations, a player may receive additional information and/or instructions after arriving at a destination. Accordingly, once the player has reached what the player believes to be the right destination, the player may be required, at box 814, to update the status of the activity to the portable storage device 46. For example, the player may insert some types of portable storage device 46 into a gaming unit 20, a non-gaming unit 21, and/or a playing device 47. It should be noted, that the portable storage device 46 may be inserted into any one of the gaming unit 20, the non-gaming unit 21, or the playing device 47 prior to the completion of the task. Similarly, the portable storage device 46 may not need to be inserted, but may be communicatively coupled with the above devices and others such as the network computers 22, 32, and the network 40.

In one example, the player is directed to go to casino XY and to take certain actions, e.g., to play a required number of games to wager the required amount, etc. Moreover, in this example, the player inserts a portable storage device 46 into gaming unit 1234 at casino XY. If the player is in casino XY, as required by the information, and the player has played the required number of games, wagered the required amount, etc., the portable storage device 46 may recognize that the player is at gaming unit 1234 at casino XY casino and that the player has completed the activity.

In another example, the player has attached to the portable storage device 46 a GPS device, giving the player location information such as readings of longitude and latitude. As the player approaches his destination, such as the Hoover dam, the portable storage device 46 may automatically receive the coordinates from the GPS device.

In yet another example, the player was instructed to purchase a specific item, such as can of Coca-Cola® or Pepsi®. Here, the player may have a bar code reader and/or an RFID reader attached to the portable storage device 46, with which the player could identify the products by scanning a bar code, an RFID tag, etc., on the product.

After the information from the activity is sent to the personal storage device 46 at step 816, the personal storage device 46 may perform a win evaluation to determine whether the activity has been properly completed. If at step 818 the personal storage device 46 concludes that the activity has been completed, the routine 800 may send the accumulated win data to a system server, e.g., one of the network computers 22 and 32 (step 826).

If the routine 800 determines at step 818 that an existing adventure activity/session or sequential gaming activity/session has not been completed, then in some implementations the player is prompted (e.g., by a message sent to device 46 or 47) whether the player wishes to continue (step 819). If so, the routine 800 determines at step 822 whether the player is currently at the correct location (e.g., at the correct gaming unit or non-gaming unit). This determination may be made at the system server by, for example, comparing a unique identifier such as a numeric gaming unit identifier to a gaming unit identifier sent by the routine 800 at step 806 to the system server, by reference to location information from device 46 and/or device 47, etc.

If the location is correct, then further instructions and/or configuration information may be sent from a server. For example, if the gaming unit identifier sent by the unit at which the player is currently located matches the identifier associated with the gaming unit which is to be played next in the adventure or sequence, in some implementations of the invention the routine 800 determines that the player is at the correct gaming unit and sends session information to that gaming unit at step 812.

On the other hand, if the routine 800 determines at step 822 that the player is not at the correct location or unit, then at step 824 the routine 800 instructs the player to go to the proper unit or location. These instructions may be textual, graphical and/or audio messages that are sent by the system server to the gaming unit at which the player is currently located, and the gaming unit may, in turn, display or play (i.e., in the case of audio) these messages so that the user is informed of where the next gaming unit or activity in the adventure or sequence is located. In some cases, for example, the next gaming unit or activity may be located within the venue at which the player is currently located, may be located in another remote venue, etc. According to some implementations, the player may be allowed a predetermined time within which to reach the proper location before the routine ends (step 899). Alternatively, or additionally, the player may be prompted to indicate whether the player wants to continue the activity/session.

The updating of the adventure progress (step 828) may be carried out by determining, for example, the number of bonus points achieved in total and/or toward completing the current step or gaming activity in the adventure or sequence. Of course, many other manners of measuring adventure progress could be used. For example, the number of plays in which a player has engaged on a particular gaming unit and/or the amount of winnings in total (or on a particular gaming unit) could be used to control or measure adventure progress. At step 830, the routine 255 may inform the player as to his progress in the adventure.

At step 832, the routine 800 may determine whether or not the sequence associated with the adventure currently being played by the player is completed. For example, a server may determine whether or not all of the gaming units or activities in the sequence have been played to a sufficient level (e.g., winnings, bonus points, time, etc.) as required by the adventure. If the adventure has not been completed (i.e., one or more gaming units or activities have not yet been played and/or one or more gaming units or activities have not been played to a sufficient level of winnings, bonus points, etc.), the routine 800 at step 834 determines whether or not a clue associated with the next step (e.g., gaming unit or activity) of the adventure should be transferred or provided to the player. Clues may, for example, take the form of a textual, graphical and/or audio message. Alternatively, clues may be, or may include, physical objects.

For example, a clue may directly inform the player of the location of a particular gaming unit or activity that must be played next, according to the adventure sequence. In some cases, the next gaming unit or activity may be located within the same venue at which the player is currently located. In other cases, the next gaming unit or activity may be located within a different venue that may, for example, be located remotely from the player's current location.

Still further, one or more clues may, instead of providing direct information regarding the identity and location of the next gaming unit or activity in the adventure, provide information that only hints or suggests in an indirect manner at the location and identity of the next gaming unit or activity to be played in the adventure. For example, the clue may include a partial description of the venue at which the next gaming unit or activity is located, may include terms that are associated with the next venue, gaming unit or activity in the adventure sequence, etc.

In some implementations, the clue provides additional information for solving a mystery or a puzzle. For example, forensic evidence, witness testimony, etc., may be provided for solving a murder mystery. Additional letters, words or phrases may be provided for solving a word puzzle. The word puzzle may involve decrypting a coded message. One or more parts of a picture, such as a puzzle piece, may be provided. In some such implementations, a player may be able to win a game and/or a prize without completing all predetermined tasks if the player can solve the puzzle (e.g., identify a picture/scene, solve a mystery, guess a word, a phrase, a book, a movie, etc.) with fewer than the total number of puzzle elements. Accordingly, the player may be permitted one or more opportunities to solve the puzzle after receiving a clue in step 836 (or at another step).

The specificity of the clues provided may be of any degree desired. Moreover, the specificity of the clues may, for example, vary within a particular adventure, may vary according to characteristics of a particular player (e.g., in an attempt to normalize the players' expected skill levels), may vary from step to step within a given adventure, etc.

The routine 800 may, for example, carry out the transfer of clue information by causing the system server to send the clue information over one or more of the networks 12, 26 to the one of the gaming or non-gaming units 20, 21 at which the player is currently located. In that case, the gaming or non-gaming units 20, 21 or activity proximate to the player may convey the clue via a video display, speaker, by a paper ticket or by some other media.

After a clue has been transferred at step 836, or if it is determined at step 834 that a clue should not be transferred, the routine 800 may ask the player at step 838 whether or not play should continue. If the player indicates a desire to continue play, the routine 800 initiates another round of game play at step 812. On the other hand, if the player indicates a desire to terminate play, despite the fact that adventure has not been completed, the routine 800 updates the player's portable data storage device 46 at step 842. The update information may include current status of the adventure or sequential adventure activity such as, for example, adventure steps completed, the degree to which an incomplete step has been achieved, total bonus points, play statistics, any intermediate promotional items awarded, the remaining credit or monetary value available to the player, etc.

If at step 832 the routine 800 determines that the sequence or adventure has been successfully completed, the routine 800 may transfer reward information to the player at step 840. Reward information may include monetary value, bonus points, promotional items or merchandise such as dinners, hotel rooms, free services, extended game play, etc. or any other desired form of value that may function as an incentive for a player to initiate and complete an adventure sequence or sequential adventure activity. Similar to the transfer of clue information, the routine 800 may transfer rewards or reward information by causing the system server to send data pertaining to the reward via one or more of the networks 12, 26 and 40 to the player, e.g., to one of the gaming or non-gaming units 20 and 21, to a portable storage device 46, to a playing device 47, etc.

After reward information is transferred, at the step 840, control is given to the step 842, wherein the routine 800 may update the player's portable data storage device 46 (and preferably a game server), as described above, and then the sequence ends and routine 800 has been completed. At that point, the player may decide to continue on to another adventure (or other) sequence or to discontinue play.

Virtual Activities

Some implementations of the invention provide "virtual reality" implementations of part or all of an adventure sequence. Gaming units and non-gaming units may comprise hardware and/or software for providing such immersive or virtual reality experiences. For example, a gaming unit or a non-gaming unit may include peripheral devices such as wired or wireless 3-D glasses, head-mounted displays, body motion sensing products such as "head tracker" products, mid-air joysticks, force feedback products, etc.

In some implementations, a simulation is made at the player's location of events in another location. For example, instead of requiring a player to change his or her location after completing a stage of an adventure sequence, some such implementations of the invention provide games and/or other activities in a virtual environment to the player, allowing the player to remain at the same location. In some such implementations, the player will be provided a simulation of traveling to another location, e.g., a simulation of high-speed travel to another gaming establishment.

Figure 18:
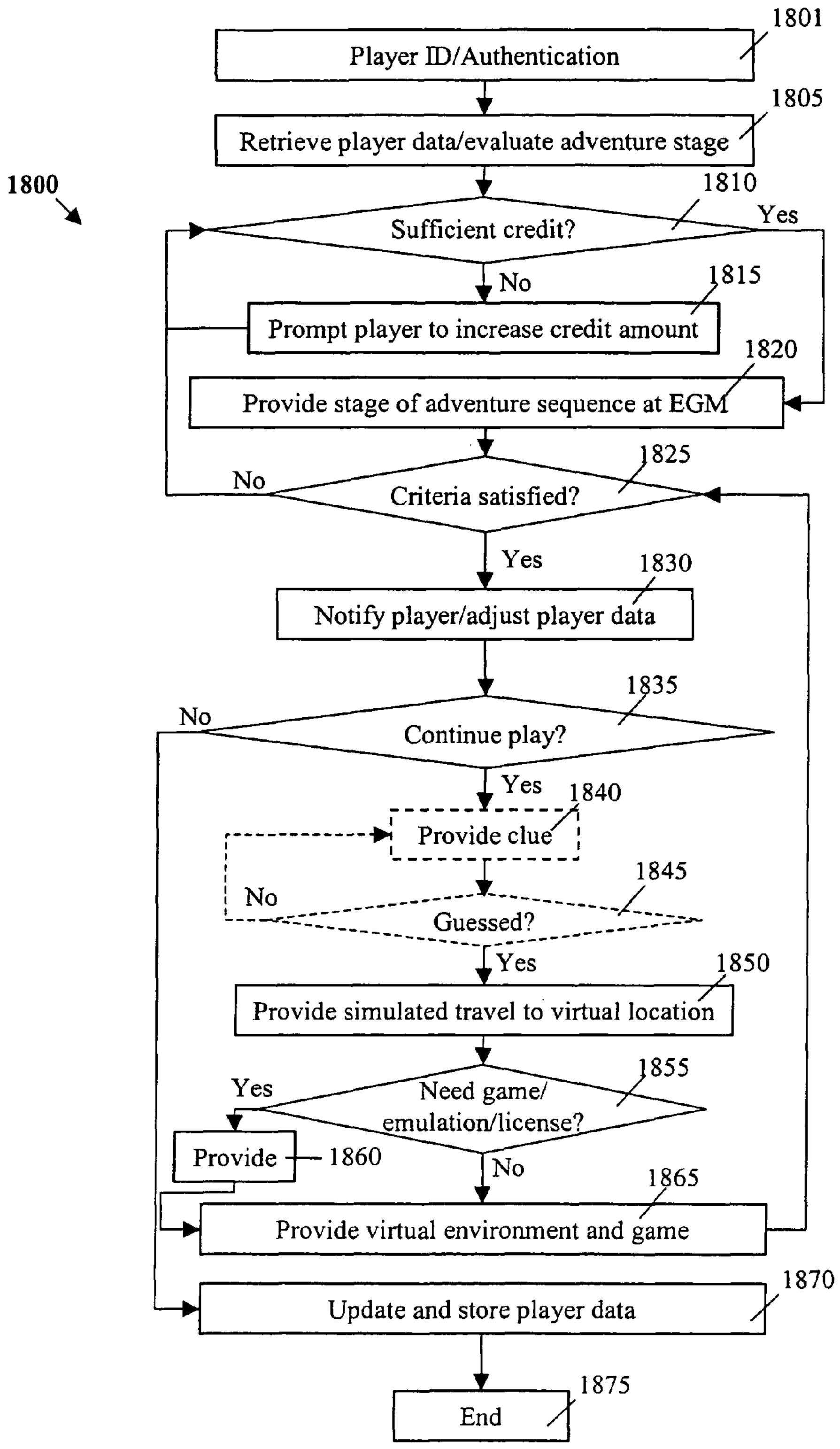
FIG. 18 is a flow chart that outlines one method of carrying out a sequential gaming activity involving at least one virtual reality stage.

One example of a virtual reality implementation will now be described with reference to the flow chart of FIG. 18. Method 1800, like other methods of the present invention, does not necessarily include all the steps indicated or described. Moreover, the steps are not necessarily performed in the order indicated.

Here, a player is using a gaming machine at the Peppermill casino in Reno, Nev. that is configured to provide at least part of a virtual reality adventure sequence. In step 1801, the player is identified, for example by reading a player tracking card, verifying a password, etc. In some implementations (e.g., if the player is competing in a high-stakes tournament), the player's identity may be verified by other means, e.g., using a fingerprint analysis, retinal scan or other biometric identification technique.

After the player has been identified, the player's data are retrieved (e.g., by the gaming machine [for example, from a portable storage device provided by the player], by a game server or by a similar network device) and the player's progress, if any, in the adventure sequence is evaluated. (Step 1805.) Here, it is determined that the player needs to complete a stage of the adventure sequence at the Peppermill. In step 1810, it is determined whether the player has posted sufficient credit to begin the stage. If not, the player is prompted to increase the credit balance (step 1815), e.g., by controlling a display device and/or speakers to ask the player to insert an indicium of credit into the gaming machine.

When the player's credit is sufficient, the gaming machine provides a wagering game to allow the player to begin (or to continue) this stage of the adventure sequence. (Step 1820.) In this stage of the adventure sequence, the player plays wagering games on the gaming machine without any simulation of another environment until meeting one or more predetermined requirements of that stage of the adventure sequence (e.g., playing a predetermined number of games, accumulating a predetermined number of bonus points, and/or wagering at least a certain amount).

In step 1825, it is determined (e.g., by a server that is controlling the adventure sequence or by the gaming machine) whether the criterion/these criteria have been satisfied. If not, the player is provided the opportunity to continue attempting to satisfy the requirement(s), provided that sufficient credit is available for gaming. The player may choose to quit at any time.

When the player has satisfied the requirement(s) of this stage, the player is notified. (Step 1830.) Preferably, an encouraging and celebratory display, sounds, etc., are presented to the player, for example in a manner similar to that by which a player is conventionally notified of winning a jackpot or a substantial prize. In some implementations, the player may in fact win a prize, a comp, etc., but in other implementations the player must complete all stages of the adventure sequence in order to win anything.

The gaming machine will then prompt the player (e.g., under the control of instructions from a server) to determine whether to continue play. If the player does not yet wish to continue to the next stage of play, data corresponding to the player's achievements during the stage just completed are logged and stored, e.g., on a portable storage device provided by the player and/or on a storage device (e.g., a network storage device) accessible by a game server. (Step 1870.) In some implementations, not only data indicating completion of the criteria are stored, but also data regarding how long a player took to achieve one or more goals, how much was wagered, what real and/or virtual locations were visited, etc. Such information may be used later to determine an overall winner of an adventure sequence in a tournament setting and/or may determine a level of a prize for which the player may ultimately qualify.

In this example, the player indicates that she wishes to continue play. In some implementations of the invention, the player may select from a number of known stages in the adventure sequence that are presented, e.g., as corresponding images on a display screen. For example, the player may be presented with images of Caesar's Atlantic City, the Trump Taj Mahal, Bellagio, Venetian, Paris Las Vegas, etc. In some such implementations, the order in which the stages are completed does not matter and the player may select the next stage. However, in other implementations of the invention, the player (or, for team implementations, someone on the player's team) will need to solve a puzzle in order to determine the next actual or virtual destination associated with an adventure sequence activity.

Alternatively, or additionally, the next adventure (which may or may not involve a virtual destination) may depend on the progress of other players that are on the same team as the first player. In some such implementations, there is a sequence of adventure stages (which may involve virtual destinations) that must be completed for a team to win. For example, a team's overall performance can result in steady progress through the sequence (e.g., for accumulating an intermediate number of points during one or more stages), skipping ahead to a more advanced stage (e.g., for accumulating a large number of points during one or more stages) or "flunking" a stage (e.g., for accumulating a small number of points during one or more stages). If a team flunks a stage, the team may be given an opportunity to repeat the stage, but other teams could be continuing to progress to more advanced stages. In some implementations, a team may be "sent back" to prior stages for particularly poor performance.

In this example, the player is given a clue (optional step 1840) and is given one or more opportunities to guess the destination of the next stage, which in this example is a virtual destination. The player's guess is evaluated in step 1845. If the player does not guess the next destination within a predetermined number of guesses, the player may be given another clue. The number of guesses and/or clues required may affect a player's overall score in the adventure sequence.

Here, the clue is a single letter "O." The player does not immediately guess the correct virtual destination, so the player is provided another clue, which is a video clip of an acrobat in costume diving into water. Eventually, the player guesses that the next virtual destination is the Bellagio, where the Cirque du Soleil performance of "O" is being presented.

As is known by those of skill in the art, providing realistic details in a virtual environment enhances the player's experience of actually being in another place. Therefore, in some preferred implementations of the invention, realistic details are provided, e.g., according to Virtual Reality Modeling Language ("VRML") scripts and/or actual still and video photography, etc. In this example, the player is presented with a realistic simulation of flying through the air from Reno to Las Vegas, with famous landmarks visible (e.g., Lake Tahoe and Lake Mead) and the rugged topography of the Basin and Range Province accurately simulated for the player's delight. (Step 1850.) The player approaches Las Vegas, then sees the shimmering lights of the Las Vegas Strip. As the player "arrives" at the virtual destination on the Strip in Las Vegas, a choreographed display of music and water fountains in front of the Bellagio is presented to the player. Then, the player is presented a simulation of moving to a simulated gaming area of the Bellagio, where the player is required to meet the predetermined requirements of a second stage of the adventure sequence.

In this example, the clue and the presentation of the "virtual Bellagio" serve both as entertainment and as promotions of the casino and some of its featured attractions. It will be appreciated that the presentation of a virtual sequence and/or the clue regarding the sequence can involve the promotion of particular gaming establishments, the promotion of products, including but not limited to gaming products, the promotion of performances, music, movies, etc.

In some instances, the "real world" or actual gaming establishment (here, the Peppermill) may not have available game software for the next game in an adventure sequence. This determination is made in step 1855. Game software for gaming in the simulated gaming establishment may be downloaded to the player's gaming machine, if necessary or convenient. (Step 1860.) Relevant information is set forth in U.S. patent application Ser. No. 11/225,407, by Wolf et al., entitled "METHODS AND DEVICES FOR MANAGING GAMING NETWORKS" and filed Sep. 12, 2005, in U.S. patent application Ser. No. 10/757,609 by Nelson et al., entitled "METHODS AND APPARATUS FOR GAMING DATA DOWNLOADING" and filed on Jan. 14, 2004, in U.S. patent application Ser. No. 10/938,293 by Benbrahim et al., entitled "METHODS AND APPARATUS FOR DATA COMMUNICATION IN A GAMING SYSTEM" and filed on Sep. 10, 2004, in U.S. patent application Ser. No. 11/225,337 by Nguyen et al., filed Sep. 12, 2005 and entitled "DISTRIBUTED GAME SERVICES" and in U.S. patent application Ser. No. 11/173,442 by Kinsley et al., filed Jul. 1, 2005 and entitled "METHODS AND DEVICES FOR DOWNLOADING GAMES OF CHANCE," all of which are hereby incorporated by reference in their entirety and for all purposes.

It may also be desirable to execute game software on a gaming machine having a type of CPU other than that for which the game software was written. For example, the gaming machine used by the player at the Peppermill may have a CPU that uses a different set of opcodes than the CPU of a gaming machine that is simulated in a virtual reality adventure sequence. (This determination is also made in step 1855.) Accordingly, various types of emulation methods and devices may be used to facilitate the execution of the desired software. (Step 1860.) Relevant information is set forth in U.S. patent application Ser. No. 11/225,337 by Nguyen et al., filed Aug. 15, 2005 and entitled "EMULATION METHODS AND DEVICES FOR A GAMING MACHINE" and in U.S. patent application Ser. No. 11/225,406 by Silva et al., filed Sep. 12, 2005 and entitled "EMULATION IN A SECURE REGULATED ENVIRONMENT," both of which are hereby incorporated by reference.

In some such implementations, a game that needs to be played in a simulated gaming establishment as part of a virtual reality adventure sequence may not be licensed to the actual gaming establishment. For example, the game may be licensed to the simulated gaming establishment (here, the Bellagio) but not licensed to the Peppermill. Alternatively, use of the game at the actual gaming establishment may exceed a number of games authorized by a current license agreement with the actual gaming establishment. (This determination is also made in step 1855.) Therefore, it may be necessary (or at least advantageous) to provide flexible methods of providing licenses for gaming software. (Step 1860.) Relevant methods and devices are described in U.S. patent application Ser. No. 11/078,966 by Nguyen et al., entitled "SECURED VIRTUAL NETWORK IN A GAMING ENVIRONMENT" and filed on Mar. 10, 2005 and in U.S. patent application Ser. No. 11/225,408 by Kinsley et al., entitled "METHODS AND DEVICES FOR AUTHENTICATION AND LICENSING IN A GAMING NETWORK" and filed on Sep. 12, 2005, both of which are hereby incorporated by reference in their entirety and for all purposes.

The player is then provided an opportunity to complete the next stage of the adventure sequence. (Step 1865.) One or more criteria for completing this stage are evaluated (step 1825) and the player may continue with this stage as long as the player desires to do so (step 1835) and has sufficient credit (step 1810). In alternative implementations, the player may have a time limit within which the stage must be completed. When the gaming session ends, player data (e.g. regarding the players status, progress, time of play, bonus points accumulated, etc.) are stored in step 1870. In step 1875, the process ends.

Gaming Agents

Virtual players, also referred to herein as player game agents ("PGAs"), may act on behalf of real players in some implementations of the invention. A PGA may be able to play games autonomously, e.g., when the associated player is at a different location and/or is not aware of the PGA's current activities. A human player may be represented by a PGA, which may be manifested as software that controls various devices to act behalf of the actual player. A PGA may be programmed to have relatively more or relatively less intelligence and/or ability for autonomous decision-making.

In preferred implementations, PGAs can provide autonomous gaming (or non-game activities) on behalf of a player according to predetermined rules and parameters. Some such PGAs are programmed to provide autonomous gaming by following player-defined instructions. Other PGAs may be programmed to provide autonomous gaming according to the gaming style and/or wagering patterns of a player.

The PGA may gain powers/abilities according to one or more factors such as usage/experience, keeping a certain balance in a gaming account, etc. In some such implementations, the player must "feed" the PGA with money/financial credits in order to keep it healthy. The increased powers/abilities/experience of a PGA could manifest themselves in various ways, depending on the context. If the PGA is used for gaming, increased ability may mean, inter alia, a better pay table. If the PGA is capable of negotiating on behalf of its human, increased ability may mean better "comps," such as a better hotel room, a ticket for a better show, higher-quality drinks or food, etc. In other contexts, the increased abilities could mean that the PGA gains more endurance, more bonus points, more pieces of a puzzle, etc.

Participating gaming establishments will preferably have one or more agents (a/k/a Super Game Agents or "SGAs") for interacting with PGAs. PGAs may be enabled to negotiate with SGAs on behalf of real players, e.g., for comps, better pay table percentages, etc. In some implementations, a PGA's negotiating position is enhanced by competition among SGAs: an SGA can compete with another SGA in order to obtain the patronage of a PGA.

Activities of PGAs and SGAs may be implemented, at least in part, by one or more agent game execution units ("AGEUs"). An AGEU may be a network device such as a server. Some embodiments of the invention include an AGEU at each participating gaming establishment and one or more AGEUs at a central location. In some implementations, each participating gaming establishment has an AGEU and AGEUs from different gaming establishments can communicate with one another. In other implementations, an AGEU hosts multiple virtual machines, each of which can execute software (e.g., SGA software, PGA software, game software, etc.) from a particular manufacturer/supplier.

In some implementations, there are multiple SGAs for each AGEU. Each SGA may represent different games, tournaments or other offerings of a gaming establishment. In some such implementations, a library of SGAs may be stored on storage media accessible by the central AGEU and made available (e.g., downloaded from a server) for a fee to AGEUs of participating gaming establishments. A downloaded SGA may be, for example, added as execution script to an AGEU of a participating gaming establishment.

Figure 19A:
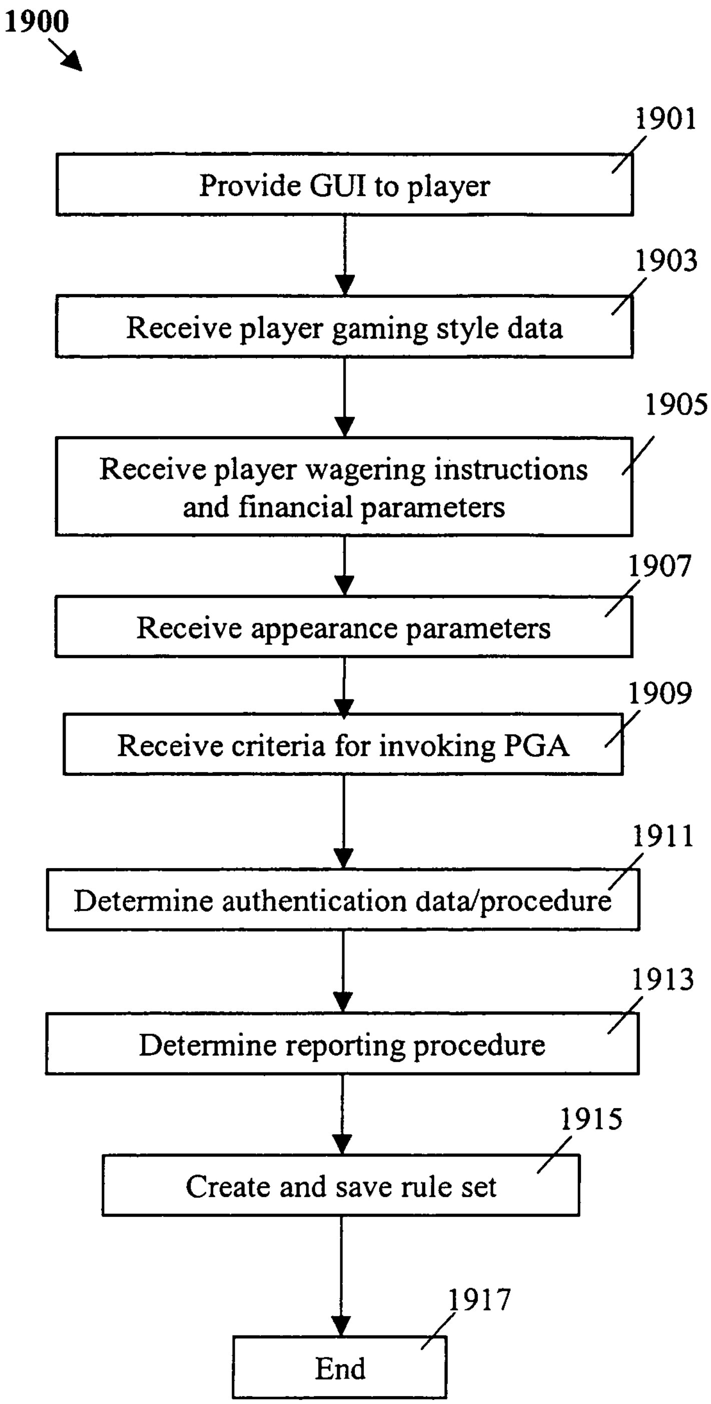
FIG. 19A is a flow chart that outlines some methods of forming a player gaming agent according to a player's gaming characteristics.
Figure 19B:
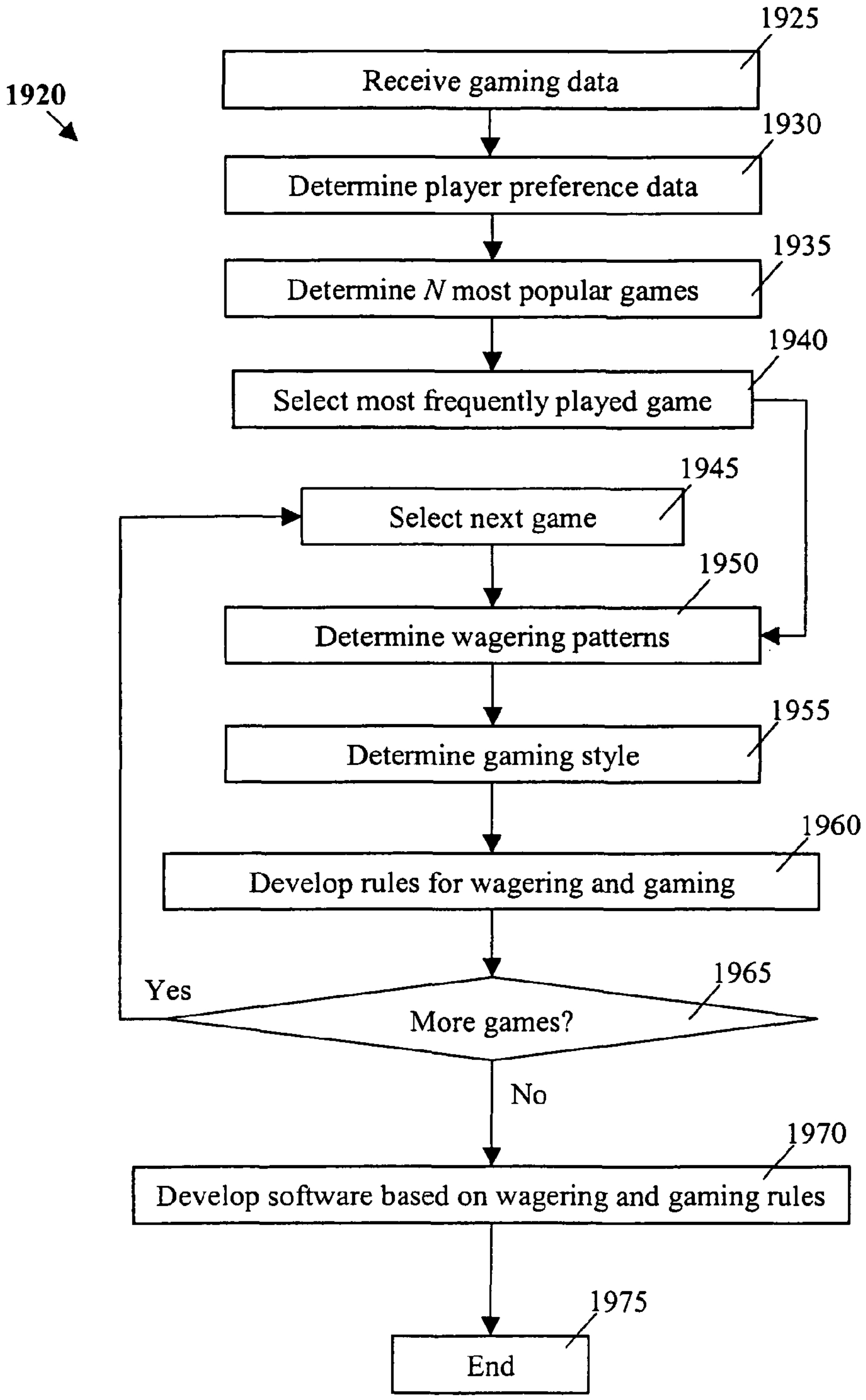
FIG. 19B is a flow chart that outlines alternative methods of forming a player gaming agent according to a player's gaming characteristics.

Some exemplary methods for programming a PGA are outlined in flow chart 1900 of FIG. 19A and flow chart 1920 of FIG. 19B. It is envisioned that PGAs will be defined and enabled in jurisdictions within which the enabled gaming activities are legal. Similarly, it is envisioned that PGAs will draw upon accounts in financial institutions located in jurisdictions within which the enabled gaming activities are legal. However, after the PGA is enabled, the player may be in another jurisdiction while the PGA is performing gaming operations.

Referring first to FIG. 19A, a relatively simpler method of creating a rule set for a PGA will now be described. Method 1900 begins when a form, a graphical user interface ("GUI"), etc., is provided to a player. Here, the player is prompted to interact with a GUI of a host device, such as a networked PC, workstation, laptop, PDA, gaming machine, etc., in order to define parameters for a PGA. In step 1903, the player inputs parameters regarding what types of games will be played, whether tournament play will be enabled, etc. In some implementations, the player is only able to specify simple instructions, e.g., at a Megabucks™ gaming machine at the player's "lucky spot" in the MGM Grand, bet a predetermined amount and perform 10 handle pulls. A sequence of activities in one or more gaming establishments may be indicated.

In some implementations, a particular time is specified for performing the required actions. In other implementations, the required actions may be performed within a specified period of time (e.g., 25 handle pulls within 1 month), but not at any particular time or times. In some such implementations, the PGA will perform the required actions at one or more random times during a specified time interval.

In other implementations, the player may be asked specific questions regarding game play for one or more types of game. For example, if the player desires the PGA to play video blackjack, the player may be asked to indicate the circumstances in which the PGA should ask for a "hit."

In step 1905, the player inputs wagering instructions and other financial parameters. Here, the player may indicate a maximum bet, an average bet, a maximum amount of money that will be available for gaming during a specified time period, e.g., $100 per night, $500 per week, etc. The player may also include account information, e.g., a credit card number, a checking or savings account number, etc.

In this example, the player is then prompted to input manifestation parameters such as appearance parameters and voice parameters (step 1907), and invocation parameters (step 1909) for the PGA. It can be advantageous to have the PGA manifest itself in ways that are recognizable and pleasing to the human player. One advantage is that the player may become fond of his or her PGA and be more likely to keep it "alive." For team play, it may be advantageous to have the PGA manifest itself in ways that are recognizable to other players (e.g., in group combat games), so that it is clear on which team the PGA is playing.

The PGA may be invoked according to various criteria, including but not limited to predetermined time intervals, on dates chosen by the player (e.g., on "lucky number" dates), etc. In some implementations, the PGA may be invoked via an attraction sequence that is directed to the player, via email, telephone, text messaging, by a program running in a portable device, etc. For example, the PGA may call the player and say, e.g., "Hey, I have not heard from you lately!" or the like. In alternative implementations, the PGA may appear on the player's computer display and/or speak to the player through speakers attached to the player's computer.

In step 1911, an identification/authentication procedure is defined for the PGA. For example, a procedure may be determined for authenticating requests for money from the PGA to a financial institution, for authenticating requests to initiate a gaming session from the PGA to an SGA of a gaming establishment, for verifying that the PGA belongs to a player who may legally gamble in the jurisdiction(s) in which the PGA will perform gaming operations, etc. In addition, procedures may be determined for modifying the parameters of the PGA, disabling PGA activities and/or access to a financial institution, etc. The play may enter user ID and other information (name, age, SS#, etc.) that will be associated with the PGA. A certificate could be created that allows the agent to be identified and authenticated/certified at each venue before the PGA plays. Such a (digital) certificate may be generated, for example, by using tools from RSA™ (www.rsasecurity.com), Thawte™ (www.thawte.com) or VeriSign™ (www.verisign.com).

A procedure for reporting PGA activities is defined in step 1913. Both the type and frequency of reporting may be defined For example, the PGA may report via email, telephone, text messaging, etc. The reporting may be on demand, upon the occurrence of predetermined events and/or according to a user-specified periodicity.

In step 1915, a rule set and a corresponding computer program are created and saved, according to the player input. The computer program is preferably created via an automated procedure using some form of artificial intelligence known by those of skill in the art, such as conventional artificial intelligence (e.g., "machine learning"), computational intelligence or a comparable area of artificial intelligence. Machine learning, for example, is a method for creating computer programs by the analysis of data sets. However, some degree of human intervention may be required for constructing relatively more complex PGAs.

Some implementations of the invention use aspects of artificial intelligence theory known as "General Game Playing" or "GGP." Such implementations of the invention may use a generalized "Game Description Language," e.g., of the type described in Genesereth, M. and Love, N., "General Game Playing: Game Description Language Specification" (Stanford University, Mar. 15, 2005), which is hereby incorporated by reference. Relevant source code for poker gaming may be found at http://spaz.ca/aaron/poker/src/eval.html.

The resulting program is preferably stored in a storage medium that is accessible by an AGEU. As noted elsewhere herein, an AGEU may be a network device, such as a server, that will implement or facilitate the use of the PGA. A player may create and train one or more PGAs. Each PGA may have substantially the same gaming style or a substantially different gaming style, as set forth in more detail below. The process ends in step 1917.

An alternative process of defining parameters for a PGA will now be described with reference to flow chart 1920 of FIG. 19B. In this process, player gaming data are received in step 1925. This step may be implemented in a variety of ways. For example, gaming data may be extracted from historical gaming data that has been recorded, e.g., in connection with a player's use of a player tracking card or similar player tracking device. In some such implementations, the player will have previously selected a finer granularity of data sampling and storage than would be used in a normal player tracking program. In other words, not only the games played and wagers made would be stored, but also the player's decisions at various stages of play. For example, the circumstances that would induce that player to draw or hold cards while playing poker would have been stored for later analysis. Among other factors, the player's risk tolerance may be assessed. For example, the player's style of play may be compared to a "perfect" strategy (e.g., a perfect poker strategy) to determine whether the player is relatively risk-seeking or relatively risk-averse.

However, instead of using player tracking data or other historical data, some implementations of the invention provide a process wherein aspects of a player's gaming are prospectively "learned." Accordingly, some aspects of the invention involve implementations of artificial intelligence for both the process of learning rules and the process of constructing software to implement these rules.

For example, a player could enable any of several programs known in the art for machine learning, some of which are specialized for the gaming context, and then engage in one or more gaming sessions. Some such programs rely on heuristic search algorithms, neural networks, genetic algorithms, temporal differences, and other methods. An overview of some such methods is set forth in "Games, Computers, and Artificial Intelligence," Artificial Intelligence Volume 134, Issues 1-2 (January 2002). By allowing the machine learning software to record and analyze the player's responses to actual gaming situations, the machine learning software can analyze these data and develop rules for wagering and gaming in a style that mimics the corresponding styles of the player.

In this example, player preference data is also determined (step 1930). Player preference data may involve such matters as whether a player enjoys tournament play, what sort of "comps" the player may prefer, etc. Player preference data may be obtained via explicit indications from the player and/or via inference from actual player performance.

Here, a player's gaming data (obtained in any of the above-mentioned ways) are first analyzed to determine N games that the player most often plays. (Step 1935.) N may be any convenient predetermined number which, in some implementations, is designated by the player. In step 1940, the most frequently-played game is selected for analysis. A player's wagering patterns are determined (step 1950) by analyzing the gaming data obtained in step 1925. For example, it may have been observed that the player consistently likes to place a "Max Bet." Alternatively, it may have been observed that the player increases her bet after losing (or winning) a game.

The player's gaming style is determined in a similar fashion. (Step 1955.) For example, scenarios in which a player has been observed to hold, draw, fold, change gaming machines, quit, etc., are analyzed to determine whether consistent patterns of gaming behavior can be extracted. In step 1960, wagering and gaming rules are developed for the first game and stored.

In step 1965, it is determined whether there are additional games for analysis. If so, the next game is selected (step 1945) and the process continues until all N games have been analyzed. In step 1970, software is developed according to the rules and stored. As previously mentioned, the resulting software for controlling the PGA's gaming and wagering behavior is preferably stored in a storage medium accessible by an AGEU. The process ends in step 1975.

Figure 20:
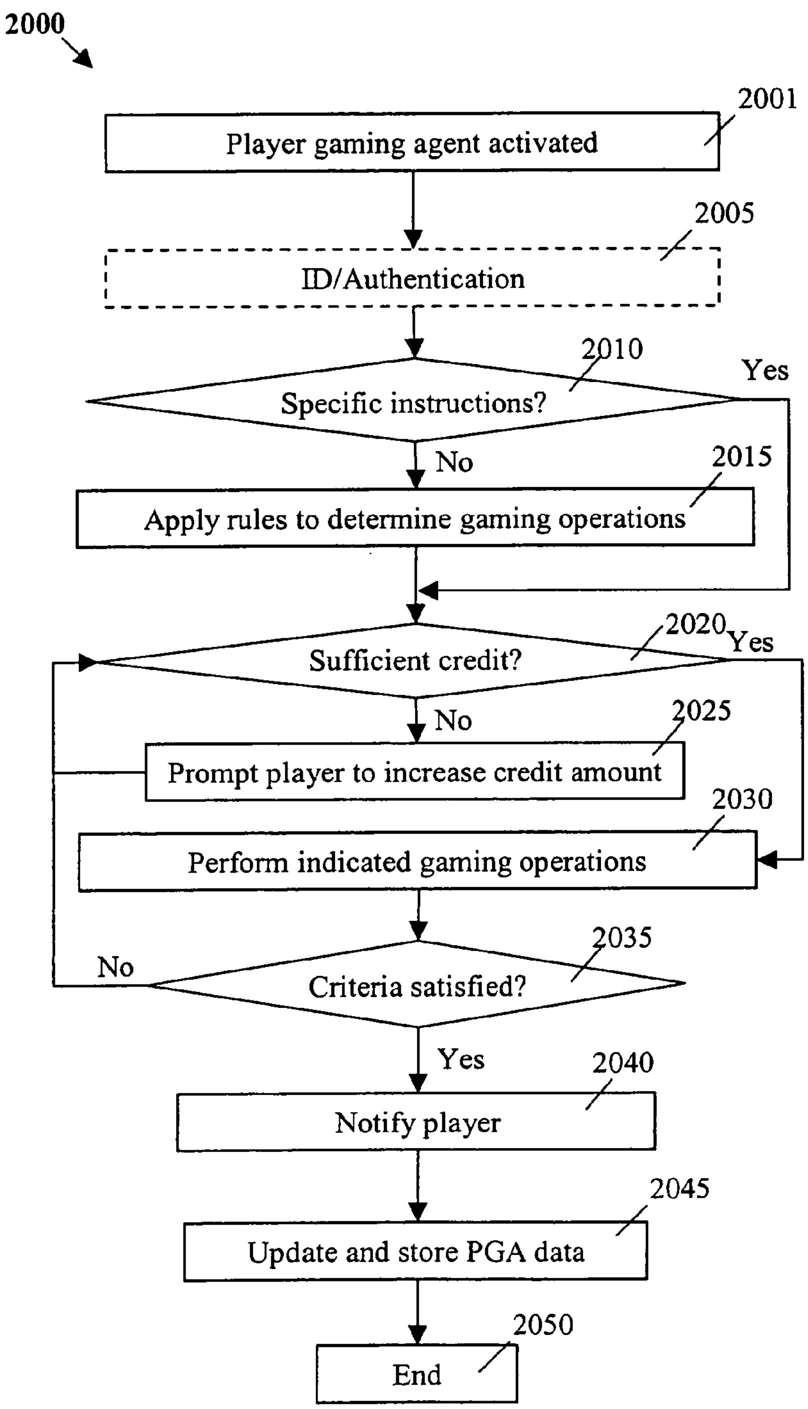
FIG. 20 is a flow chart that outlines some methods of using a player gaming agent.

Method 2000 of FIG. 20 outlines some methods of using a PGA that has been created according to the invention. In step 2001, the PGA is activated. As we have seen, this activation may occur in a variety of ways. In some implementations, the player will have previously specified dates and times on which the PGA will activate. In other implementations, the PGA may contact the player and convince the player to let it play. The PGA may also request that the player take other actions, e.g., "feed" the PGA some money and/or let the PGA play games that it may want to try (e.g., games that have been proposed by an SGA, as described elsewhere herein).

In step 2005, one or more identification and/or authentication processes known in the art may be employed. For example, if the PGA needs to access an account at a financial institution, the financial institution may challenge the PGA and require an appropriate response. An SGA representing a gaming establishment, e.g., representing Harrah's in Las Vegas, may challenge the PGA for various reasons. For example, the SGA may need to ensure that the PGA is authorized to play at the casino, is not a PGA that is known to have been appropriated by a hacker, that the PGA has not played for more than a predetermined maximum authorized period of time, has not wagered more than a predetermined maximum amount of money, etc. As described elsewhere herein, in some implementations both the PGA and the SGA may be implemented by software that is executing, at least in part, on the same AGEU.

If the PGA is properly authenticated, it is determined in step 2010 whether the PGA has specific instructions for this gaming session and game type. For example, in some implementations, the PGA may be programmed in a simple fashion and may have a clear set of instructions, e.g., play 10 predetermined slot games at a particular casino and place a predetermined bet on each game. If the PGA does not have specific instructions for this gaming session and game type, in this example rules are applied and/or artificial intelligence software is executed to determine the indicated gaming operations for this gaming session. In either case, the method then proceeds to step 2020.

It is determined in step 2020 whether the amount of money or other credits available to the PGA is adequate for the indicated gaming operations. In this implementation, if the PGA has insufficient credit for the indicated gaming operations, the PGA will prompt the real player to increase its credit, e.g., to make more money available to an account that is accessible by the PGA. However, in other implementations, the PGA will not request additional credit from the player unless it is determined that the player is also in a jurisdiction that will allow gaming of the type that the PGA is seeking to perform. The PGA may, for example, merely send a message to the player indicating that it was unable to play because of insufficient funds, at which time the process would end.

When the PGA has sufficient credit, it will perform the indicated gaming operations. (Step 2030.) Performing these gaming operations may involve establishing a trusted communication with one or more devices in a gaming network, e.g., as described in U.S. patent application Ser. No. 11/225,407, by Wolf et al., entitled "METHODS AND DEVICES FOR MANAGING GAMING NETWORKS" and filed Sep. 12, 2005, which has been incorporated herein by reference. Such devices may include one or more servers that can communicate with, and control the operations of, various gaming machines.

In this example, it is determined in step 2035 (e.g., by the AGEU) whether predetermined criteria are satisfied. The criteria preferably depend on the complexity of the PGA's task(s) and the relative "intelligence" of the PGA. If it is determined in step 2010 that the PGA had specific instructions, the criteria should allow a determination of whether the instructions have been followed, e.g., whether the PGA has played all games that were indicated by the player. On the other hand, if the PGA is more intelligent, it may have the ability to play a number of different games, use various strategies, etc., during a single gaming session. The PGA may, for example, be able to respond autonomously to offers from an SGA to play a game other than that which the PGA would otherwise have played during the gaming session. For intelligent PGA implementations, it may be determined in step 2035 whether the PGA has wagered a maximum amount, whether the gaming session has lasted for a maximum time period, etc.

If it is determined in step 2035 that the criteria are not satisfied, it is determined whether the PGA has sufficient credit to continue. If not, the player may be prompted to increase the available credit, or (in other implementations) the PGA's gaming operations will terminate. If it is determined in step 2035 that the criteria are satisfied, the process will proceed to step 2040 wherein the player is notified of the results of the PGA's gaming session. For example, software running on the AGEU (perhaps the PGA itself) may send the player an email summary of the gaming session, including the number and type of games played, gaming results, bonus points and/or monetary outcome, etc. In alternative implementations, the information may be communicated via telephone or by text messaging. In some implementations, gaming results are obtained from the gaming machine, "zipped" and emailed to a player's host device (e.g. a PDA, a PC, etc.).

In step 2045, data regarding the PGA's gaming operations are updated and stored, e.g., on a storage device accessible to the AGEU. In other implementations, at least some of these data are stored in a storage medium that is also accessible to the player and/or transmitted to the player. Instead of (or in addition to) receiving a summary report, the player may be able to view still shots, a video or another such reproduction of part or all of the PGA's gaming session. For example, gaming results may be sent by cable, by satellite, etc., to a television and/or stored in a hard drive for later viewing on a television, a laptop, a personal computer, a PDA, etc.

In alternative implementations, part or all of the gaming session could be captured in a manner described in U.S. patent application Ser. No. 11/225,406 by Silva et al., filed Sep. 12, 2005 and entitled "EMULATION IN A SECURE REGULATED ENVIRONMENT," which has been incorporated herein by reference. The player could use emulation software loaded on another device to reproduce the actual displays, sounds, etc., of the game outcomes. In step 2050, the process ends.

Figure 21:
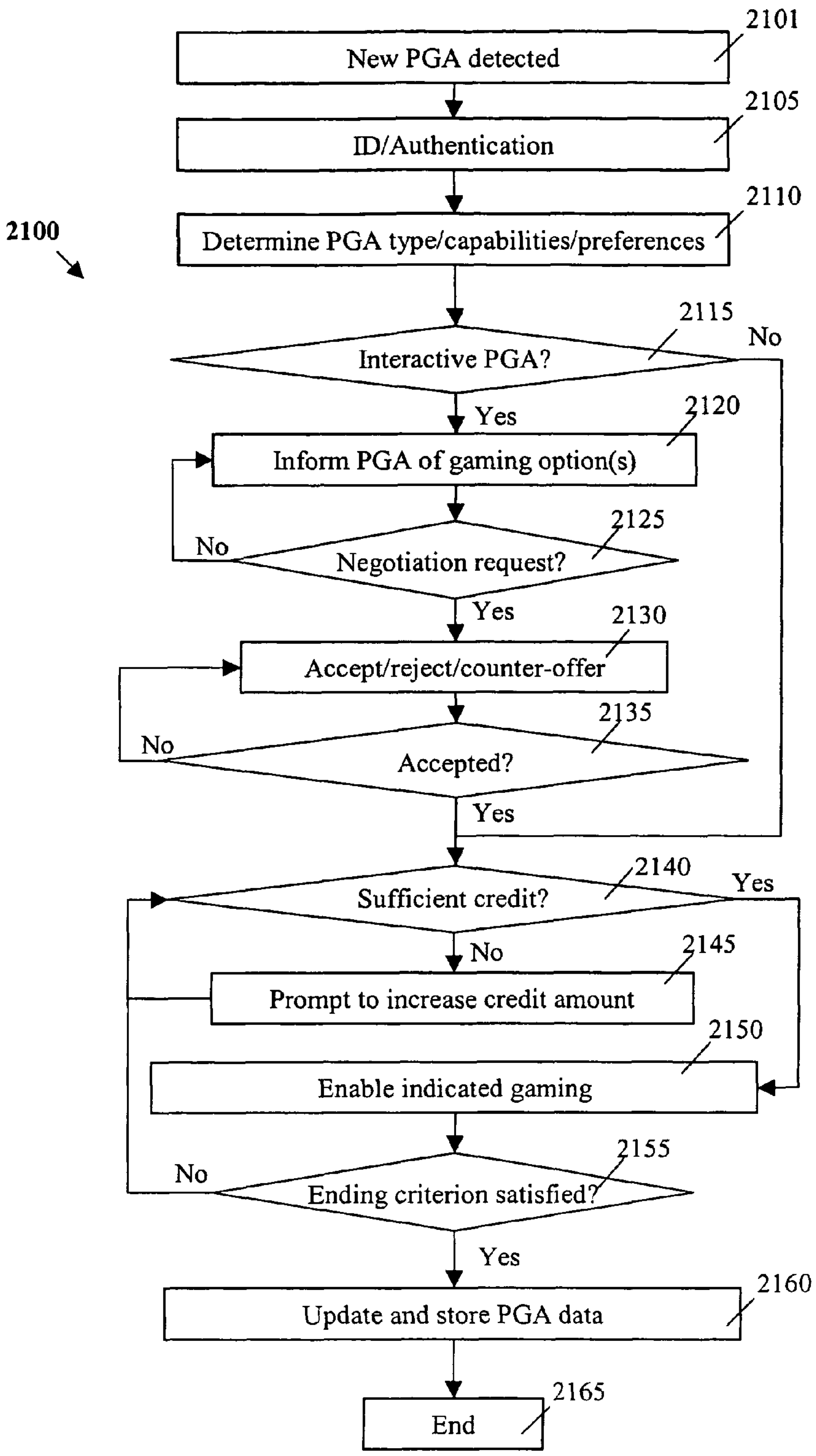
FIG. 21 is a flow chart that outlines one method of using a super gaming agent.

FIG. 21 outlines one method 2100 that applies to interactions between SGAs and PGAs. In step 2101, an SGA is made aware of an active PGA with which the SGA has not had a recent interaction. In some implementations of the invention, multiple SGAs may also be made aware of the PGA at about the same time. The SGA(s) may challenge the PGA, as described above, and require identification and authentication of the PGA, e.g., to ensure that the human authorizer is 21 years old or older, e.g., by searching in a secure registry of "legal" and authorized PGAs. (Step 2105.) Similarly, the PGA should also challenge and authenticate the SGA(s).

In step 2110, the type, capabilities and/or preferences of the PGA will be evaluated. As previously noted, some PGAs have a specific mission and are not sufficiently intelligent to respond to changing circumstances or new opportunities. However, some PGAs may have the ability to interact with SGAs in a more complex manner. For example, the PGA may be able to bargain with the SGA, to respond to unanticipated offers from the SGA, etc. Such PGAs may sometimes be referred to herein as "interactive PGAs" or the like.

If it is determined (in this example, by the SGA) that the PGA is not an interactive PGA, the process will proceed to step 2140. However, if it is determined that the PGA is an interactive PGA, the SGA may present the PGA with gaming options or other options. (Step 2120.) For example, the SGA might have determined in step 2110 that the PGA has a preference for poker tournaments and could invite the PGA to participate in a video poker tournament about which the PGA was previously unaware. The PGA may have originally been planning to, e.g., play slot games.

In alternative implementations, the PGA will not be authorized to make agreements on its own, but will need to obtain approval from the player, e.g., for certain types of agreements or activities. For example, the PGA may communicate offers to the player that were made by one or more SGAs. The communications could be in any convenient form, as previously described. The form of communication may be determined in advance according to the player's criteria for establishing the PGA.

In yet other implementations, the SGAs may communicate offers directly with the player, e.g., according to ability and/or preference data that the SGA has determined from the PGA. For example, the SGA may be manifested as an avatar that can appear on a player's computer, PDA, cell phone display screen, etc. The SGA's avatar might say, for example, "We have just introduced a new tournament. You seem to be interested in tournaments. Your personal gaming agent has some information that indicates that this tournament might be of interest to you." In some such implementations, the SGA may present video and/or audio content to the player in order to advertise games, tournaments, etc.

However, in the example described with reference to FIG. 21, at least some PGAs are configured for negotiation with SGAs. Accordingly, in step 2125, the SGA determines whether a response to proffered gaming options and/or a negotiation request has been received from the PGA. If not, the SGA may make another solicitation. (Step 2120.) If such a request/response/offer has been received from the PGA, it is evaluated and the SGA will make a response to the PGA. (Step 2130.) The SGA's response may be an acceptance, a rejection or a counter-offer.

Multiple SGAs could be evaluating the PGA, determining that it is an interactive PGA, determining the PGA's profile, preferences, etc., and making offers to the PGA. For example, another SGA that represents a second gaming establishment may be able to determine that the PGA is intending to play slot games and may offer the PGA a higher payout percentage than would normally be available, if the PGA will play slots at the second gaming establishment. The SGAs may or may not be able to determine what other offers have been made to the PGA, depending on the implementation. According to some implementations of the invention, one of the abilities/powers that a high-level PGA can acquire is the ability to prevent SGAs from receiving information regarding the offers of other SGAs.

For example, in step 2125 the SGA may receive an indication that the PGA wants to continue with its predetermined plan to play slots and would like to obtain one or more predetermined "comps" for its human player, such as a predetermined quality of hotel room, meal(s), entertainment, etc., in exchange for playing slots at the gaming establishment associated with the SGA. In this example, the SGA is aware that the PGA may be receiving solicitations from other SGAs. Moreover, the PGA has achieved the ability (e.g., through "experience points" or similar indicia of usage, because of a history of high wagers, etc.) to prevent the SGA from knowing the details of other offers/solicitations that the PGA may be receiving. Accordingly, the SGA agrees to provide the requested comps.

In step 2140, it is determined whether there is sufficient credit available for the PGA. For example, the SGA may require that the PGA have a minimum credit balance as a condition of receiving benefits for which the PGA has bargained. Alternatively, or additionally, the PGA may need to have a minimum credit balance in order to participate in certain gaming activities. In some implementations, the credit determination is made earlier in the process, e.g., prior to informing an interactive PGA of gaming options (or at least prior to responding to a PGA's response/negotiation request).

If there is sufficient credit for the PGA's intended gaming operations, the indicated gaming session is enabled (step 2150). If not, the PGA is prompted to increase its credit balance. In some implementations, this prompt would cause the PGA to prompt the human to increase the PGA's available credit. In alternative implementations, the PGA is able to access a financial institution to increase its available credit for this session, e.g., within predetermined limits that have been set by the human player.

When the PGA has sufficient credit, the SGA will permit gaming, e.g., as described elsewhere herein. (Step 2150.) In this example, the PGA's gaming is permitted only within certain parameters, e.g., according to a predetermined minimum or maximum number of games, a predetermined minimum or maximum wagering amount, etc., which are evaluated in step 2155. The PGA's credit balance may be evaluated, as needed. (Step 2140.) After the PGA's gaming operations have ended, the results are updated and stored. (Step 2160.) This information may be reported to a financial institution from which the PGA is authorized to withdraw funds. Among other things, this step allows for the creation of an audit trail that may be required by law and/or may be useful in resolving player disputes. For example, human players may subsequently claim that their PGA was not acting according to the human's authorization. The process ends in step 2165.

Figure 22:
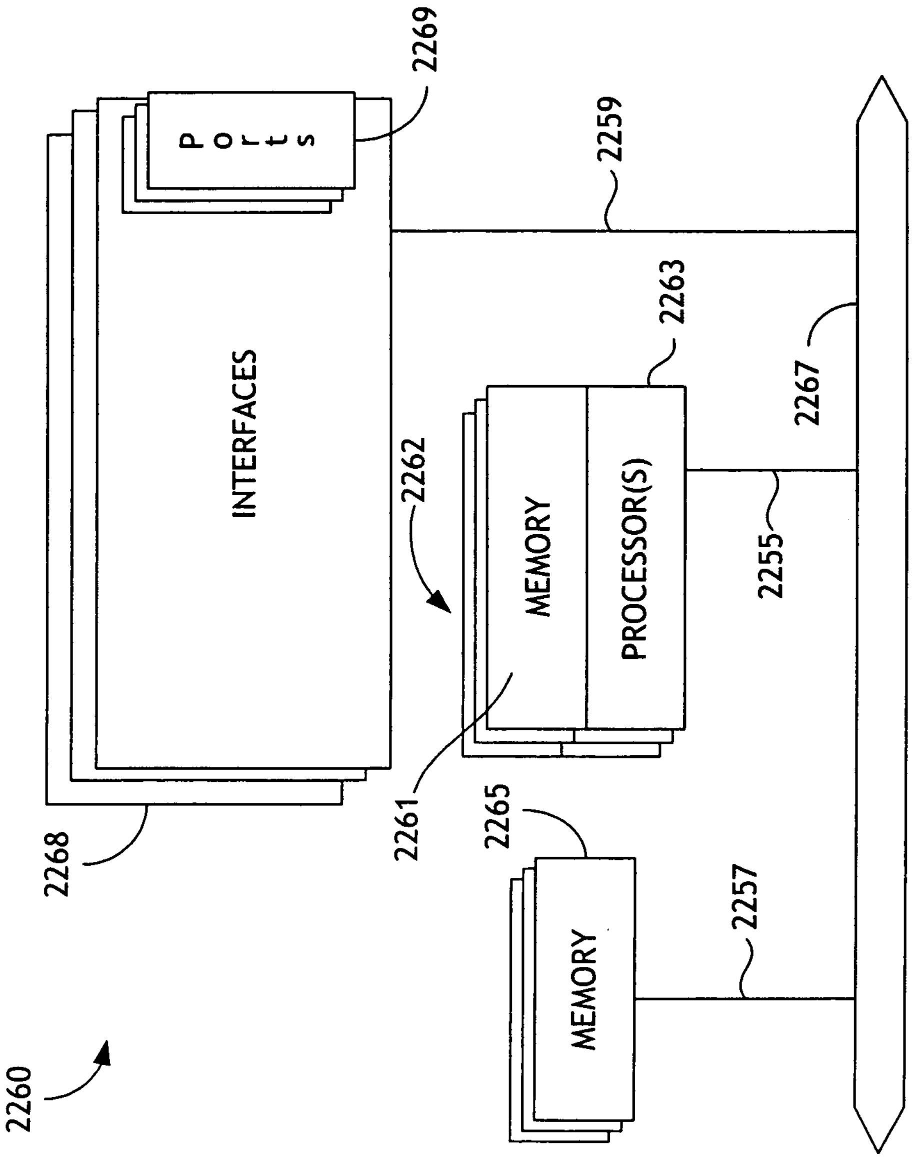
FIG. 22 is a block diagram of a network device that may be configured to perform some methods according to the present invention.

FIG. 22 illustrates an example of a network device that may be configured as a game server for implementing some methods of the present invention. Network device 2260 includes a master central processing unit (CPU) 2262, interfaces 2268, and a bus 2267 (e.g., a PCI bus). Generally, interfaces 2268 include ports 2269 appropriate for communication with the appropriate media. In some embodiments, one or more of interfaces 2268 includes at least one independent processor and, in some instances, volatile RAM. The independent processors may be, for example, ASICs or any other appropriate processors. According to some such embodiments, these independent processors perform at least some of the functions of the logic described herein. In some embodiments, one or more of interfaces 2268 control such communications-intensive tasks as media control and management. By providing separate processors for the communications-intensive tasks, interfaces 2268 allow the master microprocessor 2262 efficiently to perform other functions such as routing computations, network diagnostics, security functions, etc.

The interfaces 2268 are typically provided as interface cards (sometimes referred to as "linecards"). Generally, interfaces 2268 control the sending and receiving of data packets over the network and sometimes support other peripherals used with the network device 2260. Among the interfaces that may be provided are FC interfaces, Ethernet interfaces, frame relay interfaces, cable interfaces, DSL interfaces, token ring interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like.

When acting under the control of appropriate software or firmware, in some implementations of the invention CPU 2262 may be responsible for implementing specific functions associated with the functions of a desired network device. According to some embodiments, CPU 2262 accomplishes all these functions under the control of software including an operating system and any appropriate applications software.

CPU 2262 may include one or more processors 2263 such as a processor from the Motorola family of microprocessors or the MIPS family of microprocessors. In an alternative embodiment, processor 2263 is specially designed hardware for controlling the operations of network device 2260. In a specific embodiment, a memory 2261 (such as non-volatile RAM and/or ROM) also forms part of CPU 2262. However, there are many different ways in which memory could be coupled to the system. Memory block 2261 may be used for a variety of purposes such as, for example, caching and/or storing data, programming instructions, etc.

Regardless of network device's configuration, it may employ one or more memories or memory modules (such as, for example, memory block 2265) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine-readable media that include program instructions, state information, etc. for performing various operations described herein.

Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Although the system shown in FIG. 22 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device. The communication path between interfaces may be bus based (as shown in FIG. 22) or switch fabric based (such as a cross-bar).

The above-described devices and materials will be familiar to those of skill in the computer hardware and software arts. Although many of the components and processes are described above in the singular for convenience, it will be appreciated by one of skill in the art that multiple components and repeated processes can also be used to practice the techniques of the present invention.

Although illustrative embodiments and applications of this invention are shown and described herein, many variations and modifications are possible which remain within the concept, scope, and spirit of the invention. For example, some implementations involve a time limit for completing a particular task, sequence and/or a predetermined number of sequences. Within a particular sequence, for example, a player (or team) may have a predetermined time (e.g., on the scale of minutes or hours) within which to accomplish one or more goals, such as playing a certain number of games, wagering a certain amount, reaching a destination/location, finding a clue, etc. Further, some implementations set an overall time limit for completing larger-scale goals, e.g., for completing an entire sequence or a predetermined number of sequences. This time limit is preferably on a larger scale, e.g., days, weeks or months. In some such implementations, a player must achieve predetermined goals of gaming, wagering, etc., at a predetermined number of participating gaming establishments within a predetermined time. Otherwise, the player's accumulated credits (or the like) will expire.

Some implementations of the invention provide a group game feature, wherein teams of players may compete against one another in the same adventure sequence and/or game sequence. According to some such implementations, team members can apportion or delegate various parts of the sequence to individual players or smaller groups of players, such as the tasks of finding clues, solving puzzles, etc. In some implementations, a team's total score may be used to determine which team won a particular sequence and/or a game. Alternatively, only the best score, the lowest score, an average score, etc., for the team may be used to determine which team won the particular sequence and/or game.

In some such implementations, team members may advantageously communicate with one another, e.g., to share information, to collaborate on solving a puzzle, etc. For example, the players may use features of their portable data storage devices 46 to send and receive voice, text, graphical and/or video messages and other information. However, in some such implementations other teams may have access to at least some communications within a team. For example, a predetermined percentage of communications within a team may be broadcast to all teams. Preferably, players will not know which messages are available to other teams.

Accordingly, the embodiments and implementations described herein are to be considered as illustrative and not restrictive. Therefore, the invention is not to be limited to the details given herein, but may be modified within the scope and equivalents of the appended claims.

We claim:

1. A method of operating a gaming system, said method comprising:

determining, via a processor, gaming characteristics of a player;

configuring, via the processor, a software player gaming agent for autonomous gaming operations according to the gaming characteristics of the player;

transmitting, via a network interface and to a mobile device of the player, an offer to implement the software player gaming agent;

receiving, via the network interface and from the mobile device of the player, a request to implement the software player gaming agent;

determining, via the processor, whether the software player gaming agent is authorized to access and modify a monetary account of the player based on actions performed in association with the software player gaming agent;

if the software player gaming agent is authorized to access and modify the monetary account of the player based on actions performed by the software gaming agent:

(a) performing, via the processor, autonomous gaming operations through the software player gaming agent;

(b) accessing and modifying the monetary account of the player based on said performed autonomous gaming operations, the monetary account being increasable upon receipt, via an acceptor, of a physical item associated with a monetary value;

determining, via the processor, that a predetermined criterion is satisfied;

in response to determining that the predetermined criterion is satisfied, more effectively performing, via the processor, the autonomous gaming operations through the software player gaming agent; and transmitting, via the network interface and to the mobile device of the player, results of the autonomous gaming operations performed through the software player gaming agent.

2. The method of claim 1, wherein determining the gaming characteristics of the player comprises:

providing a graphical user interface; and receiving, via at least one input device and the graphical user interface, data regarding gaming characteristics of the player.

3. The method of claim 1, wherein determining the gaming characteristics of the player comprises at least one of (a) recording, via the processor, gaming characteristic information while the player is playing games and (b) analyzing, via the processor, player tracking data.

4. The method of claim 1, wherein the software player gaming agent is configured to perform gaming operations that have previously been identified by the player.

5. The method of claim 1, wherein the software player gaming agent is configured to perform autonomous gaming operations by applying a set of rules based on the gaming characteristics of the player.

6. The method of claim 1, wherein the software player gaming agent is configured to perform gaming operations in a first location when the player is in a second location.

7. The method of claim 1, wherein the software player gaming agent is configured to negotiate with super game agents that are configured to act on behalf of gaming establishments.

8. The method of claim 1, wherein the autonomous gaming operations are constrained according to at least one predetermined control criterion.

9. The method of claim 1, further comprising:
- creating, via the processor, a digital certificate for the software player gaming agent;
- storing the digital certificate in a memory; and
- authenticating, via the processor, the software player gaming agent according to the stored digital certificate prior to the software player gaming agent's autonomous gaming operations.

10. The method of claim 1, further comprising:
- saving in a memory first results of a first session of autonomous gaming operations involving a first portion of an activity sequence at a first time;
- retrieving, by the processor and from the memory, the first results at a second time; and
- performing, by the processor, a second session of autonomous gaming operations involving a second portion of the activity sequence.

11. The method of claim 6, wherein the first location is within a first jurisdiction having a first set of gaming regulations and the second location is within a second jurisdiction having a second set of gaming regulations.

12. The method of claim 1, wherein the predetermined criterion is at least one of a number of games played, a time of performing gaming operations, an amount of money wagered by the software player gaming agent, an average balance of an account accessible by the software player gaming agent and a minimum balance of an account accessible by the software player gaming agent.

13. The method of claim 1, wherein the software player gaming agent performs gaming operations more effectively due to an improved pay table percentage.

14. The method of claim 1, wherein the software player gaming agent is part of a team of software player gaming agents and wherein the predetermined criterion is a measure of the team's progress.

15. The method of claim 8, wherein one predetermined control criterion is an amount of money that the software player gaming agent is permitted to spend within a predetermined time period.

16. The method of claim 11, wherein the gaming operations are legal according to the first set of gaming regulations but are not legal according to the second set of gaming regulations.

17. The method of claim 14, wherein the software player gaming agent is configured to transmit gaming data to the mobile device of the player, the gaming data comprise gaming result data.

18. The method of claim 14, wherein the software player gaming agent is configured to transmit gaming data to the mobile device of the player, the gaming data comprise a reproduction of at least part of a gaming session.

19. The method of claim 14, further comprising advancing, via the processor, the software player gaming agent's team in an activity sequence if the software player gaming agent's team meets the predetermined criterion.

20. The method of claim 16, which includes determining the gaming characteristics of the player and configuring the software player gaming agent for autonomous gaming operations according to the gaming characteristics of the player within the first jurisdiction.

21. The method of claim 18, wherein the reproduction is at least one of a video, a still image and an audio clip.

22. The method of claim 18, wherein the reproduction is received at a first time, further comprising:
- storing the reproduction in a memory; and
- reproducing, via the processor, the reproduction at a second time.

23. The method of claim 22, wherein the reproduction comprises a video and wherein the reproducing step comprises playing the video.

24. A method of operating a gaming system, said method comprising:
- forming a communication link between a device and a server;
- transmitting, via a network interface and to a mobile device of the player, an offer to implement a software player gaming agent;
- receiving, via the network interface and from the mobile device of the player, a request to implement the software player gaming agent;
- determining, via at least one processor, whether the software player gaming agent is authorized to access and modify a monetary account of the player based on actions performed in association with the software player gaming agent;
- if the software player gaming agent is authorized to access and modify the monetary account of the player based on actions performed by the software gaming agent, enabling the software player gaming agent associated with the player to participate in a sequence of activities, the sequence of activities including activities to be performed in more than one location, the sequence of activities including at least one wagering game;
- determining, via the processor, that the software player gaming agent is authorized to conduct autonomous gaming operations in a first location;
- if the software player gaming agent is authorized to conduct autonomous gaming operations in the first location, performing, via the at least one processor, a first session of autonomous gaming operations at the first location at a first time, the first session relating to a first portion of the sequence of activities;
- accessing and modifying the monetary account of the player based on said first session of autonomous gaming operations, the monetary account being increasable upon receipt, via an acceptor, of a physical item associated with a monetary value;
- saving first results of the first session of autonomous gaming operations in a memory;
- retrieving, via the at least one processor and from the memory, the first results at a second location;
- determining, via the processor, that the software player gaming agent is authorized to conduct autonomous gaming operations in the second location;
- if the software player gaming agent is authorized to conduct autonomous gaming operations in the first location, performing, via the at least one processor, a second session of autonomous gaming operations at the second location at a second time, the second session relating to a second portion of the activity sequence;

accessing and modifying the monetary account of the player based on said second session of autonomous gaming operations;

determining, via the at least one processor, that the sequence of activities is complete after the second session; and awarding a prize to the player based on completion of the sequence of activities, the prize being in addition to any prize obtained during the first session and the second session.

25. The method of claim 24, wherein at least one location is a virtual location and wherein the sequence of activities comprises at least one virtual activity in the virtual location.

26. The method of claim 24, wherein enabling the software player gaming agent to participate in the sequence of activities comprises presenting at least a portion of the sequence of activities on a gaming machine.

27. The method of claim 24, wherein enabling the software player gaming agent to participate in the sequence of activities comprises presenting a sequence of games at a single gaming machine.

28. The method of claim 24, wherein enabling the software player gaming agent to participate in the sequence of activities comprises enabling the player to participate in a team that attempts to complete the sequence of activities.

29. The method of claim 24, wherein the sequence of activities further comprises at least one role playing adventure.

30. The method of claim 25, wherein the virtual activity involves a virtual player having an unique ID.

31. The method of claim 26, wherein at least one wagering game comprises generating a random number, further comprising saving the random number in a local storage device accessible by the gaming machine and also in a remote storage device accessible by the server.

32. The method of claim 29, wherein the role playing adventure comprises at least one of a military adventure, a financial district adventure and a daredevil adventure.

33. The method of claim 31, wherein the unique ID and virtual player parameters are stored in a remote storage device accessible by the server.

34. The method of claim 33, wherein the virtual player parameters comprise at least one of information regarding the virtual player's progress in the sequence of activities, virtual player abilities, an upgrade cost for upgrading virtual player abilities, types of activities in which a virtual player can participate, a cost of participation in such activities and virtual player experience level.

35. A gaming device, comprising:

means for determining gaming characteristics of a player;

means for configuring a software player gaming agent for autonomous gaming operations according to the gaming characteristics of the player;

means for transmitting an offer to implement the software player gaming agent to a mobile device of the player;

means for receiving a request to implement the software player gaming agent from the mobile device of the player;

means for determining whether the software player gaming agent is authorized to access and modify a monetary account of the player based on actions performed in association with the software player gaming agent;

means for performing autonomous gaming operations through the software player gaming agent if the software player gaming agent is authorized to access and modify the monetary account of the player based on actions performed by the software gaming agent;

means for accessing and modifying the monetary account of the player based on said performed autonomous gaming operations, the monetary account being increasable upon receipt, via an acceptor, of a physical item associated with a monetary value and identification, via a validator, of the received physical item;

means for determining that a predetermined criterion is satisfied; and means for more effectively performing the autonomous gaming operations through the software player gaming agent upon determining that the predetermined criterion is satisfied; and means for transmitting results of the autonomous gaming operations performed through the software player gaming agent to the mobile device of the player.

36. The gaming device of claim 35, wherein the determining means comprises:

means for providing a graphical user interface; and means for receiving data regarding gaming characteristics of the player that is input via the graphical user interface.

37. The gaming device of claim 35, wherein the determining means comprises means for recording gaming characteristic information while the player is playing games.

38. The gaming device of claim 35, wherein the determining means comprises means for determining gaming characteristics of a player from player tracking data.

39. A non-transitory computer-readable medium with computer-executable instructions stored thereon that when executed by a processor of a gaming system cause the gaming system to:

transmit, via a network interface and to a mobile device of a player, an offer to implement a software player gaming agent;

receive, via a network interface and from the mobile device of the player, acceptance of a request to implement the software player gaming agent;

determine whether the software player gaming agent is authorized to access and modify a monetary account of the player based on actions performed in association with the software player gaming agent;

if the software player gaming agent is authorized to access and modify the monetary account of the player based on actions performed by the software gaming agent:

(a) perform gaming operations by applying a set of rules based on gaming characteristics of the player;

(b) access and modify a monetary account of the player based on said performed gaming operations, the monetary account being increasable upon receipt, via an acceptor, of a physical item associated with a monetary value;

determine that a predetermined criterion is satisfied; and more effectively perform the gaming operations in response to determining that the predetermined criterion is satisfied; and transmit, via the network interface and to the mobile device of the player, results of the autonomous gaming operations performed through the software player gaming agent.

40. The non-transitory computer readable medium of claim 39, wherein the instructions, when executed by the processor of the gaming system, cause the gaming system to obtain funds from the monetary account of the player.

41. The non-transitory computer readable medium of claim 39, wherein the instructions, when executed by the processor of the gaming system, cause the gaming system to obtain funds from the monetary account of the player based on rules for controlling the obtaining of funds.

42. A method of operating a gaming system, said method comprising:

receiving, via a processor, first registration data regarding a plurality of software player gaming agents configured for autonomous gaming operations;

storing the first registration data in a memory;

transmitting, via a network interface and to a mobile device of a player, an offer to implement the software player gaming agent;

receiving, via the network interface and from the mobile device of the player, a first request to implement a particular software player gaming agent, said software player gaming agent being associated with a monetary account, the monetary account being increasable upon receipt, by an acceptor, of a physical item associated with a monetary value;

authenticating, via the processor, a first requester that transmitted the first request;

receiving from the memory second registration data regarding a plurality of super gaming agents, the plurality of super gaming agents being automated representatives of gaming establishments and configured for interaction with the software player gaming agents; and determining, via the processor, whether the first registration data include particular first registration data corresponding to the particular software player gaming agent responsive to the first request.

43. The method of claim 42, further comprising providing, via the processor, requested particular first registration data to the requester when it is determined that the first registration data include particular first registration data responsive to the first request.

44. The method of claim 42, further comprising:

storing the second registration data in the memory;

receiving, via the processor, a second request regarding a particular super gaming agent;

authenticating, via the processor, a second requester that transmitted the second request; and determining, via the processor, whether the second registration data include particular second registration data corresponding to the particular super gaming agent responsive to the second request.

45. The method of claim 44, further comprising the step of providing particular second registration data to the second requester when it is determined that the second registration data include particular second registration data responsive to the second request.

* * * * *